(12) United States Patent
Dakss et al.

(10) Patent No.: US 11,785,280 B1
(45) Date of Patent: Oct. 10, 2023

(54) SYSTEM AND METHOD FOR RECOGNIZING LIVE EVENT AUDIOVISUAL CONTENT TO RECOMMEND TIME-SENSITIVE TARGETED INTERACTIVE CONTEXTUAL TRANSACTIONS OFFERS AND ENHANCEMENTS

(71) Applicant: Epoxy.AI Operations LLC, Berwyn, PA (US)

(72) Inventors: Jonathan Howard Dakss, Livingston, NJ (US); Nathan Anderson Offutt, Philadelphia, PA (US); Aaron Todd, Philadelphia, PA (US); W. Leo Hoarty, Morgan Hill, CA (US); Tayyab Shahzada, Reading, PA (US); Andrew James Princep, Oxford (GB); Jason Angelides, Wayne, PA (US); Christopher Thomas Reynolds, Devon, PA (US); Ralph J. Pierre-Louis, Philadelphia, PA (US); Thomas Robert Alexander Weiss, Burchetts Green (GB)

(73) Assignee: Epoxy.AI Operations LLC, Berwyn, PA (US)

( * ) Notice: Subject to any disclaimer, the term of this patent is extended or adjusted under 35 U.S.C. 154(b) by 0 days.

(21) Appl. No.: 17/722,274

(22) Filed: Apr. 15, 2022

Related U.S. Application Data

(60) Provisional application No. 63/201,152, filed on Apr. 15, 2021.

(51) Int. Cl.
*H04N 21/43* (2011.01)
*H04N 21/478* (2011.01)
*H04N 21/81* (2011.01)
*G07F 17/32* (2006.01)
*H04N 21/44* (2011.01)
(Continued)

(52) U.S. Cl.
CPC ... *H04N 21/43079* (2020.08); *G07F 17/3288* (2013.01); *H04N 21/2187* (2013.01); *H04N 21/44008* (2013.01); *H04N 21/466* (2013.01); *H04N 21/478* (2013.01); *H04N 21/8133* (2013.01)

(58) Field of Classification Search
CPC ......... H04N 21/43079; H04N 21/2187; H04N 21/44008; H04N 21/466; H04N 21/478; H04N 21/8133; G07F 17/3288
See application file for complete search history.

(56) References Cited

U.S. PATENT DOCUMENTS 8,918,832 B2 12/2014 Sinha et al.
10,643,235 B2 5/2020 Balasubramanian et al.
(Continued)

*Primary Examiner* — Michael R Telan
(74) *Attorney, Agent, or Firm* — Morgan, Lewis & Bockius LLP

(57) ABSTRACT

A system and method for ingesting, normalizing and analyzing multiple disparate datasets surrounding live sports events combined with real-time viewing content recognition and understanding on a user device to enable digital services to recommend real-time, personalized interactive offers such as sports bet offers to the device that are synchronized to live events being visual or audibly projected proximate the user device despite inherent latency between the user device and the projected live event.

30 Claims, 58 Drawing Sheets

(51) Int. Cl.
*H04N 21/466* (2011.01)
*H04N 21/2187* (2011.01)

(56) References Cited

U.S. PATENT DOCUMENTS

| | | | |
|---|---|---|---|
| 2008/0155637 A1* | 6/2008 | Du Breuil | H04N 21/8455 |
| | | | 725/105 |
| 2013/0222597 A1* | 8/2013 | Brink | H04N 21/4781 |
| | | | 348/157 |
| 2013/0347018 A1* | 12/2013 | Limp | H04N 21/4394 |
| | | | 725/19 |
| 2015/0365722 A1* | 12/2015 | Oztaskent | G06F 16/7834 |
| | | | 725/18 |
| 2018/0063572 A1* | 3/2018 | Smus | G10L 19/018 |
| 2019/0141410 A1* | 5/2019 | Zverina | H04N 21/23418 |
| 2019/0251602 A1* | 8/2019 | Cormie | H04N 21/23424 |
| 2020/0245017 A1* | 7/2020 | Ganschow | H04N 21/4312 |
| 2022/0028215 A1 | 1/2022 | Huke et al. | |
| 2022/0058382 A1* | 2/2022 | LiVoti | G06V 40/172 |

* cited by examiner

```
[
  {
    id: 1,
    stationId: 4872162,
    milliunixstamp: 1648819304000,
    sequence: ['ha', 'i', 'lo', 'gr', 'ga', 'lo', 'te', 're', 'ih']
  },
  {
    id: 2,
    stationId: 4872162,
    milliunixstamp: 1648819314000,
    sequence: ['fe', 'ga', 'ra', 'il', 't', ... ]
  },
  ...
]
```

Exemplary Speech Data Cache entry (2974)

Exemplary Live Sport/Event Data Provider Feed Data Structure (432)

| Field | Value |
|---|---|
| <League> | |
| <League xmlns> | "http://feed.xyz.com/schema/basketball/schedule-v5.0.xsd" |
| <League ID> | "12345" |
| <League Name> | "NBA" |
| <Season Schedule> | |
| <Season Schedule ID> | "678910" |
| <Season Schedule Year> | "2021" |
| <Games> | |
| <Game ID> | "111213115" |
| <Game Status> | "Closed" |
| <Game Coverage> | "full" |
| <Game Scheduled> | "2021-10-19T23:30:00Z" |
| <Home Team> | "abc123" |
| <Away Team> | "xyz456" |
| <Venue ID> | "1617181920" |
| <Venue Name> | "Fiserv Forum" |
| <Venue Capacity> | "17500" |
| <Venue Address> | "1111 Vel R Phillips Avenue" |

| Field | Value |
|---|---|
| <Venue City> | "Milwaukee" |
| <Venue State> | "WI" |
| <Venue Zip> | "53203" |
| <Venue Country> | "USA" |
| <Home Name> | "Milwaukee Bucks" |
| <Home Alias> | "MIL" |
| <Home ID> | "abc123" |
| <Away Name> | "Brooklyn Nets" |
| <Away Alias> | "BKN" |
| <Away ID> | "xyz456" |
| <Broadcasts> | |
| <Broadcast Network> | "TNT" |
| <Broadcast Type> | "TV" |
| <Broadcast Locale> | "National" |
| <Broadcast Channel> | "245" |
| </Broadcasts> | |
| </Game> | |
| </Games> | |
| </Season Schedule> | |
| </League> | |

| Field | Value |
|---|---|
| { "league" : | "nfl", |
| "apiVersion" : | "v7", |
| "language" : | "en", |
| "season" : | "2021", |
| "seasonType" : | "reg", |
| "sport" : | "football", |
| "leagueId" : | "abcde12345" }, |

Exemplary Events Data Metadata Taxonomy Data Structure (456)

| Field | Value |
|---|---|
| { "league" : | "nba", |
| "apiVersion" : | "v7", |
| "language" : | "en", |
| "season" : | "2021", |
| "seasonType" : | "reg", |
| "sport" : | "basketball", |
| "leagueId" : | "fghij678910" }, |

Exemplary Events Data Metadata Taxonomy Data Structure (458)

| Field | Value |
|---|---|
| { "league" : | "nhl", |
| "apiVersion" : | "v7", |
| "language" : | "en", |
| "season" : | "2021", |
| "seasonType" : | "reg", |
| "sport" : | "hockey", |
| "leagueId" : | "pqrst1617181920" }, |

Exemplary Events Data Metadata Taxonomy Data Structure (460)

| Field | Value |
|---|---|
| { "league" : | "mlb", |
| "apiVersion" : | "v7", |
| "language" : | "en", |
| "season" : | "2022", |
| "seasonType" : | "reg", |
| "sport" : | "baseball", |
| "leagueId" : | "klmno1112131415" }, |

Exemplary Events Data Metadata Taxonomy Data Structure (462)

FIG. 4C

| Field | Value |
|---|---|
| { "fixtureKey" : | "sports_events", |
| "publisher" : | "providerxyz", |
| "sport" : | "basketball", |
| "league" : | "nba", |
| "leagueId" : | "1234567891O-abcdefgh", |
| "discoveryId" : | "{UUID}", |
| "payload" : | "{RAW_PROVIDER_DATA}"}, |

Exemplary Events Data Ingest Queue Data Object (468)

| Field | Value |
|---|---|
| { "fixtureKey" : | "sports_events", |
| "collection" : | "sports_events", |
| "publisher" : | "providerxyz", |
| "sport" : | "basketball", |
| "league" : | "nba", |
| "leagueId" : | "1234567891O-abcdefgh", |
| "discoveryId" : | "{UUID}", |
| "payload" : | "{RAW_PROVIDER_DATA}", |
| "routeThroughScheduling": | "{BOOLEAN}" } |

Exemplary Events Data Storage Queue Data Object (470)

FIG. 4D

| Field | Value |
|---|---|
| { "$schema": | "http://json-schema.org/draft-07/schema#", |
| "$id": | "http://epoxy.ai/schemas/sports_events", |
| "type": | "object", |
| "properties": { | |
| "id": { | "type": "string" }, |
| "type": { | "type": "string" }, |
| "sport": { | "type": "string" }, |
| "league": { | "type": "string" }, |
| "leagueId": { | "type": "string" }, |
| "seasonType": { | "type": "string" }, |
| "season": { | "type": "string" }, |
| "seasonStartDate": { | "type": "string" }, |
| "seasonEndDate": { | "type": "string" }, |
| "seriesNumber": { | "type": "integer" }, |
| "seriesLength": { | "type": "integer" }, |
| "eventStartDateTime": { | "type": "string" }, |
| "venueId": { | "type": "string" }, |
| "awayName": { | "type": "string" }, |
| "homeName": { | "type": "string" }, |
| "participants": { | "type": "array", |

| Field | Value |
|---|---|
| "items": { | |
| "type": | "object", |
| "properties": { | |
| "participantId": { | "type": "string" } |
| }, | |
| "required": | ["participantId"] |
| "league": { | "type": "string" }, |
| "leagueId": { | "type": "string" }, |
| "seasonType": { | "type": "string" }, |
| "season": { | "type": "string" }, |
| "seasonStartDate": { | "type": "string" }, |
| "seasonEndDate": { | "type": "string" }, |
| "coverage": { | "type": "string" }, |
| "seriesNumber": { | "type": "integer" }, |
| "seriesLength": { | "type": "integer" }, |
| "eventStartDateTime": { | "type": "string" }, |
| "venueId": { | "type": "string" }, |
| "awayTeamId": { | "type": "string" }, |
| "awayName": { | "type": "string" }, |
| "homeTeamId": { | "type": "string" }, |
| "homeName": { | "type": "string" }, |
| "fuzzyName": { | "type": "string" }, |

FIG. 4E

Exemplary Events Data Schema Registry Data Structure (480)

| Field | Value |
|---|---|
| "id": | "2c1ec905-0724-4ca9-a719-68995ee55aa7", |
| "triggerStartDateTime": | "2022-03-09T02:00:00.000Z", ← 492 |
| "eventStartDateTime": | "2022-03-09T03:00:00.000Z", |
| "sport": | "basketball", |
| "league": | "nba", |
| "collection": | "scheduled_sports_events_today", |
| "status": | "completed", |
| "discoveryId": | "1e3feb60-9f23-11ec-94aa-077234e36b18", |
| "fixtureKey": | "sports_events", |
| "lastUpdated": | "2022-03-10T13:30:26.696Z", |

488     490

Exemplary *scheduled_events_today* data structure (486)

FIG. 4F

| item_no | code | bets_pts cad | stake | combined tot. odds 1stact | combined tot. des bet count bf | Mobile bet count bf | West. au bet count bf | US_MICH bet count bf | US_PENNS YLVANIA bet count bf | Tourist Chance at bet count bf | Hesitant Heat to place bet count bf | Master_L Heat to bet count bf | Diversion bet count bf | Player Occurrence Line bet count bf | Number bet count bf | Winner bet count bf | Winning Margin at bet count bf | pacific bet count bf | BET_BUI LDER bet count bf | SHUFFLE bet count bf |
|---|---|---|---|---|---|---|---|---|---|---|---|---|---|---|---|---|---|---|---|
| 010016E13-1343-44DE-A77E-31F834500823 | 0.037785 88001325 82 | 0.011167 35646825 16070 | 0.050291 83204678 34300 | 0.000263 94631958 95200 | 0.0 | 1.0 | 0.0 | 0.0 | 1.0 | 0.0 | 0.0 | 1.0 | 0.0 | 0.0 | 0.0 | 0.0 | 0.0 | 0.0 | 1.0 |
| 010822995E-ABE9-4147-94AF-SCE1C86483D5E | 0.016850 07752540 817200 | 0.039266 62665817 68 | 0.274328 94362404 40 | 0.000376 06066470 700010 | 0.03862 91025268 6610 | 1.0 | 0.0 | 0.0 | 1.0 | 0.0 | 0.19407 00808625 340 | 0.0 | 0.19407 00808625 340 | 0.404312 16084636 1200 | 0.0 | 0.0 | 0.0 | 0.0 | 0.04851753 20215633 440 | 0.89757 41238894 21180 |

FIG. 6C

SYSTEM AND METHOD FOR RECOGNIZING LIVE EVENT AUDIOVISUAL CONTENT TO RECOMMEND TIME-SENSITIVE TARGETED INTERACTIVE CONTEXTUAL TRANSACTIONS OFFERS AND ENHANCEMENTS

CROSS-REFERENCE TO RELATED APPLICATIONS

This application claims the benefit of U.S. Provisional Patent Application No. 63/201,152, filed Apr. 15, 2021, entitled "SYSTEM AND METHOD FOR RECOGNIZING AUDIOVISUAL CONTENT AND COMBINING WITH LIVE EVENT DATA AND USER BEHAVIOR DATA TO PRESENT TARGETED INTERACTIVE CONTEXTUAL OFFERS AND ENHANCEMENTS PREDICTED TO MAXIMIZE USER ENGAGEMENT", which is incorporated by reference herein in its entirety.

BACKGROUND OF THE INVENTION

Live events such as sporting events remain popular for individuals to attend in person or watch and/or listen to live. Many such live events may include live performance activities that are not considered traditional sporting events. For example, live award shows, live competitions, live debates or other live events where performance or at least partially unscripted or unpredictable events are occurring. While many people like to attend such live performances. Others watch or listen to those performances remotely over various types of media while the live events are occurring. While watching and/or listening remotely on one device such as a television, users often have a second device, such as mobile phone, tablet or laptop, at their disposal. Embodiments of the present invention allow the delivery of time-sensitive interactive content including such material that is curated for the user and that is engageable by the user on a remote personal user device during the live performance in a manner that is time synchronized with the live event.

Some sport bettors who use an online sports betting application on their mobile device while watching a live sports event via a programming provider on their television. Users might also be using the sports betting application and the programming application simultaneously on the same device.

Operators of interactive applications such as online sports betting applications have an unfilled need to understand what their users are doing with programming viewed on their televisions and similarly the providers of programming on the television have an unfilled need to understand what their viewers are doing with interactive applications on their mobile devices. As a result, the experience is often highly disconnected between the two, causing confusion or strain for the user in moving between them. There is also a wealth of data generated about the user's tastes, preferences and environment from their experiences within each of these applications that could be leveraged by the other to help improve and enhance their experience. This can be true for users who find whatever they are watching on television to be especially compelling to them personally, whether it is a commercial, a sporting event or television program, and in that moment would especially welcome an offer, promotion or interactive experience that would enhance that experience.

For example, sports wagering applications often advertise their services within television programs and events but have little or no means of providing prospective new or returning users a compelling targeted offer in the moment when a sports fan is highly engaged with a sporting event. When a fan does decide to use a sports wagering application in that moment, for example as an application on their mobile device, the experience of placing a bet is often highly complicated and is ultimately a distraction from enjoying the televised event. An ideal user experience would be one that elegantly combined the engagement of viewing a live sports event where the wagering experience on a digital device was a fun, simple and personalized enhancement to viewing rather than a distraction or inconvenience.

For example, marketers have long advertised on the medium of television given the ability for commercials (known as "spot advertising") to tell a compelling and memorable story to a very broad audience about their products and services using the compelling medium of video. However, within the last two decades, social media and digital platforms have emerged that offer a "direct response" model of engagement around products and services in new forms of advertising. This is achieved through their highly engaging interactive graphical user interfaces, which is made especially convenient on mobile devices and is often further targeted to individual users based on the ready availability of data about them based on other applications they use on those devices. However, based on recent changes to those platforms caused by public policy and proactive corporate measures around consumer privacy, marketers are now seeking alternatives that combine the narrative power and reach of video with the "direct response" convenience of interactive mobile experiences.

Also, based on a myriad of disruptions to the traditional pay television ecosystem, television networks and media companies have had to shift their delivery model to streaming video to applications on digital devices, be they smart televisions, personal computers or mobile devices. They have also had to fight social networks and digital applications for the value of television spot advertising to marketers given their ability to offer targeting and direct response advertising. In the shift to enabling video experiences on highly capable smart and personal digital devices, there is an opportunity to offer marketers the narrative power of video "spot advertising" in combination with the ability to harness rich data about viewers to create a personalized and engaged direct response experience that rivals the social network experience.

Therefore, a need exists for a system that can seamlessly build a connection between the environment of a live video experience on any device including a television display, and an interactive application experience on any device such as a sports wagering application on a mobile device and be able to offer a personalized, fun and engaging sports wagering experience that is synchronized to the live video experience. With a system to intelligently recognize and understand user behaviors across both applications and devices and connect to other valuable data sets about the user, both service providers can better understand their users and can optimize and/or personalize the user experience on each device in relation to a simultaneously on-going live event.

SUMMARY

Embodiments of the present invention include a system that solves the challenges of automatically recognizing and synchronizing an interactive experience to a live audiovisual broadcast to understand and accommodate inherent latencies in the delivery chain, ingesting and interconnecting data from multiple disparate datasets around live events such as sports events and related events such as betting odds markets to create a live interactive experience that uses data about a user's past behaviors and preferences to make predictions about what experience elements will be the simplest for the user to understand in the context of what they are viewing as well as recommending the ones with which they will be most likely to engage. Example scenarios can include but are not limited to the scenario of a user watching a live sports event on a television display who is shown synchronized offers and wager opportunities while using a betting operator application on their smartphone, or the scenario of a user who watches a spot advertisement during a television broadcast that is streamed to their personal computer and is shown a personalized interactive offer as an overlay to the spot advertisement. An exemplary system may include four subsystems:

a client software library, application or development kit to be used standalone or integrated with a service provider application on a digital device such as a mobile device application that communicates with hardware and software components of the device such as a microphone and communicates with the other subsystems of the invention over a communications network such as the Internet;

a subsystem that communicates with the client software over a communications network such as the Internet and facilitates the detection and recognition of the audiovisual event that the client user is watching such as a spot advertisement, television program or live sports event through use of technologies such as audio and video fingerprinting and automatic content recognition;

a subsystem that pulls data from a wide variety of sources and interconnects it in a single data management platform such as one or more data stores that can include but is not limited to live event data describing the event being viewed such as sports player data or spot advertising delivery schedule files, electronic program guide data, related transactions such as betting odds market data surround the event, data describing the past behavior of the user such as data describing how they behaved when viewing similar events, data of possible offers that could be made to users such as discounts coupons and rewards, and data about the user's tastes preferences background and habits that could be accessed from a variety of available data sources based on data tokens, cookies and unique user, device and network identifiers; and a subsystem that applies a pool of recommendation algorithms to the combination of contextual live event data detected by the client application and the recognition subsystem with the data about the event and user from the central data store subsystem to create personalized interactive widgets of offers and transactions such as wagering opportunities that are predicted to be of optimal value to the user and solicit optimal engagement from them which are then pushed to the client application to be displayed to the user in synchronization with the audiovisual experience.

A method for delivering interactive user interface elements to a digital user device running a software application client configured to communicate with a remote interactive services platform is disclosed. The method comprises the steps of storing, on the remote interactive services platform, event data received from a plurality of event data sources, the event data being associated with a plurality of transmission events; receiving, via the software application client, audio-visual data; using the audio-visual data to identify one of the plurality of transmission events that is in detectable proximity of the user device, wherein the audio-visual data comprises at least one of audio data and video data. The method further comprises the step of, based on i) the audio-visual data, and ii) the event data, identifying a user engagement opportunity associated with the transmission event that is in detectable proximity of the user device. The method further comprises the steps of pushing interactive content associated with the user engagement opportunity to the user device for display on the user device; receiving, via the user device, a user selection associated with the interactive content; and based on the user selection, initiating a placement of an order associated with the user engagement opportunity.

In some embodiments, the digital user device may also be associated with user characteristic data on the remote interactive services platform, and the identifying a user engagement opportunity associated with the transmission event that is in detectable proximity of the user device may be based on the user characteristic data.

In some embodiments, receiving, via the software application client, audio-visual data relating to one of the transmission events that is in detectable proximity of the user device, may include detecting at least one of: i) fingerprint data associated with the one of the transmission events, ii) phoneme data associated with the one of the transmission events; iii) utterance data associated with the one of the transmission events, and (iv) word data associated with the one of the transmission events. In some embodiments, the audio-visual data may include audio data relating to play-by-play accounts of a live sporting event and the interactive content is time-sensitive wager information regarding possible upcoming events at the live sporting event. In some embodiments, using the audio-visual data to identify the one of the plurality of transmission events that is in detectable proximity of the user device comprises analyzing the audio-visual data on the user device.

In some embodiments, the transmission event includes a live sporting event and the user engagement opportunity includes a wager option associated with a future occurrence associated with the transmission event in detectable proximity of the user device.

In some embodiments, user characteristic data includes historical wager data associated with at least one of: i) accepted wager offers and ii) declined wager offers.

In some embodiments, the event data includes at least one of: i) upcoming transmission event information; ii) wager opportunity data associated with upcoming transmission events; iii) event information; iv) promotion information; v) user activity information; and vi) user consumer data.

In some embodiments, the plurality of event data sources includes at least one of: i) a broadcast service; ii) a gaming operator of real-time bet markets for live sport events; iii) an event data service; iv) a user activity service; and v) a consumer data service.

In some embodiments, identifying the user engagement opportunity includes selecting the user engagement opportunity from a plurality of user engagement opportunities based upon a determined probability of user engagement with the user engagement opportunity. In some embodiments, identifying the user engagement opportunity is based on the user characteristic data and further comprises using a reinforcement learning algorithm applied to a pool of event-specific arrays associated with a live event related to the transmission event that is in detectable proximity of the user device. In some embodiments, the user engagement opportunity is selected from a group consisting of: a recommended offer based on the live event and on user characteristic data common to a plurality of users, a recommended offer based on an overall popularity, a recommended offer based on a context of the live event and the user characteristic data, a recommended offer based on the context of the live event and user characteristic data regarding past behaviors and attributes, an offer that is based on the context of the live event and user characteristic data regarding viewing latency; and an offer to place a wager based on an occurrence during the live event and user characteristic data. In some embodiments, the determined probability of user engagement is based on engagement history data stored in the user characteristic data. In some embodiments, the determined probability is based on a relative popularity of the user engagement opportunity. In some embodiments, the determined probability is based on the relative popularity of the user engagement opportunity among users that are i) associated with the user characteristic data; ii) associated with user characteristic data relating to a different user; or iii) combinations thereof.

In some embodiments, the method comprises causing the interactive content associated with the user engagement opportunity to display on the digital user device in a carousel view comprising a plurality of user selectable engagement opportunities each of which is selected for display based on a respective determined probability of user engagement with the user engagement opportunity. In some embodiments, the method further comprises receiving via the digital user device, a user input request to display a wager opportunity related to interactive content displayed in the carousel view; identifying, on the remote interactive services platform, a plurality of related wager opportunities having a wager element in common with the interactive content displayed in the carousel view; in response to the user input request, causing the digital user device, to sequentially display the related wager opportunities based on user gesture data processed through the software application client; and receiving, through the software application client, a user wager selection from one of: the sequential displayed related wager opportunities and unrelated wager opportunities. In some embodiments, In some embodiments, the wager element in common includes one or more of: a bet type, an individual performer in the event, odds, an elapsed time or remaining time in the event, performance measure of a participant or participating team in the event, and a common statistic relating to the event.

In some embodiments the method further comprises determining a latency between a performance moment in a live event and a detection of the performance moment at the user device. In some embodiments, the latency is determined by comparing a determined time of detection of the performance moment at the user device with an offset-adjusted time of detection of the performance moment at the interactive services platform, wherein the offset-adjusted time of detection is determined by applying an offset value to a determined time of detection of the performance moment at the interactive services platform. In some embodiments, identifying the user engagement opportunity associated with the transmission event is based on the latency.

In some embodiments, the method further comprises receiving, via the software application client, audio-visual data relating to a second one of the plurality of transmission events that is in detectable proximity of the user device; and causing the digital user device to display revised interactive content associated with a second user engagement opportunity associated with the second one of the plurality of transmission events.

In some embodiments, the method further comprises, based on activity data associated with the user characteristic data and event data received from the plurality of event data sources, determining that an alternative live transmission event has a higher probability of user interest than the transmission event that is in detectable proximity of a user device; and transmitting to the user device a message informing the user of the alternative live transmission event.

In some embodiments, the method further comprises, via the remote interactive services platform: fetching a metadata taxonomy from each of the plurality of event data sources, wherein the metadata taxonomy includes event identifying data for each of the plurality of transmission events, and data formatting rules for the respective event data source; fetching, from the plurality of event data sources, raw event data in accordance with the respective metadata taxonomy for the respective event data source; storing, in a data ingest queue, the raw event data as a plurality of raw data event objects; transforming each raw event data object to a normalized event data object in accordance with a schema that includes formatting rules relating to the event data source corresponding to the raw data event object being transformed, the normalized event data object corresponding to a live event; storing the normalized event data object in a data storage queue; publishing each normalized event data object to an event scheduler queue; determining an event start time for the live event corresponding to each normalized event data object; requesting, from one of the plurality of event data sources, live event action data that includes data relating to occurrences taking place at the live event, substantially as they occur; and continuing to request live event action data objects relating to the live event until receipt of a live event action data object indicating that the event has completed.

In some embodiments, the live event data relates to sporting events, and wherein the event identifying data includes at least one of names of teams competing in the event, names of individuals competing in the event, and a name of a venue for the event, and wherein the live event data comprises at least one of play-by-play data and real time statistical data. In some embodiments, requesting the live event action data begins at one of: a specified amount of time prior to a beginning of the event, at the beginning of the event, and during the event. In some embodiments, the live event data relates to wagers regarding the live event; the user engagement opportunity includes a wager opportunity; at least one of the plurality of event data sources is a wagering service; the live event data includes at least one of updated odds, updated prop bet offers, new prop bet offers, and expired wager offers; and continuing to request live event action data objects includes continuing to request live event action data objects relating to wager opportunities relating to the live event. In some embodiments, the method further comprises comparing a first live action data object to a second live action data object to determine whether respective wagers associated with each of the first live action data object and second live action data object have similar properties, and, based on a determination that the first live action data object and the second live action data object have similar properties, associating the respective wagers in a bet family. In some embodiments, the method further comprises pushing to the user device, engagement opportunities associated with the bet family.

In some embodiments, the user characteristic data is associated with a user and includes data about at least one of: i) the user's past behaviors, ii) the user's taste, iii) the user's preferences, iv) the user's previous engagement with previous engagement opportunities, v) an outcome of a previous engagement with a previous engagement opportunity by the user, In some embodiments, the method further comprises using the user characteristic data to rank order user engagement opportunities based on a probability that the user would engage with the user engagement opportunities, and presenting a plurality of engagement opportunities to the user in accordance with the ranked order.

In some embodiments, the software application client is proprietary to a sports betting platform, the interactive services platform server is proprietary to a managed engagement provider that is a third party to the sports betting operator, the user engagement opportunity includes a wager opportunity, and the order includes a wager order; and wherein pushing interactive content associated with the user engagement opportunity to the user device for display on the user device includes pushing from the interactive services platform, for display within the software application client, an interactive user interface element selectable from the digital user device, the interactive user interface element being associated with the wager opportunity identified by the remote interactive services platform. In some embodiments, initiating the placement of an order associated with the user engagement opportunity includes causing a betslip hosted by the sports betting operator to be populated with the wager order. In some embodiments, the event data comprises channel program data, the channel program data comprising at least one of video service provider channel lineups, channel numbers, channel logo images, channel and network unique identifiers, program identifiers, program title, program description, and program duration.

In some embodiments, the event data comprises sporting event data, channel schedule data, and bet data, the method further comprising analyzing a plurality of data elements including at least two of i) the sporting event data, ii) the channel schedule data, and iii) the bet data to determine whether the plurality of data elements relate to the same sporting event, and, upon a determination that the plurality of data elements are related to the same sporting event, associating the plurality of data elements; determining whether the transmission event in detectable proximity to the user device is the same sporting event to which the plurality of data elements are related; and presenting a bet offer associated with the bet data via the user interface on the user device.

In some embodiments, the receiving, via the software application client, audio-visual data includes capturing audio samples from the transmission event that is in detectable proximity of the user device. In some embodiments, the method further comprises converting the audio samples to pattern of speech data, wherein the pattern of speech data comprises at least one of phonemes, utterances, and words; comparing the pattern of speech data to a plurality of candidate patterns of speech each having a time stamp attribute and being associated with a speech data cache having audio content identification information; identifying a match between the pattern of speech data and one of the plurality of candidate patterns of speech; and determining the audio samples as corresponding to the audio content identification information associated with the matched candidate pattern of speech. In some embodiments, pushing interactive content associated with the user engagement opportunity to the user device for display on the user device is based on the match causing the digital user device to simultaneously display content that is different from and associated with the transmission event that is in detectable proximity of the user device. In some embodiments, comparing the pattern of speech data to the candidate patterns of speech occurs at the first user device.

A method for identifying on a first user device, audio content that is playing on a second user device, is disclosed. The method comprises capturing audio samples from the audio content and a time stamp for the captured audio samples; converting the audio samples to pattern of speech data, wherein the pattern of speech data comprises at least one of phonemes, utterances, and words; comparing the pattern of speech data to a plurality of candidate patterns of speech each having a time stamp attribute and being associated with a speech data cache having audio content identification information; identifying a match between the pattern of speech data and one of the plurality of candidate patterns of speech based on the time stamp and the time stamp attribute; and determining the audio content as corresponding to the audio content identification information associated with the matched candidate pattern of speech.

In some embodiments, the speech data cache is located on the first user device and the method further comprises, prior to comparing the pattern of speech data to a plurality of candidate patterns of speech: capturing, at a server remote from the first user device, a plurality of audio samples of each of a plurality of candidate audio content streams; converting, at the server, the plurality of audio samples to the plurality of candidate patterns of speech, wherein each of the plurality of candidate patterns of speech comprises at least one of phonemes, utterances, and words; storing candidate speech data relating to the plurality of candidate patterns of speech in a data store at the server, each of the plurality of candidate patterns of speech associated with the audio content stream in which the candidate pattern of speech appeared, and a time stamp indicating when the candidate pattern of speech appeared in the audio content; transmitting, from the server to the user device over a wide area network, a portion of the data store to the first user device; and incorporating the portion of the data store into the speech data cache.

In some embodiments, the method further comprises filtering the plurality of audio samples of each of the plurality of candidate audio content streams based on a user device hardware type. In some embodiments, the filtering is performed prior to converting the plurality of audio samples, the candidate patterns of speech are associated with the user device hardware type, and the transmitting the portion of the data store includes transmitting the candidate patterns of speech associated with the user device hardware type if the user device hardware type matches a hardware type of the first user device.

In some embodiments, comparing the pattern of speech data to the candidate patterns of speech occurs at the first user device.

In some embodiments, The method further comprises comparing the time stamp for the captured audio samples with the time stamp attribute for the matching candidate pattern of speech, to determine a latency.

A system for delivering interactive user interface elements to a digital user device, via a software application client running on the digital user device, is herein disclosed. the system comprises a remote interactive services platform server coupled to the digital user device over a network. The interactive services platform server is configured to store, on the remote interactive services platform, event data received from a plurality of event data sources, the event data being associated with a plurality of transmission events; and receive, from the software application client, an identification relating to one of the plurality of transmission events that is in detectable proximity of the user device, wherein the one of the plurality of transmission events that is in detectable proximity of the user device is identified based on audio-visual data received at the user device, wherein the audio-visual data comprises at least one of audio data and video data. The interactive services platform is further configured to, based on i) the identification, and ii) the event data, identify a user engagement opportunity associated with the transmission event that is in detectable proximity of the user device. The interactive services platform server is further configured to push interactive content associated with the user engagement opportunity to the user device for display on the user device; receive, via the user device, a user selection associated with the interactive content; and, based on the user selection, initiate a placement of an order associated with the user engagement opportunity.

In some embodiments, the digital user device is associated with user characteristic data on the remote interactive services platform, and wherein interactive services platform server is further configured to identify a user engagement opportunity associated with the transmission event that is in detectable proximity of the user device based on the user characteristic data.

In some embodiments, the remote interactive services platform server is further configured to detect at least one of: i) fingerprint data associated with the one of the transmission events, ii) phoneme data associated with the one of the transmission events; iii) utterance data associated with the one of the transmission events, and (iv) word data associated with the one of the transmission events. In some embodiments, the audio-visual data includes audio data relating to play-by-play accounts of a live sporting event and the interactive content is time-sensitive wager information regarding possible upcoming events at the live sporting event. In some embodiments, the remote interactive services platform server is further configured to analyze the audio-visual data to identify the one of the plurality of transmission events that is in detectable proximity of the user device.

In some embodiments, the transmission event includes a live sporting event and wherein the user engagement opportunity includes a wager option associated with a future occurrence associated with the transmission event in detectable proximity of the user device.

In some embodiments, the user characteristic data includes historical wager data associated with at least one of: i) accepted wager offers and ii) declined wager offers.

In some embodiments, the event data includes at least one of: i) upcoming transmission event information; ii) wager opportunity data associated with upcoming transmission events; iii) event information; iv) promotion information; v) user activity information; and vi) user consumer data.

In some embodiments, the plurality of event data sources includes at least one of: i) a broadcast service; ii) a gaming operator of real-time bet markets for live sport events; iii) an event data service; iv) a user activity service; and v) a consumer data service.

In some embodiments, the remote interactive services platform server is further configured to select the user engagement opportunity from a plurality of user engagement opportunities based upon a determined probability of user engagement with the user engagement opportunity. In some embodiments, the remote interactive services platform server is further configured to identify a user engagement opportunity associated with the transmission event that is in detectable proximity of the user device via the use of a reinforcement learning algorithm applied to a pool of event-specific arrays associated with a live event related to the transmission event that is in detectable proximity of the user device. In some embodiments, the user engagement opportunity is selected from a group consisting of: a recommended offer based on the live event and on user characteristic data common to a plurality of users, a recommended offer based on an overall popularity, a recommended offer based on a context of the live event and the user characteristic data, a recommended offer based on the context of the live event and user characteristic data regarding past behaviors and attributes, an offer that is based on the context of the live event and user characteristic data regarding viewing latency; and an offer to place a wager based on an occurrence during the live event and user characteristic data. In some embodiments, the determined probability of user engagement is based on engagement history data stored in the user characteristic data. In some embodiments, the determined probability is based on a relative popularity of the user engagement opportunity. In some embodiments, the determined probability is based on the relative popularity of the user engagement opportunity among users that are i) associated with the user characteristic data; ii) associated with user characteristic data relating to a different user; or iii) combinations thereof.

In some embodiments, the interactive services platform server is further configured to cause the interactive content associated with the user engagement opportunity to display on the digital user device in a carousel view comprising a plurality of user selectable engagement opportunities each of which is selected for display based on a respective determined probability of user engagement with the user engagement opportunity. In some embodiments, the interactive services platform server is further configured to receive via the digital user device, a user input request to display a wager opportunity related to interactive content displayed in the carousel view; identify, on the remote interactive services platform, a plurality of related wager opportunities having a wager element in common with the interactive content displayed in the carousel view; in response to the user input request, cause the digital user device, to sequentially display the related wager opportunities based on user gesture data processed through the software application client; and receive, through the software application client, a user wager selection from one of the sequential displayed related wager opportunities and unrelated wager opportunities. In some embodiments, the wager element in common includes one or more of: a bet type, an individual performer in the event, odds, an elapsed time or remaining time in the event, performance measure of a participant or participating team in the event, and a common statistic relating to the event.

In some embodiments, the interactive services platform server is further configured to determine a latency between a performance moment in a live event and a detection of the performance moment at the user device. In some embodiments, interactive services platform server is configured to determine the latency by comparing a determined time of detection of the performance moment at the user device with an offset-adjusted time of detection of the performance moment at the interactive services platform, wherein the offset-adjusted time of detection is determined by applying an offset value to a determined time of detection of the performance moment at the interactive services platform. In some embodiments, the interactive services platform server is further configured to identify the user engagement opportunity associated with the transmission event based on the latency.

In some embodiments, the interactive services platform server is further configured to receive, via the software application client, audio-visual data relating to a second one of the plurality of transmission events that is in detectable proximity of the user device; and cause the digital user device to display revised interactive content associated with a second user engagement opportunity associated with the second one of the plurality of transmission events.

In some embodiments, the interactive services platform server is further configured to, based on activity data associated with the user characteristic data and event data received from the plurality of event data sources, determine that an alternative live transmission event has a higher probability of user interest than the transmission event that is in detectable proximity of a user device; and transmit to the user device a message informing the user of the alternative live broadcast.

In some embodiments, the interactive services platform server is further configured to fetch a metadata taxonomy from each of the plurality of event data sources, wherein the metadata taxonomy includes event identifying data for each of the plurality of broadcasts, and data formatting rules for the respective event data source; fetch, from the plurality of event data sources, raw event data in accordance with the respective metadata taxonomy for the respective event data source; store, in a data ingest queue, the raw event data as a plurality of raw data event objects; transform each raw event data object to a normalized event data object in accordance with a schema that includes formatting rules relating to the event data source corresponding to the raw data event object being transformed, the normalized event data object corresponding to a live event; store the normalized event data object in a data storage queue; publish each normalized event data obj ect to an event scheduler queue; determine an event start time for the live event corresponding to each normalized event data object; request, from one of the plurality of event data sources, live event action data that includes data relating to occurrences taking place at the live event, substantially as they occur; and continue to request live event action data objects relating to the live event until receipt of a live event action data object indicating that the event has completed. In some embodiments, the live event data relates to sporting events, and event identifying data includes at least one of names of teams competing in the event, names of individuals competing in the event, and a name of a venue for the event, and wherein the live event data comprises at least one of play-by-play data and real time statistical data.

In some embodiments, the interactive services platform server is further configured to request live event action beginning at one of: a specified amount of time prior to a beginning of the event, at the beginning of the event, and during the event. In some embodiments, the live event data relates to wagers regarding the live event; the user engagement opportunity is a wager; at least one of the plurality of event data sources is a wagering service; the live event data includes at least one of updated odds, updated prop bet offers, new prop bet offers, and expired wager offers; and the interactive services platform server is further configured to continue to request live event action data objects relating to wager opportunities relating to the live event. In some embodiments, the interactive services platform server is further configured to compare a first live action data object to a second live action data object to determine whether respective wagers associated with each of the first live action data object and second live action data object have similar properties, and, based on a determination that the first live action data object and the second live action data object have similar properties, associate the respective wagers in a bet family. In some embodiments, the interactive services platform server is further configured to push to the user device, engagement opportunities associated with the bet family.

In some embodiments, the user characteristic data is associated with a user and includes data about at least one of: i) the user's past behaviors, ii) the user's taste, iii) the user's preferences, iv) the user's previous engagement with previous engagement opportunities, v) an outcome of a previous engagement with a previous engagement opportunity by the user, and the interactive services platform server is further configured to use the user characteristic data to rank order user engagement opportunities based on a probability that the user would engage with the user engagement opportunities, and present a plurality of engagement opportunities to the user in accordance with the ranked order.

In some embodiments, the software application client is proprietary to a sports betting platform hosted by a sports betting operator, the interactive services platform server is proprietary to a managed engagement provider that is a third party to the sports betting operator, the user characteristic data relates to a user account hosted by the managed engagement provider, the user engagement opportunity includes to a wager opportunity, and the order includes a wager order; wherein the interactive services platform server is further configured to push, from the interactive services platform server for display on the digital user device via the client software application, an interactive user interface element selectable from the digital user device, the interactive user interface element being associated with a wager opportunity selected by the remote interactive services platform; and upon detection that the interactive user interface element was engaged on the digital user device, cause a placement of a wager order associated with the wager opportunity, via the sports betting platform. In some embodiments, the interactive services platform server is further configured to cause a betslip hosted by of the sports betting operator to be populated with the wager order.

In some embodiments, the event data comprises channel program data, the channel program data comprising at least one of video service provider channel lineups, channel numbers, channel logo images, channel and network unique identifiers, program identifiers, program title, program description, and program duration.

In some embodiments, the event data comprises sporting event data, channel schedule data, and bet data, wherein the interactive services platform server is further configured to: analyze a plurality of data elements including at least two of i) the sporting event data, ii) the channel schedule data, and iii) the bet data to determine whether the plurality of data elements relate to the same sporting event, and upon a determination that the plurality of data elements are related to the same sporting event, associate the plurality of data elements; determine whether the transmission event in detectable proximity to the user device is the same sporting event to which the plurality of data elements are related; and present a bet offer associated with the bet data via the user interface on the user device.

In some embodiments, the interactive services platform server is further configured to capture audio samples from the transmission event that is in detectable proximity of the user device. In some embodiments, the interactive services platform server is further configured to convert the audio samples to pattern of speech data, wherein the pattern of speech data comprises at least one of phonemes, utterances, and words; compare the pattern of speech data to a plurality of candidate patterns of speech each having a time stamp attribute and being associated with a speech data cache having audio content identification information; identify a match between the pattern of speech data and one of the plurality of candidate patterns of speech; and determine the audio samples as corresponding to the audio content identification information associated with the matched candidate pattern of speech. In some embodiments, the interactive services platform server is further configured to push interactive content associated with the user engagement opportunity to the user device for display on the user device based on the match causing the first user device to simultaneously display content that is different from and associated with the transmission event that is in detectable proximity of the user device. In some embodiments, the interactive services platform server is further configured to compare the pattern of speech data to the candidate patterns of speech occurs at the first user device.

A system for identifying on a first user device, audio content that is playing on a second user device, is disclosed. The first user device is configured to capture audio samples from the audio content and a time stamp for the captured audio content; convert the audio samples to pattern of speech data, wherein the pattern of speech data comprises at least one of phonemes, utterances, and words; compare the pattern of speech data to a plurality of candidate patterns of speech each having a time stamp attribute and being associated with a speech data cache having audio content identification information; identify a match between the recognized pattern of speech data and one of the plurality of candidate patterns of speech based on the time stamp and the time stamp attribute; and determine the audio content as corresponding to the audio content identification information associated with the matched candidate pattern of speech.

In some embodiments, the speech data cache is located on the first user device, the system further comprising an interactive services platform server remote from the first user device. The server is configured to capture a plurality of audio samples of each of a plurality of candidate audio content streams; convert the plurality of audio samples to the plurality of candidate patterns of speech, wherein each of the plurality of candidate patterns of speech comprises at least one of phonemes, utterances, and words; store candidate speech data relating to the plurality of candidate patterns of speech in a data store at the server, each of the plurality of candidate patterns of speech associated with the audio content stream in which the candidate pattern of speech appeared, and a time stamp indicating when the candidate pattern of speech appeared in the audio content; and transmit, to the user device over a wide area network, a portion of the data store to the first user device. In some embodiments, the first user devices is further configured to incorporate the portion of the data store into the speech data cache.

In some embodiments, the interactive services platform server is further configured to filter the plurality of audio samples of each of the plurality of candidate audio content streams based on a user device hardware type. In some embodiments, the interactive services platform server is further configured to filter prior to converting the plurality of audio samples, the candidate patterns of speech are associated with the user device hardware type, and transmit the candidate patterns of speech associated with the user device hardware type if the user device hardware type matches a hardware type of the first user device.

In some embodiments, the first user device is configured to compare the pattern of speech data to the candidate patterns of speech. In some embodiments, the first user device is configured to compare the time stamp for the captured audio samples with the time stamp attribute for the matching candidate pattern of speech, to determine a latency.

BRIEF DESCRIPTION OF THE DRAWINGS

The foregoing summary, as well as the following detailed description of embodiments of the System and method for recognizing audiovisual context to recommend targeted interactive contextual transitions offers and enhancements, will be better understood when read in conjunction with the appended drawings of exemplary embodiments. It should be understood, however, that the invention is not limited to the precise arrangements and instrumentalities shown.

In the drawings:

FIG. 3I is a method chart of the process of FIG. 3G, in accordance with an exemplary embodiment.

FIG. 3J shows the text of certain audio from a football game laid out over a six second time period, in accordance with an exemplary embodiment.

FIG. 3K is a representation of a typical stream of phonemes from a reference source in the process of matching with an unknown source from a client device. The chart shows that sometimes the unknown phoneme stream leads the same audio from the reference source, sometimes the two streams match in time and other times the candidate stream lead the unknown, though over time the two streams, if of the same program source, will maintain relative time alignment, in accordance with an exemplary embodiment.

FIG. 3L is a chart diagram of known and unknown phoneme streams where first the known (candidate) stream is applied as the reference to test against the unknown stream in an attempt to identify the unknown stream, in accordance with an exemplary embodiment.

FIG. 3M is a chart diagram of the inverse test conducted simultaneously with the test of FIG. 3L. The inverse test of setting the unknown stream as the reference to test against the known data stream. This test or the test of FIG. 3L will prevail if the unknown is of the same source as the candidate, in accordance with an exemplary embodiment.

FIG. 3N is a table of phoneme values of Candidate and Unknown phoneme streams showing the variation in position of the matching elements, in accordance with an exemplary embodiment.

FIG. 3O is a chart diagram of the step-by-step process of testing one phoneme to another and using a constrained look ahead of up to three additional positions in the search for a match, in accordance with an exemplary embodiment. When a match is found at other than the initial position, an index is updated to realign the two streams for the next match test.

FIG. 3Q is a chart diagram of an exemplary data structure representing entries in the speech data cache of phonemes and corresponding timestamp and a program source identifier for an audiovisual broadcast, in accordance with an exemplary embodiment.

FIG. 4B is a chart diagram of an exemplary data structure representing a data structure from a live sport/event data provider feed ingested by the real-time live sport/event data ETL system, in accordance with an exemplary embodiment.

FIG. 4C is a chart diagram of exemplary data structures of event data metadata taxonomies representing data from various sports leagues from the real-time live sport/event data ETL system, in accordance with an exemplary embodiment.

FIG. 4D is a chart diagram of exemplary data structures of data objects from the events data storage queue inside the real-time live sport/event data ETL system, in accordance with an exemplary embodiment.

FIG. 4E is a chart diagram of exemplary data structures of the events data schema data registry inside the real-time live sport/event data ETL system, in accordance with an exemplary embodiment.

FIG. 4F is a chart diagram of an exemplary scheduled_events_today data structure used by the real-time live sport/event data ETL system, in accordance with an exemplary embodiment.

FIG. 6C is a chart diagram of an exemplary data structure of user observation arrays used by the widget recommendations generation system, in accordance with an exemplary embodiment.

DETAILED DESCRIPTION

Figure 1A:
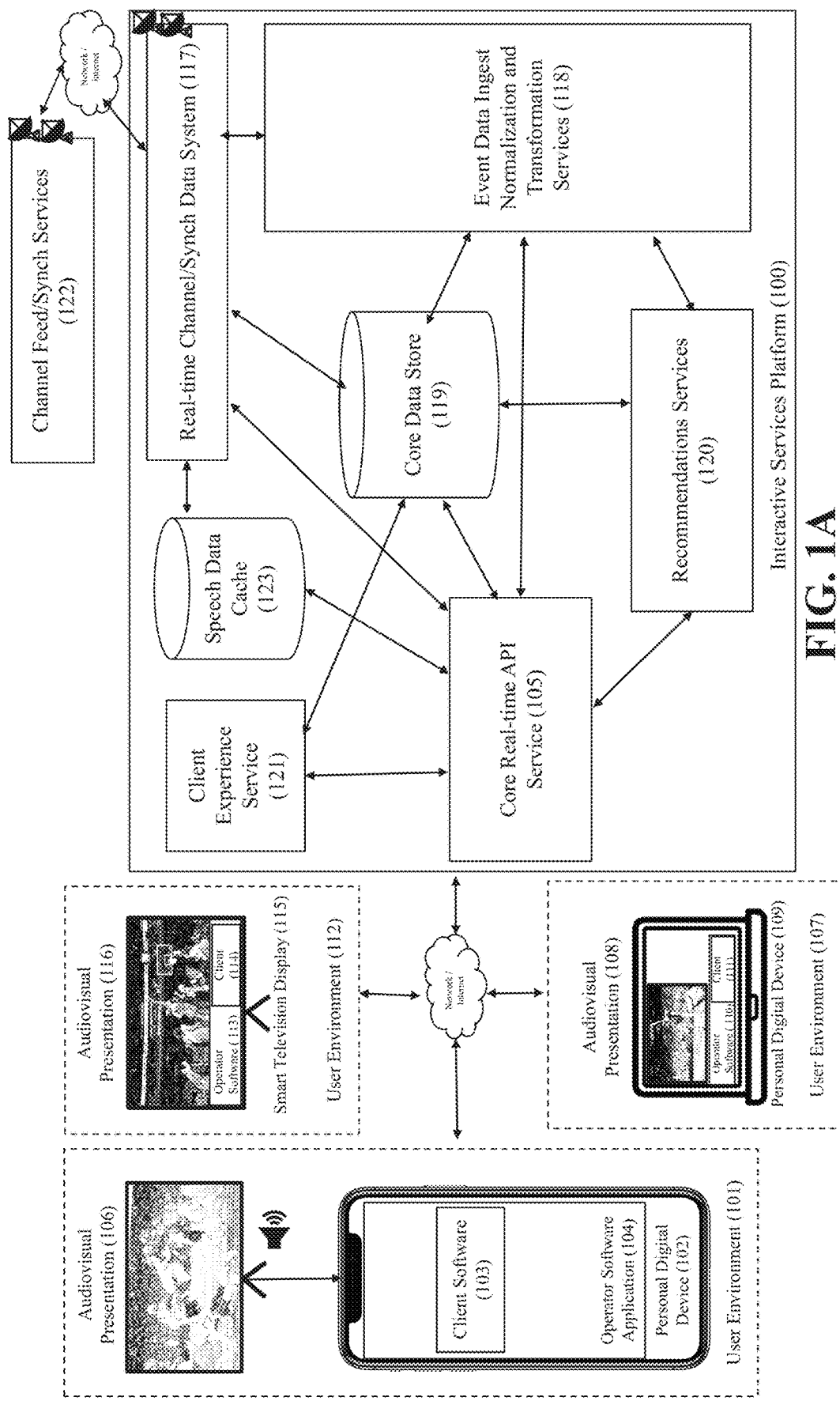
FIG. 1A is a systems diagram illustrating exemplary user environments where the client software may be run and the major systems that comprise the interactive services platform, in accordance with an exemplary embodiment.

The terminology used herein is for the purpose of describing particular embodiments of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In describing the disclosed embodiments invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

In some embodiments, interactive digital experiences, apparatuses, and methods for combining, synthesizing, analyzing, transforming and utilizing datasets for the purpose of predicting the display of interactive offers and messages that will solicit maximum satisfaction and engagement from a user are discussed herein. In the following description, for purposes of explanation, numerous specific details are set forth in order to provide a thorough understanding of the present invention.

One benefit of certain embodiments of the disclosed system is to enable the application on the user's device to recognize not only the live audiovisual event being watched and/or listened to by the user, but also to understand the latency of the delivery of the audiovisual signal of the event between the actual event taking place when it is first captured by signal capture equipment at the venue and when it is finally presented to the viewer. This is to ensure that additional content intended to be seen or interacted with synchronously to moments occurring in the live event occur at the right time so as not to either "spoil" the moment for the user by showing information too soon or be obsolete by showing information too late such that it is no longer relevant. In most scenarios, the application on the user's device does not inherently know which event is being viewed by the user and, perhaps more importantly, what the latency is for that user; thus, the application may utilize a highly robust method of detection of the live audiovisual event to determine this vital information.

Some approaches to audiovisual content detection are commonly known in the media industry as "automatic content recognition" or "ACR," whereby the audio of a televised program is captured by a microphone and software running on a client device as digital samples which are then transformed into smaller data expressions of the frequencies contained in the sample known as "fingerprints." The fingerprints are then transmitted by the client to a central server containing a database of fingerprints extracted from many audiovisual programs and events. A software process on the server searches the database to find a probable match for the fingerprints and if a match is found it returns associated program guide data and timestamps identifying the content to the client.

Some ACR approaches requires converting and storing audio from the programs into lower fidelity fingerprints which content owners might argue represents a stored representation of their intellectual property, requiring costly license fees from the operator in order to secure the rights. Additionally, centralized architecture may require "noisy" Internet-based messaging of clients sending fingerprint data to central servers for responses, which at larger scale can introduce heavy volumes of continuous traffic, affecting Internet communications and resulting in slower recognition time. Additionally, the approaches typically require searches with fingerprints across a large database of content "moments" which could require either slower-than-required processing time on the server, negatively affecting the user experience, or enhanced compute resources on the server which can grow costly to operate as the service scales.

While it might be challenging to improve upon the traditional "ACR" solution for scenarios requiring the recognition of a myriad of content types and sources, the introduction of constraints, such as a focus on live sports event content, enables a new approach to audiovisual content recognition to be possible. In one embodiment, there is a preponderance of spoken word content in sports event content. That content may be in the form of the practice of "sportscasting" whereby a knowledgeable announcer or sportscaster describes the play-by-play action of the sports event in detail continuously throughout the sport event, usually with limited pauses or interruptions, regardless of the sport, event, or even language of the sport event coverage.

In some embodiments, this approach deconstructs and represents the audio of a broadcast sport event using representations of the speech sounds being spoken by the sportscaster, such as text strings known as "phonemes" representing these sounds, utterances, or even representations of the words themselves. Because these text strings are a relatively miniscule amount of data next to audio samples, video samples, or even ACR fingerprint data, a continuous "stream" of speech data such as phonemes, such as what might be captured to represent the audio from a livestream of a sport event, can be easily combined or "multiplexed" with similar speech data streams created based on a number of simultaneously occurring live sport events as might be delivered on multiple broadcast television channels simultaneously. The resulting multiplexed stream, feed, or cache of combined speech data spanning a short duration of time can be easily broadcast, multicast, directly delivered to multiple software clients as data objects, or the software clients can be enabled to continuously pull this data directly from a cache, in scenarios where real-time recognition of content is desired.

If on those same software clients there is a similar process running to capture audio from an audiovisual source via a microphone, such as client software running on a mobile phone in the vicinity of a television display, which is running a similar process to capture speech data such as phonemes from the audio source, the client software can then use the speech data to search the multiplexed set of speech data to quickly and easily find the existence of a match, and if a match is found, use program guide data and timestamp data that is referenced by the multiplexed data to confirm with the user that the audiovisual content being viewed is recognized and that the latency (e.g., glass-to-glass latency) from the sports event to the user can be approximated.

Where the search and pattern matching are taking place entirely in the client, and is using textual representations of words spoken, the risk of stored or "recorded" data that could trigger consternation from media licensors is reduced or eliminated. Additionally, by leveraging a potential unicast or multicast approach to delivering the multiplexed speech data feed to be searched with the client application, the solution uses an architecture that is well-suited to Internet networking architecture and thus designed to lower network traffic while improving detection time within the software client. Additionally, due to the nature of "live" content as opposed to pre-recorded content, the value of the content for the user may be in its immediacy, and as well any enhancements or related interactive content, such that there would be no practical need to transmit speech data for moments older than only the most recent timeframe, thus enabling efficiently small amounts of data to be delivered as well as searched.

Given that most forms of audiovisual entertainment content features speech, this solution can be applied to a wider set of content beyond live sports such as spot TV advertisements, live unscripted programs, awards show programs, news, and information content and more. Additionally, the approach works not only in scenarios where users are experiencing audiovisual content on a television display while simultaneously using client software on a mobile phone but can also work where the client is running on the same device as the display of audiovisual content—this can include a personal computer, a connected "smart" TV set, or even an audio-only or "radio" setup such as one or more speakers.

Embodiments of the present invention will now be described by referencing the appended figures. FIG. 1A depicts an overall system architecture according to various embodiments of the present invention. In an exemplary embodiment, an overall system architecture will include both the interactive services platform 100 and a user environment 101 containing a personal digital device 102 containing a microphone and is capable of running software applications and is connected to a communications network, such as the Internet such as a smart mobile device. The personal digital device 102 is running the client software 103 described in the disclosure as including but not limited to a standalone application or as a software library or software development kit that has been integrated with an operator software application 104 where the operator is a provider of interactive services to users such as an online sports betting service. The operator software application 104 may be of a third party with respect to the interactive services platform 100.

In an exemplary embodiment, the client software 103 communicates with the interactive services platform 100 over a communications network such as the Internet using a dedicated core real-time API service 105 which establishes a real-time communication session to fulfill data requests made by the client software 103. In some embodiments the client software 103 is running standalone or as part of an operator software application 104 on a personal digital device 102 that is being used by a user who is also consuming audiovisual content (e.g., audio content, video content, audio and video content) from an audiovisual presentation 106 that could be a separate device from the personal digital device 102 and can include but is not limited to a satellite radio broadcast, television display, smart television display, personal computer, or additional mobile device.

It will be appreciated to one skilled in the art that the present disclosure may apply to a wide number of possible embodiments of user environment configurations that includes but is not limited to user environments 107 where the audiovisual presentation 108 could be an application running on the same personal digital device 109 that is running the operator software application 110 containing the client software 111 such as personal computer with a multi-threaded software environment capable of communicating with the interactive services platform 100 over a communications network such as the Internet, or user environments 112 where the operator software application 113 containing the client software 114 are running on the same device 115 displaying the audiovisual presentation 116 such as a smart television display with a multi-threaded software environment capable of communicating with the interactive services platform 100 over a communications network such as the Internet. In some embodiments the audiovisual presentation 106 could be providing only an audio stream of the content without video, such as an audio streaming or radio application, or be a device including but not limited to a portable radio or smart speaker.

In an exemplary embodiment, the interactive service platform 100 comprises several subsystems including the dedicated core real-time API service 105 which establishes a real-time communication session to fulfill data requests made by the client software 103. The dedicated core real-time API service 105 communicates with the real-time channel/synch data system 117 which facilitates the detection, recognition and synchronization with audiovisual content such as the audiovisual content contained in the audiovisual presentation 106 such as a live sports event, spot advertisement, or television program including the determination of latency between the audiovisual presentation 106 in the user environment 101 and a live event such as a live sports event known as the "glass-to-glass" latency (the time it takes between what occurs in front of the "glass" of the video camera capturing the live event and the time it takes for that occurrence to appear on the "glass" of the user's audiovisual display).

In an exemplary embodiment, the interactive services platform 100 includes one or more event data ingest normalization and transformation services 118 which ingest and synthesize data from a wide variety of disparate data sources and normalize it in a single core data store platform 119. Single core data store platform 110 may include one or more data stores and caches that can include but may not be limited to data describing the live event being viewed such as sports player data or spot advertising delivery schedule files, electronic program guide data, transactions surrounding the event such as live sports bet offers, data describing the past behavior of users such as data describing how they behaved when viewing similar events, data of possible promotional offers that could be made to users such as discounts coupons and rewards, and consumer behavior data about the user's tastes preferences background and habits that could be accessed from a variety of available data sources based on data tokens, cookies and unique user, device and network identifiers.

The interactive services platform 100 can also include recommendation services 120 that apply prediction and recommendation algorithms to the combination of contextual live event data detected by the client software 103 and the recognition subsystem 117 with the data about the event and user from the core data store 119 to select and present personalized interactive offers and transactions such as live sports betting opportunities that are predicted to maximize engagement from them. In some embodiments, these recommended offers and transactions are enhanced by the client experience service 121. For example, the recommended offers may_incorporate interesting and engaging stats and imagery from the event and formatted to suit the user's digital device 102 and the operator software application 104 which contains the client software 103 and is then pushed to the client software in synchronization with the audiovisual presentation 106 taking into account the latency (e.g., glass-to-glass latency) between the audiovisual presentation 106 and the live event itself such that the experience is consistent and contextually relevant.

In an exemplary embodiment, the audiovisual presentation 106 is within audible range of the personal digital device 102 such that the microphone of the personal digital device 102 can capture audio samples of the audiovisual content from the audiovisual presentation 106. In some embodiments, the client software application 103 upon being prompted either manually by the user or via an automated means begins capturing samples (e.g., audio samples) from the audiovisual presentation 106 via the personal digital device 102 microphone. In some embodiments, the client software application 103 then runs a utility (e.g., software algorithm) for analyzing the audio samples. In some embodiments, such as those discussed in more detail below, the utility further converts the captured samples to pattern of speech data such as a string of phonemes, utterances or words using a process substantially similar to a process used by the real-time channel/synch data system 117 which is receiving audiovisual content signals from multiple channel feed/synch services 122 (including but not limited to broadcast television networks, cable/satellite channels and Internet-based live streaming services) that may include the same audiovisual content from the audiovisual presentation 106.

In an exemplary embodiment, while it is capturing audio, the client software application 103 also accesses a broadcast data feed or pulls from a cache 123 a set of data tables containing speech data, event data and time data extracted from the channel feed/synch services 122 by the real-time channel/synch data system 117. In an exemplary embodiment, the client software application 103 then uses a pattern matching algorithm (an example of which is described below) to search for a match with probability above a specified threshold in comparison between the converted speech data pattern from the audiovisual presentation 106 and speech data patterns present in the speech data prepared by the real-time channel/synch data system 117.

In an exemplary embodiment, if the client software application 103 finds a match in its comparison between the converted speech data pattern from the audiovisual presentation 106 and speech data patterns present in the speech data extracted by the real-time channel/synch data system 117 it stores reference data including a program or event ID and timestamp of approximately when the speech was spoken live that was mapped to the matching speech data pattern source as well as timestamp data of when the speech data was extracted by the client software application 103. The program or event ID and timestamp data is sent to the interactive services platform 100 together with the member ID and the core real-time API service 110 uses that data to retrieve recommendations of interactive transactions such as bet offers and promotional offers from the recommendations services 120 that are enhanced by the client experience service 121 for the client software application 106 to format and display the transactions and offers as interactive graphical elements to the user.

There are a variety of alternative methods known to those skilled in the art for the personal digital device 102 to establish a connection to the audiovisual presentation 106 for the purposes of content recognition by the client software 103 depending on the user environment 101. In some embodiments, the audiovisual presentation 106 is within audible range of the personal digital device 102 such that the microphone of the personal digital device 102 can record audio samples of the audiovisual content from the audiovisual presentation 106 which can be converted to audio fingerprint data by the client software 103 and communicated to the interactive services platform 100 via the core real-time API service 105 for recognition by an internal audio-based automatic content recognition ("ACR") system or an external service such as GRACENOTE, DATTRACK, BEAGRID and other ACR services known to those skilled in the art.

In some embodiments, the audiovisual presentation 106 is within audible range of the personal digital device 102 such that the microphone of the personal digital device 102 can record audio samples of the audiovisual content from the audiovisual presentation 106 and can be analyzed by the client software 103 and communicated to the interactive services platform 100 via the core real-time API service 105 for recognition through an internal or external service which provides detection of the presence of an audio watermark, tone or unique audio profile such as the voice of a commentator.

In some embodiments, the audiovisual presentation 106 can be within visual range of the personal digital device 102 such that the camera of the personal digital device 102 can record video samples of the video content from the audiovisual presentation 106 which can be converted to video fingerprint data by the client software 103 and communicated to the interactive services platform 100 via the core real-time API service 105 for recognition by an internal or external video-based ACR service.

In some embodiments, the audiovisual presentation 106 can be within visual range of the personal digital device 102 such that the camera of the personal digital device 102 can record video samples of the audiovisual content from the audiovisual presentation 106 and can be analyzed by the client software 103 and communicated to the interactive services platform 100 via the core real-time API service 105 for recognition through an internal or external service which provides detection of the presence of a video watermark, QR code, network or team logo, or other visual content identifiers.

In some embodiments, the audiovisual presentation 106 can be used in conjunction with a television provider software application or an electronic program guide software application either running on the audiovisual presentation device 106 itself or a connected device such as a cable set-top box such that there is communication directly between the audiovisual presentation 106 software and the client software 103 over a communication network inside the user environment 101 including but not limited to Wi-Fi, Bluetooth, or Infrared where the audiovisual presentation 106 software can provide data directly to the client software 103 about the audiovisual content.

For the sake of clarity, the following description pertains to a scenario described above where the personal digital device 102 can record audio samples of the audiovisual content from the audiovisual presentation 106 which are converted to speech data by the client software 103 such as phonemes, utterances, or other textual representations of speech sounds and compared with speech data patterns present in the speech data prepared by the real-time channel/synch data system 117 to identify the content source and determine the latency between the audiovisual content and the live event itself. It will be appreciated to one skilled in the art, however, some of the embodiments described herein could be practiced using other ACR techniques.

Figure 1B:
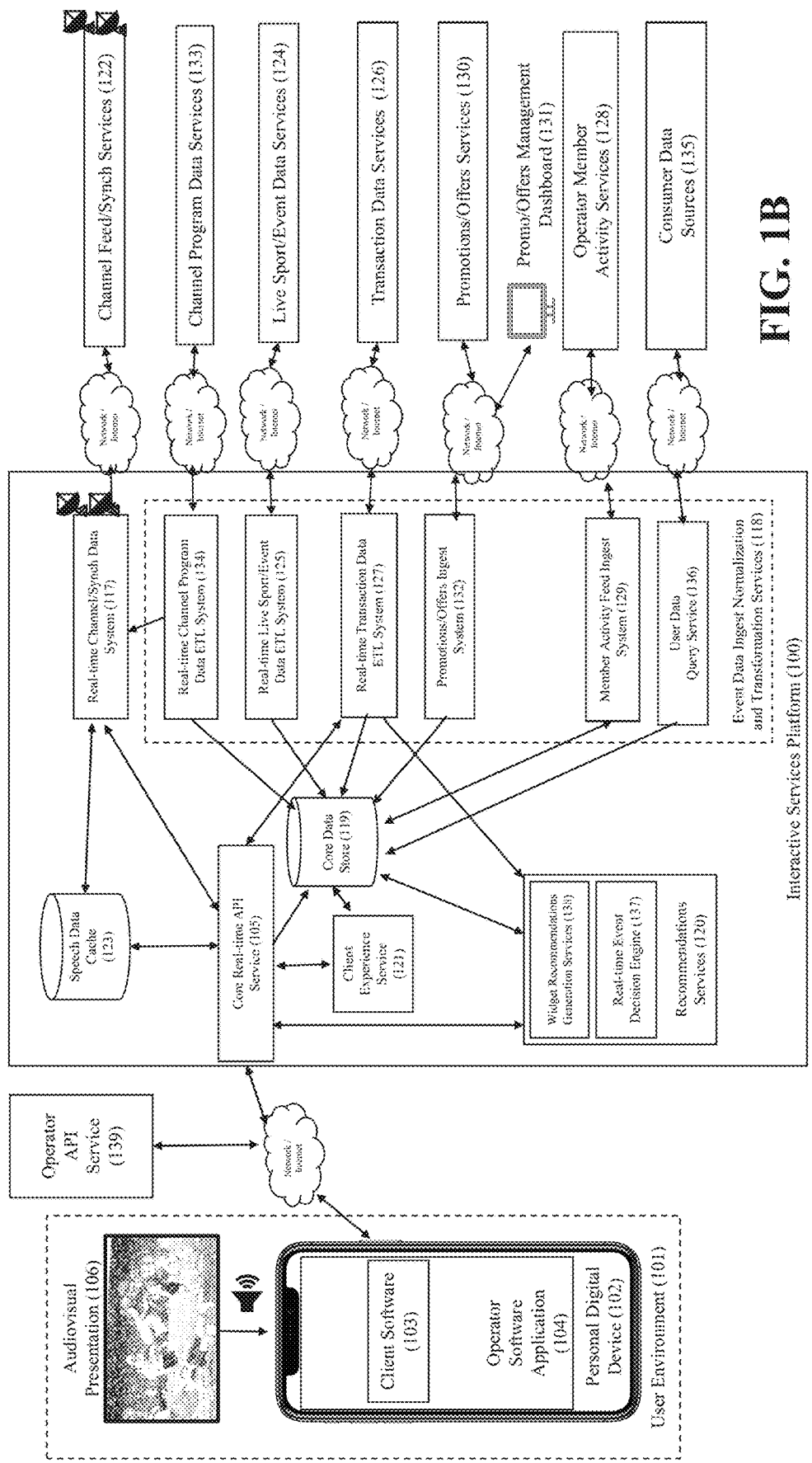
FIG. 1B is a systems diagram illustrating the subsystems of the event data ingest normalization and transformation services and recommendations services, in accordance with an exemplary embodiment.

FIG. 1B illustrates services within the event data ingest normalization and transformation services 118 preparing data ahead of a live interactive event such as a sports wagering event. In an exemplary embodiment, the event data ingest normalization and transformation services 118 retrieves data about upcoming live events such as live sports events including but not limited to the details about the venues, teams and players for those events over a communications network such as the Internet from a variety of live sport/event data sources 124 including providers such as SPORTRADAR, DELATRE, GRACENOTE, STATS PERFORM. In some embodiments, there is at least one source of sports event data 124 that may include but is not limited to team data, player data, score data, stats for detailed events that have taken place prior to or during the game, image data including player and team logo images, program ID and channels providing coverage of the event, and other detailed data surrounding the sports event. In some embodiments there is a dedicated real-time live sports/event data ETL system 125 which ingests, normalizes, stores and schedules this data from multiple live event data sources 124 into the core data store 119.

In an exemplary embodiment, the event data ingest normalization and transformation services 118 pulls data about transactions related to live events such as future bet markets and bet offers including but not limited to bet details and wagering odds for upcoming live events such as live sports events over a communications network from a variety of online sports betting operators and sports betting data providers 126 that might include providers such as METABET and KAMBI GROUP. In some embodiments there is a dedicated real-time transaction data ETL system 127 which ingests, normalizes, stores and schedules this data from multiple bet data sources 126 into the core data store 119.

In an exemplary embodiment, the event data ingest normalization and transformation services 118 pulls data about the user's past behaviors, tastes and preferences with operators and service providers with whom the user has registered as a member in one or more operator member activity services 128. Data included in operator member activity service data sources 128 can include but is not limited to past bet opportunities the user has rejected, past bet opportunities the user has taken and the outcome of those bets, as well as many other possible datapoints about the user's behavior with the service provider that can include but are not limited to preferred sport, team, players, devices, bet types, time of day for placing bets, typical amounts wagered and others. In some embodiments there is a dedicated member activity feed ingest system 129 which ingests, normalizes, stores and schedules this data from multiple member activity services 128 into the core data store 119.

In an exemplary embodiment, the event data ingest normalization and transformation services 118 pulls data about promotional offers that are supported by operators and service providers in the form of operator promotions/offers feeds 130. Data included in operator offer feeds 130 can include but are not limited to discount offers, trial offers, sweepstakes, coupons, bonuses and offers designed to help the product or service provider acquire new members, drive engagement including engagement with other product or service areas, or to re-engage lapsed members. In addition to providing this data via a service or feed 130, an operator can also use a graphical user interface known as a promo/offers management dashboard 131 where they can create offers or campaigns that can be targeted to appear in connection with events, timeframes or to users who demonstrate certain behavioral traits. In some embodiments there is a dedicated promotions/offers ingest system 132 which ingests, normalizes, stores and schedules this data from offers/event data sources 130 into the core data store 119. In certain embodiments the promotional offers can be delivered via third party systems such as dynamic advertising servers on behalf of a range of advertisers and marketers who are not operators or service providers where the digital advertising servers can be among the supported promotions/offers services 130 or may be provided via the promo/offers management dashboard 131.

In an exemplary embodiment, the event data ingest normalization and transformation services 118 pulls data about events that the user might consume as audiovisual content in the audiovisual presentation 106 from a variety of channel program data services 133. These event data sources may include but are not limited to sports event data sources, spot advertising schedules, live event data sources such as concert performances speeches or awards programs, and programming schedule or electronic program guide data sources containing data about channel operators, streaming video platforms, channels and programs. In some embodiments there is at least one source of channel program data 133 that may include but is not limited to video service provider channel lineups, channel numbers, channel logo images, channel and network unique identifiers, program identifiers, program title, program description, program duration, program rating and other detailed data surrounding audiovisual programming. This can include channel program data from program data aggregators such as GRACENOTE and TIVO/ROVI as well as schedule data delivered directly from broadcast/streaming platforms themselves. In some embodiments there is a dedicated real-time channel/program data ETL system 134 which ingests, normalizes, stores and schedules this data from channel program data feed sources 133 into the core data store 119. In certain embodiments, there is at least one source of spot advertising logs which report to the event data ingest normalization and transformation services 118 the schedule of spots slated to air for specific networks which can assist in presenting synchronized offers with spots.

In an exemplary embodiment, the event data ingest normalization and transformation services 118 pulls characteristic data about the user from multiple consumer data sources 135 that provide additional information about the user's behaviors, tastes, preferences, background and past activity that can be used as inputs to the widget recommendation engines to ensure messages and offers are as closely matched to the user's tastes as possible and is a more engaging experience that the user will find satisfying. These consumer data sources may include but are not limited to credit history data, demographics data, purchase history data, household income data, online behavior including websites visited and applications used, and many other datapoints. This data can originate from services such as EXPERIAN, LIVERAMP, ADOBE, SALESFORCE, KOCHAVA, EQUIFAX and other service providers. In some embodiments, there is a dedicated user data query service 136 in the event data ingest normalization and transformation services 118 that ingests, normalizes, stores and schedules this data from sources for consumer data 135.

In an exemplary embodiment, after each service in the event data ingest normalization and transformation services 118 has ingested, synthesized, transformed, and stored data from one of a multiple services, a data normalization service analyzes the data to find common events and event data that have been ingested from independent data sources and normalizes them to consistent reference IDs and data fields, thus establishing connections between them. As an example, a channel program data service 133 may have specific information about which broadcast channels will carry an upcoming NFL football game between the Buffalo Bills and the New England Patriots as well as the scheduled date and time of the game. A sports/event data service 124 will provide specific information about the venue for the game, Gillette Stadium, as well as the team rosters for the Buffalo Bills and the New England Patriots as well as stats and trivia about the teams and their players such as which players have executed the first touchdown plays for games played thus far in the NFL season. An operator bet data service 126 will provide specific individual bet offers for the Bills/Patriots game including the odds for specific outcomes such as the outcome of each running back or wide receiver from each team being the player responsible for the first touchdown of the game. In this example, once the data normalization service has normalized data about the event from the multiple disparate data sources, an interactive bet offer based on which player will score the first touchdown of the game can be shown to a user during the first drive of either the Bills or the Patriots in the Bills vs. Patriots game, where the user can toggle between different players from the roster of the team that is driving at that time, and see relevant stats about the player while also seeing the odds the player will score the first touchdown. The system disclosed herein address the need for creating an enhanced, consistent, and engaging experience for the user across multiple devices 102 and operator applications 104, for multiple event types such as a myriad of sports leagues and schedules, where data is seamlessly incorporated between disparate data sources from multiple unaffiliated providers.

In an exemplary embodiment, the recommendations services 120 is a subsystem containing widget recommendations generation services 138 that synthesize data from multiple sources in advance to formulate recommendations shown simultaneously and in synchronization with live events consisting of combinations of currently available offers and interactive opportunities such as bet opportunities that will yield maximum engagement from the user. In some embodiments this data can include but is not limited to characteristic data about each user's background preferences and tastes as received by the user data query service 136, data about the user's past behavior including previously placed bets as ingested by the member activity feed ingest system 129 and telemetry data of how the user interacted with the client software 103 in past sessions, as well as data about available promotional offers and advertisements as ingested by the promotions/offers ingest system 132, and data about available interactive transactions such as bet markets for future events as ingested by the real-time transaction data ETL system 127.

In an exemplary embodiment, the widget recommendations generation services 138 joins the data from these disparate datasets and applies dimensionality reduction techniques that synthesizes and reduces the entire set of characteristic data from each and every user into a single array of meaningful values called an "observation" for every user that can be used efficiently for unsupervised clustering. This includes algorithms like variance thresholding and principal component analysis to eliminate variables with low variance or dependencies on other variables. In an exemplary embodiment, after building a set of observation arrays for every user based on characteristic data the widget recommendations generation services 138 start multiple services simultaneously which use the observation data for each user and look at future events and offers from the core data store 119 to create multiple arrays of interactive offers such as specific bet offers and promo offer recommendations that are rank ordered based on probability of prompting engagement from the user where each array is formulated using a different recommendation approach. Approaches can include but are not limited to: calculating clusters or segments for groups of users based on common behaviors and determining future bet offers that would be most probable to be taken by members of these segments, calculating popularity of future bets based on the number of members who have already placed those bets, formulating recommendations of promotional offers and bet offers for each user individually based on the observation data as well as behavioral data using techniques like matrix factorization, as well additional machine learning approaches for incorporating a user's past behavior in similar situations to predict which offer, advertisement, interactive message or wager opportunity the user will be most likely to engage with in future events which could be similarly utilized to create additional arrays of rank ordered offers.

In an exemplary embodiment, when a live event is taking place such as a live sports event, a user in a user environment 101 is using their personal digital device 102 while viewing the live sports event as an audiovisual presentation 106 which may be on a television display. They start the operator software application 104 on their personal digital device 102 which in turn starts the client software 103 as a component or SDK or set of software libraries contained within the operator software application 104. The client software 103 uses a communications network such as the Internet to connect to the interactive services platform 100 using the core real-time API service 105 which starts a client communications session. In one embodiment, the personal digital device 102 records audio samples of the audiovisual content from the audiovisual presentation 106 which are converted to speech data by the client software 103 such as phonemes, utterances, or other textual representations of speech sounds and compared with speech data patterns present in the speech data prepared by the real-time channel/synch data system 134 to identify the content source and determine the latency between the audiovisual content and the live event itself.

In an exemplary embodiment, the client software 103 sends data to the core real-time API service 105 including unique identifiers for the user, for the content source and latency which passes the data to the real-time event decision engine 137. Based on the context of the live event understood from the data that is being ingested from the live sport/event data services 124, as well as dynamic information about available transactions that is being ingested from the operator transaction data services 126 as well as the user's latency of the audiovisual presentation 106 behind the live sports event, the real-time event decision engine 137 uses a reinforcement learning algorithm such as a multi-armed bandit algorithm to create an array of recommended offers by selecting from multiple arrays of recommended bet offers and promotional offers in order of rank that have been formulated using multiple techniques. In some embodiments, this can include at least one of the most highly recommended bet offer for the event for the segments of users of which the user is a member (e.g., based on user characteristic data), the most highly recommended bet offer based on the overall popularity of future bets for that event based on the number of members who have already placed those bets, the most highly recommended promotional offer based on the context of the event and the user's characteristic data, the most highly recommended bet offers based on the context of the event and the user's past behaviors and attributes as well as their viewing latency, and/or a bet offer that is likely to expire soon based on the context of the event (e.g., number of runs to be scored in an ongoing inning of a baseball game being viewed in proximity to the user device) and the user's viewing or listening latency for the event.

In an exemplary embodiment, the real-time event decision engine 137 passes this array of offers selected for the user based on the context of the event and their determined latency to the core real-time API service 105 which calls the client experience service 121 to enhance the recommendations with additional data about each transaction from the core data store 119 such as additional stats about the game, teams and players to show to the user including data related to each transaction, as well as related transactions to the transactions that were selected by the real-time event decision engine 176. In some embodiments, the client experience engine 121 also uses templates designed specifically for the user's device 102 type and operator application 104 to convert the data into engaging interactive widgets that can be designed to match the design of the operator software application 104 in which the client software 103 is integrated. In some embodiments, the interactive widget templates and designs within the interactive services platform 100 are applied to transaction and offer data from the real-time event decision engine 137 by the client experience engine 121 which is then delivered to the client software 103 to render and present to the user. This implementation enables the rapid development and deployment of new and improved interactive widgets to users without requiring additional steps such as updating their software. In some embodiments, the interactive services platform 100 delivers the transaction and offer data from the real-time event decision engine 137 directly to the client software 103 whereby the client software 103 and/or the operator application software 104 apply stored interactive widget templates and designs to the data to render and present to the user. In some embodiments, before the client 103 presents transactions to the user, the client can validate using the operator API service 139 that the transactions are still active and capable of being ordered by the user (e.g., transactions based on number of runs in an inning would not be presented after the inning has ended). Depending on the embodiment, the interactive widgets can then be presented in a variety of formats and user interfaces, including a "carousel" format where the user is presented a rail of interactive offers such that they can adjust values of each offer including bet outcomes, bet odds, amounts wagered, and/or opportunity to add the bet to a parlay bet, etc. The user can then activate the offer (e.g., by selecting a GUI feature through the client application), which in turn places an order by adding a bet to their betslip (e.g., managed an operator who has integrated with the client application 103) or engaging with a promotional offer such as applying a bonus to a future bet. In certain embodiments, to help the real-time event decision engine 137 optimize how to weight and order its selection from recommendation approaches to maximize user engagement, the client 103 delivers back to the core real-time API service 105 telemetry data about the user's behavior with the interactive widgets, including but not limited to: transactions activated, transactions rejected, dwell time on transactions or offers, and others.

Figure 2A:
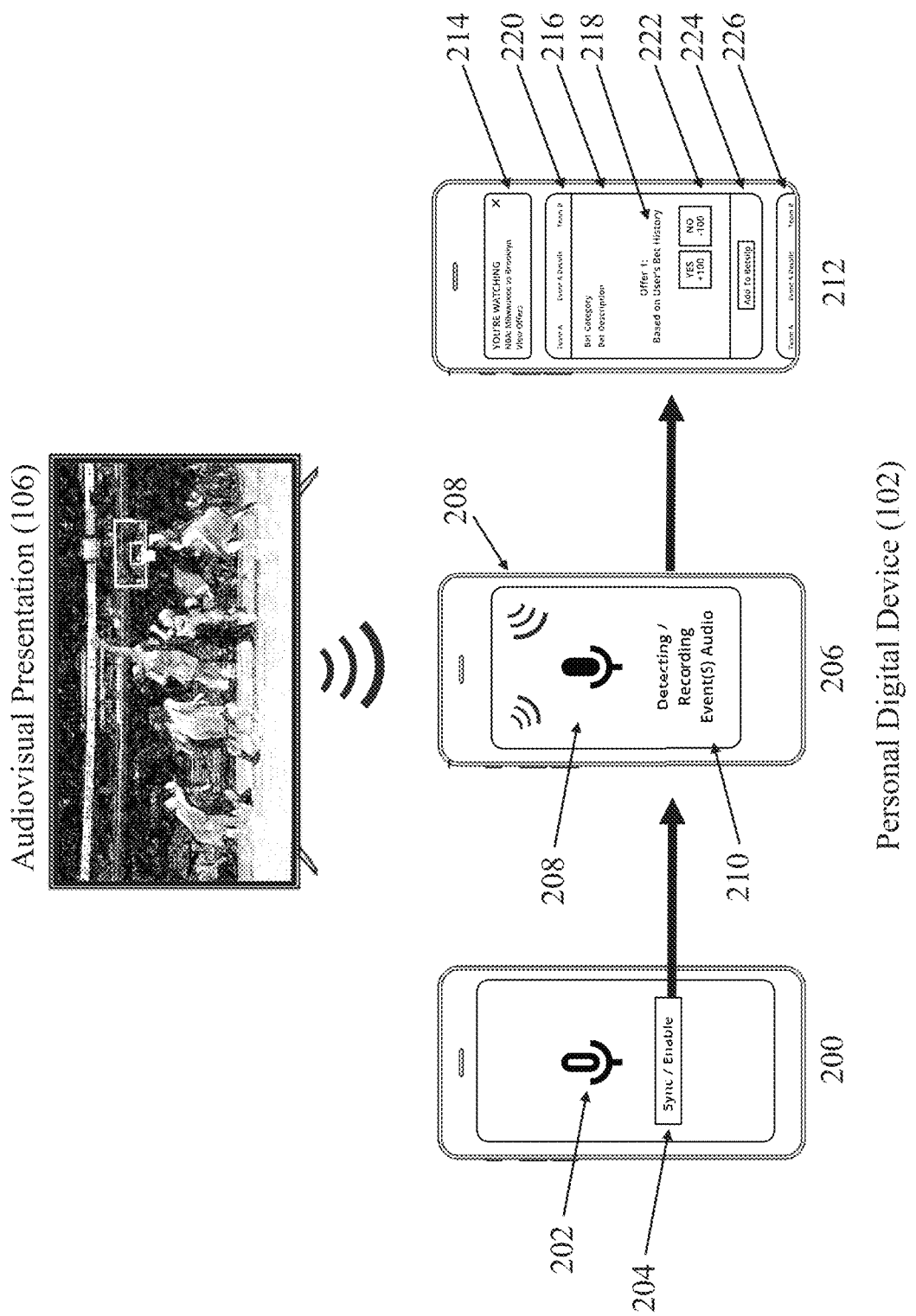
FIG. 2A is a diagram showing an exemplary user interface of the client software as it recognizes an audiovisual presentation and displays a carousel of recommended widgets, in accordance with an exemplary embodiment.

FIG. 2A illustrates an exemplary user experience in accordance with an embodiment of the invention. When a live event is taking place such as a live sports event, a user is using their personal digital device 102 while viewing the live sports event as an audiovisual presentation 106 which may be shown on a television display. The user has started the operator software application 104 on their personal digital device 102 which in turn starts the client software 103 as a component or SDK or set of software libraries integrated with the operator software application 104 which has connected to the interactive services platform 100 which may be operated by a third party outsourced contractor of the operator. The client software 103 can show the user a screen 200 which may contain an interactive element such as a microphone icon 202 or an interactive button 204 inviting the user to activate their microphone to start the recognition process. In an exemplary embodiment, the user initiates the process whereby the personal digital device 102 records audio samples of the audiovisual content from the audiovisual presentation 106 which are converted to speech data by the client software 103 which is shown to the user as taking place in screen 206 whereby the user may be shown graphics and animations 208 or a specific message 210 representing the audio signal being recorded and the speech data conversion taking place.

In an exemplary embodiment, after the captured speech data is compared with speech data patterns present in the speech data prepared by the real-time channel/synch data system 117 and the content source has been identified and the latency (e.g., glass-to-glass latency) between the audiovisual content and the live event itself has been calculated, the information is sent to the interactive services platform 100 which can return descriptive data confirming the channel and sports event the user is watching in the audiovisual presentation 106. The client software 103 can display a screen 212 containing an interactive widget with the descriptive data 214 to confirm to the user that the operator software application 104 is now synchronized with the audiovisual presentation 106. In one embodiment, the user is unaware that that the widget is being identified and pushed to the operator software application 104 through client software. To the user, only the operator software 104 may be apparent. The interactive services platform 100 returns a set of recommended offers and related data based on the user's past behaviors and attributes, the context of the live event, and the user's latency behind the live event which the client software 103 can present to the user in screen 212 as a "carousel" of interactive widgets 216 where a single widget can represent a recommended bet offer 218 combined with additional related stats and information pertaining to the event or the bet offer 220, interactive elements such as buttons or sliders where the user can interact with the offer 222 or place an order by adding it to their betslip 224 or use the interface to scroll to see additional recommended offers 226. Because the client software 103 periodically records audio samples and continues to compare converted speech data to data from the interactive services platform 100, when a user changes the audiovisual presentation such as by changing the channel, the client software 103 adapts to the change and shows the user an updated screen 212 to reflect the new event. New widgets identified as described herein may also be presented based on the new channel being selected and identified.

Figure 2B:
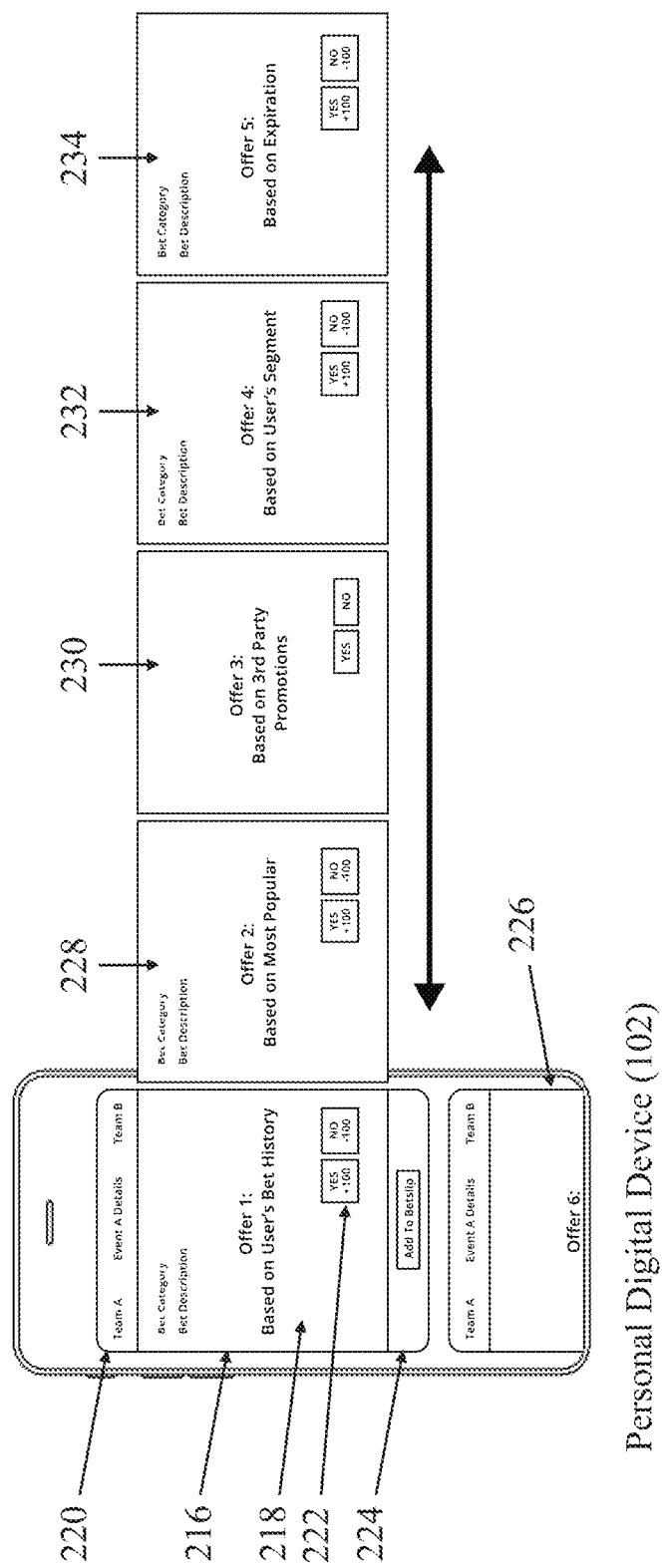
FIG. 2B is a diagram showing an exemplary user interface of the client software demonstrating a carousel of recommended widgets based on a pool of multiple recommendation algorithms as prepared by the real-time event decision engine, in accordance with an exemplary embodiment.

FIG. 2B illustrates an exemplary user experience in accordance with an embodiment of the invention whereby a user who is using the client software 103 as part of the operator software application 104 on their personal digital device 102 has received a set of recommended offers from the interactive services platform 100 which the client application has presented to the user as a "carousel" of interactive widgets 216. In some embodiments the widget carousel is highlighting a single interactive widget with a recommended bet offer 218 combined with additional related stats and information pertaining to the event or the bet offer 220, interactive elements such as buttons or sliders where the user can interact with the offer 222 or place an order by adding it to their betslip 224.

FIG. 2B illustrates an embodiment where the first widget in the carousel 216 that is shown to the user is a bet offer 218 that was selected by the real-time event decision engine 137 as the highest recommended bet offer based on the user's past behaviors, bet history and attributes in conjunction with the event the user is viewing in the audiovisual presentation 106, the context of the event as it pertains to relevant bet offers and the user's viewing latency compared to the live event itself.

In some embodiments the user can apply a defined gesture (e.g., swipe left or right) using their finger on the touchscreen interface of the personal digital device 102 to reveal a second widget in the carousel 216 which can be another bet offer 228 that was selected by the real-time event decision engine 137 as the highest recommended bet offer based on the most popular bets amongst all users in conjunction with the event the user is viewing in the audiovisual presentation 106, the context of the event as it pertains to relevant bet offers and the user's viewing latency compared to the live event itself.

In some embodiments the user can swipe left or right using their finger on the touchscreen interface of the personal digital device 102 again to reveal the third widget in the carousel 216 which can be a promotional offer 230 that was selected by the real-time event decision engine 137 as the highest recommended promotional offer based on the user's past behaviors, bet history and attributes in conjunction with the event the user is viewing in the audiovisual presentation 106, the context of the event, and promotional campaigns and campaign criteria supported by the interactive services platform 100.

In some embodiments the user can swipe left or right using their finger on the touchscreen interface of the personal digital device 102 again to reveal the fourth widget in the carousel 216 which can be a bet offer 232 that was selected by the real-time event decision engine 137 as the highest recommended bet offer based on its likelihood to appeal to the behavioral segment to which the user belongs, in conjunction with the event the user is viewing in the audiovisual presentation 106, the context of the event as it pertains to relevant bet offers and the user's viewing latency compared to the live event itself.

In some embodiments the user can swipe left or right using their finger on the touchscreen interface of the personal digital device 102 again to reveal the fifth widget in the carousel 216 which can be a bet offer 234 that was selected by the real-time event decision engine 137 as the highest recommended bet offer based on it being a property bet or "prop bet" that is likely to expire shortly in conjunction with the event the user is viewing in the audiovisual presentation 106, the context of the event as it pertains to relevant bet offers and the user's viewing latency compared to the live event itself. The user can decide to place one, some, all or none of these bets using a button in the interactive widget such as a button to complete an order by adding to their betslip 224.

In some embodiments after a duration of time has elapsed the widget carousel 216 can move vertically to where a prior carousel is visible 226 so that an even more immediate widget carousel can appear in the same place. In view of this disclosure, it will be appreciated to one skilled in the art that there are many possible embodiments that could be practiced with many possible user interface variations, such as an interface where instead of swiping left or right the user can swipe up or down to reveal another recommended bet offer, where a similar outcome can be achieved.

Figure 2C:
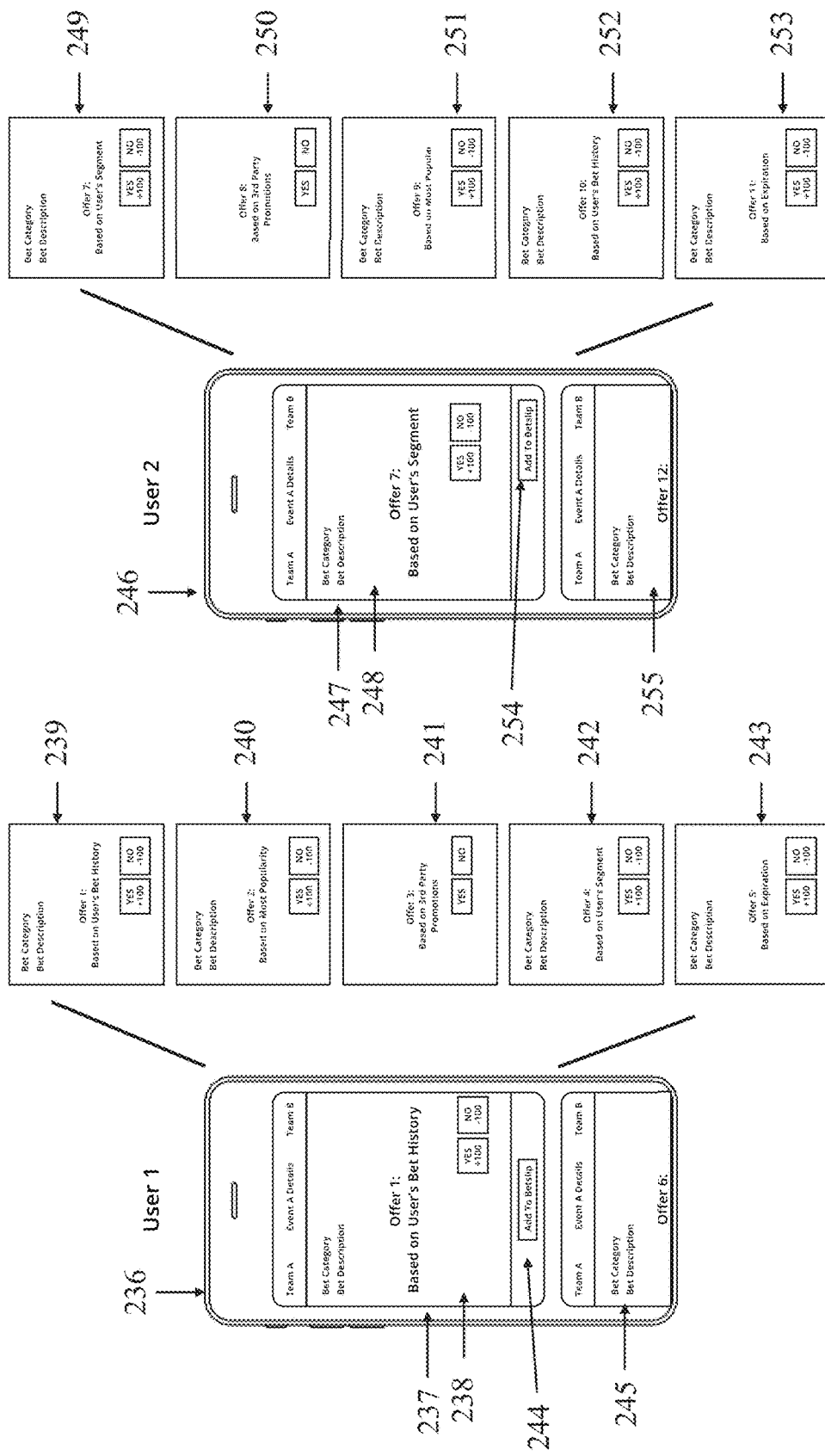
FIG. 2C is a diagram showing an exemplary user interface of the client software demonstrating how two users of the system receive different personalized carousels of recommended widgets prepared by the real-time event decision engine optimized based on their observed behaviors with previous carousels, in accordance with an exemplary embodiment.

FIG. 2C illustrates an exemplary user experience in accordance with an embodiment of the invention that demonstrates the personalized user experiences enabled by the client software 103 and the interactive services platform 100 working in conjunction with the recommendations services 120. In certain embodiments, for every unique user, for every supported live event, the real-time event decision engine 137 draws from a set of arrays of recommended transactions and promotional offers in rank order of where each array for the event has been formulated using a different technique. In certain embodiments, in preparing the array of transactions and promotional offers to present to the user, the real-time event decision engine 137 applies the latency (e.g., glass-to-glass latency) of the user's viewing environment 101 and uses reinforcement learning techniques such as a multi-armed bandit approach or other similar algorithms to identify and/or select which arrays to select recommendations from and in what order to show the recommendations to maximize user engagement. Thus, the experience of one user using her personal device during a live event may differ significantly from that of another user simultaneously viewing the same live event from a different user device in the same location as the first user or in a different location as the first user.

Referring to FIG. 2C, User 1 is watching a live event and using the client software 103 on their personal digital device 236 which has just presented a widget carousel 237 inside of the operator software application 104. For User 1, the real-time event decision engine 137 has decided to make Offer 1 238 the most prominent widget in the carousel, where Offer 1 238 is the most highly recommended transaction offer based on the context of the event and the user's past behaviors and attributes as well as their "glass-to-glass" viewing latency. In this embodiment, if User 1 were to swipe left on their personal digital device 236, Offer 1 238 would disappear from view and Offer 2 240 would be revealed where Offer 2 240 is the most highly recommended transaction based on the overall popularity of available transactions for that event based on the number of members who have already made the same transaction. In this embodiment, if User 1 were to swipe left again on their personal digital device 236, Offer 2 240 would disappear from view and Offer 3 241 would be revealed where Offer 3 241 is the most highly recommended promotional offer based on the context of the event and the user's behaviors and attributes. In this embodiment, if User 1 were to swipe left again on their personal digital device 236, Offer 3 241 would disappear from view and Offer 4 242 would be revealed where Offer 4 242 is the most highly recommended transaction offer for the event for the segment of users of which the user is a member. In this embodiment, if User 1 were to swipe left again on their personal digital device 236, Offer 4 242 would disappear from view and Offer 5 243 would be revealed where Offer 5 243 is a transaction that is likely to expire soon, such as a player prop bet in a live sports event, based on the context of the event and the user's viewing and/or listening latency. In this embodiment the user can decide to place one, some, all or none of these bets using a button in the interactive widget to complete an order by adding to their betslip 244 or can choose to swipe up to show an older widget carousel that was presented 245 which may still have valid transactions for the event.

Referring to FIG. 2C, User 2 is watching the same live event as User 1 and using the client software 103 on their personal digital device 246 which has just presented a widget carousel 247 inside of the operator software application 104. For User 2, the real-time event decision engine 137 has decided to make Offer 7 248 the most prominent widget in the carousel, where Offer 7 248 is the most highly recommended transaction offer for the event for the segment of users of which the user is a member. In this embodiment, if User 2 were to swipe left on their personal digital device 236, Offer 1 248 would disappear from view and Offer 2 250 would be revealed where Offer 2 250 is the most highly recommended promotional offer based on the context of the event and the user's behaviors and attributes (that different, for example, from the first user's behaviors and attribute). In this embodiment, if User 2 were to swipe left again on their personal digital device 236, Offer 2 250 would disappear from view and Offer 3 251 would be revealed where Offer 3 251 is the most highly recommended transaction based on the overall popularity of available transactions for that event based on the number of members who have already made the same transaction. In some embodiments, Offer 3 251 shown to User 2 is the same offer as Offer 2 240 shown to User 1 given that they are for the same event and are based on overall popularity; however given that the display of widgets may be prompted by timing on the software client 103 or manually requested by the user depending on the embodiment, there will be scenarios where they are different as one offer may have been already shown to the user prior to presenting this set of widgets. In this embodiment, if User 2 were to swipe left again on their personal digital device 236, Offer 3 251 would disappear from view and Offer 4 252 would be revealed where Offer 4 252 is the most highly recommended transaction offer based on the context of the event and the user's past behaviors and attributes as well as their "glass-to-glass" viewing latency. In this embodiment, if User 2 were to swipe left again on their personal digital device 236, Offer 4 252 would disappear from view and Offer 5 253 would be revealed where Offer 5 253 is a transaction that is likely to expire soon, such as a player prop bet in a live sports event, based on the context of the event and the user's viewing and/or listening latency. In this embodiment the user can decide to place one, some, all or none of these bets using a button in the interactive widget to add to their bet slip 254 or can choose to swipe up to show an older widget carousel that was presented 255 which may still have valid transactions for the event.

Figure 2D:
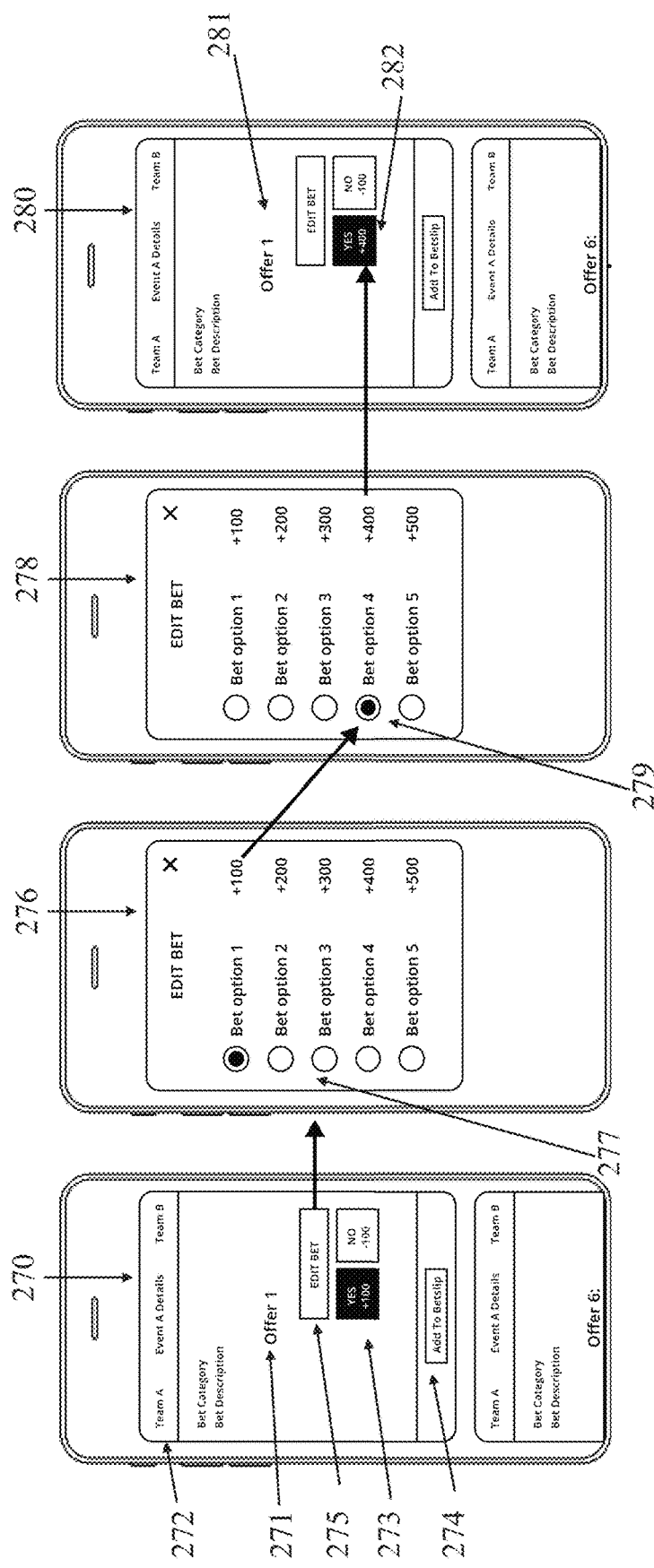
FIG. 2D is a diagram showing an exemplary user interface of the client software demonstrating an example of a user navigating a transaction family to find their preferred transaction, in accordance with an exemplary embodiment.

FIG. 2D illustrates an exemplary user experience in accordance with an embodiment of the invention that demonstrates the unique user experiences enabled by the interactive services platform 100 as a result of the transaction family storage and retrieval system 518 working in conjunction with the real-time event decision engine 137 and core real-time API service 105. A user who is using the client software 103 as part of the operator software application 104 on their personal digital device 102 has received a set of recommended transactions and offers from the interactive services platform 100 which the client software 103 has presented on the user device as a "carousel" of interactive widgets 270. In some embodiments, the widget carousel is highlighting a single interactive widget with a recommended bet offer 271 combined with additional related stats and information pertaining to the event or the bet offer 272 which originated from a live sport/event data service 124, interactive elements such as buttons or sliders where the user can interact with the offer 273 or place an order by adding it to their bets lip 274. The user can not only place a bet based on the bet offer shown 271, but they can also select an "Edit Bet" button 275 and see variations on the bet offer shown 271 that are linked as members of the bet family of bet offer 271. In some embodiments this is shown to the user as in screen 276 as a set of radio buttons with alternate outcomes of the bet offer 277 (e.g., selecting from a roster of football running backs and wide receivers to bet on who would score the first touchdown of the game) while other embodiments may feature a slider for the user to adjust alternate values to the bet offer (e.g., "point spread" values). In screen 278 the user has selected an alternate bet option 279 to the original bet offer 271 and is then taken to screen 280 where the user sees the original widget screen updated to reflect the new alternative bet offer 281 with adjusted options and odds 282.

Figure 2E:
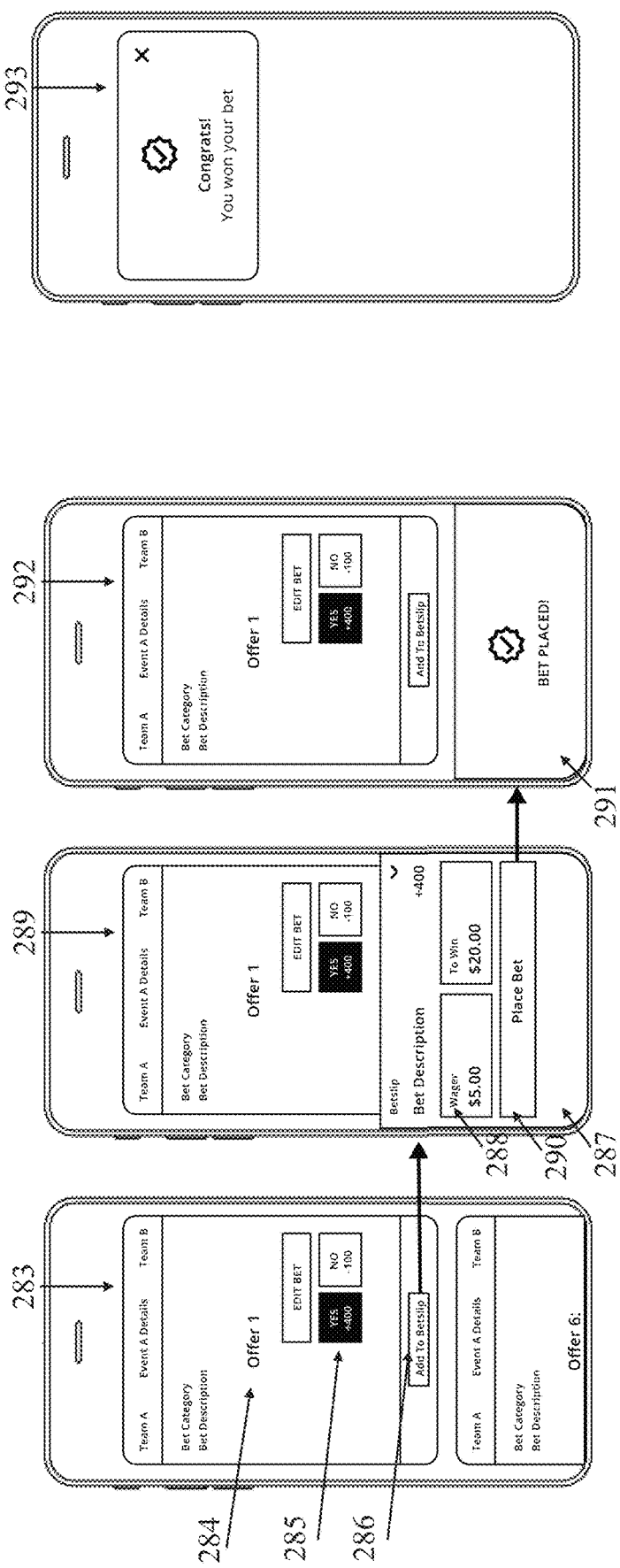
FIG. 2E is a diagram showing an exemplary user interface demonstrating an example of a user placing an order of their preferred transaction with the operator through the client software, in accordance with an exemplary embodiment.

FIG. 2E illustrates an exemplary user experience in accordance with an embodiment of the invention that demonstrates the user of the client software 103 enabled by the interactive services platform 100 completing a recommended transaction through the operator software application 104. In screen 283 the user decides to complete the recommended transaction by adding an alternate bet offer 284 to their betslip with the sportsbook operator application 104 using the "Add to Betslip" button 286. This causes the operator betslip overlay 287 to appear with the data from the transaction passed by the client software 106 where the user can confirm the dollar amount being wagered 288 on the bet offer 284 as shown in screen 289. When the user presses the final "Place Bet" button 290 the transaction is completed by having the order placed through the operator application 104 as shown in overlay 291 in screen 292. This is accomplished due to the client software 106 operating as a component integrated within the operator application 104 as a software component, SDK or set of software libraries used by the operator application 104. As the event plays out, the outcome of bet offer 284 is called and the bet is settled in the user's favor as is shown in 293.

Figure 3A:
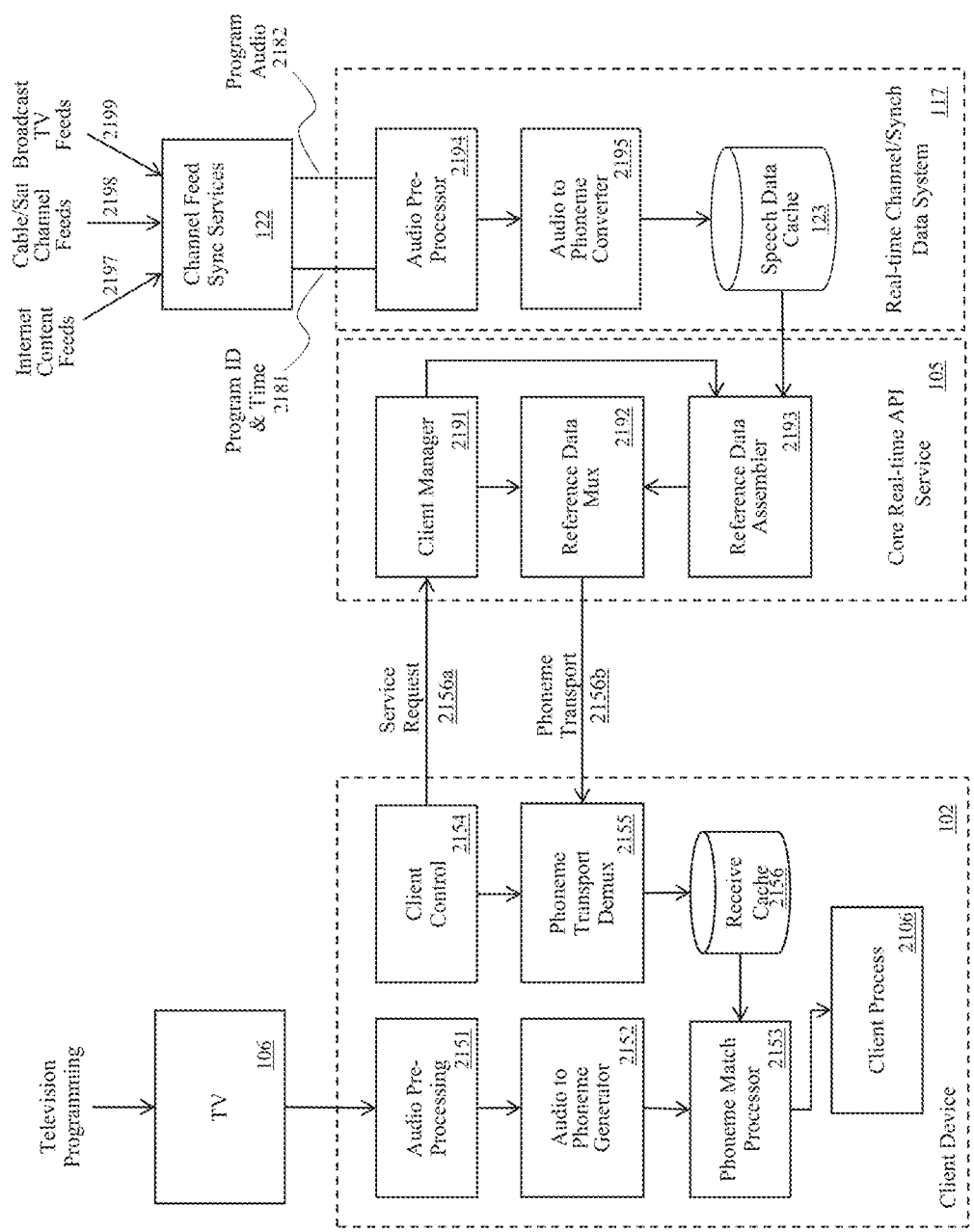
FIG. 3A is a block diagram of the client and server system with the identification process executed by the client, in accordance with an exemplary embodiment.
Figure 3B:
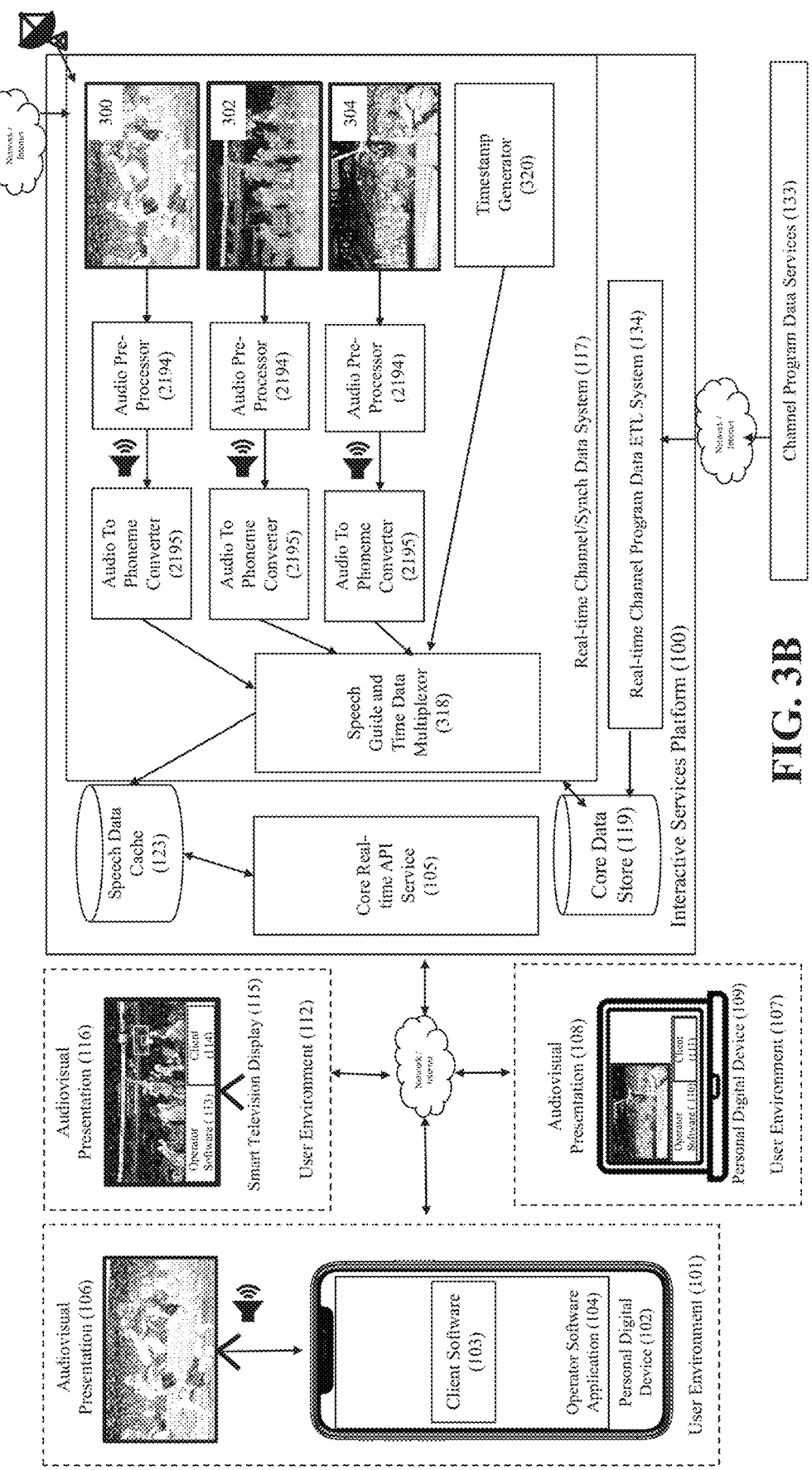
FIG. 3B is a block diagram of three prospective client types that participate in the system where the server aspects of the system are also illustrated, in accordance with an exemplary embodiment.

FIG. 3A and FIG. 3B illustrate the real-time channel/synch data system 117 and how it enables the client software 103 on the client device 102 to search a reference set of speech data provided by the interactive services platform 100 to discover a match to a set of unknown speech data recorded by the client software. The data to be matched is time series data and, in one embodiment, the unknown data is presumed to be within a designated time-window such as, for example only, 30 seconds of the known or reference data. Such processes are useful for certain software systems that may need to identify an unknown audio source to a known audio source, in one example. In a first embodiment, the audio may be acoustic audio received through a microphone of a mobile device or laptop and in another embodiment, the audio signal may be extracted from video programming material received through a digital transport means.

Figure 3C:
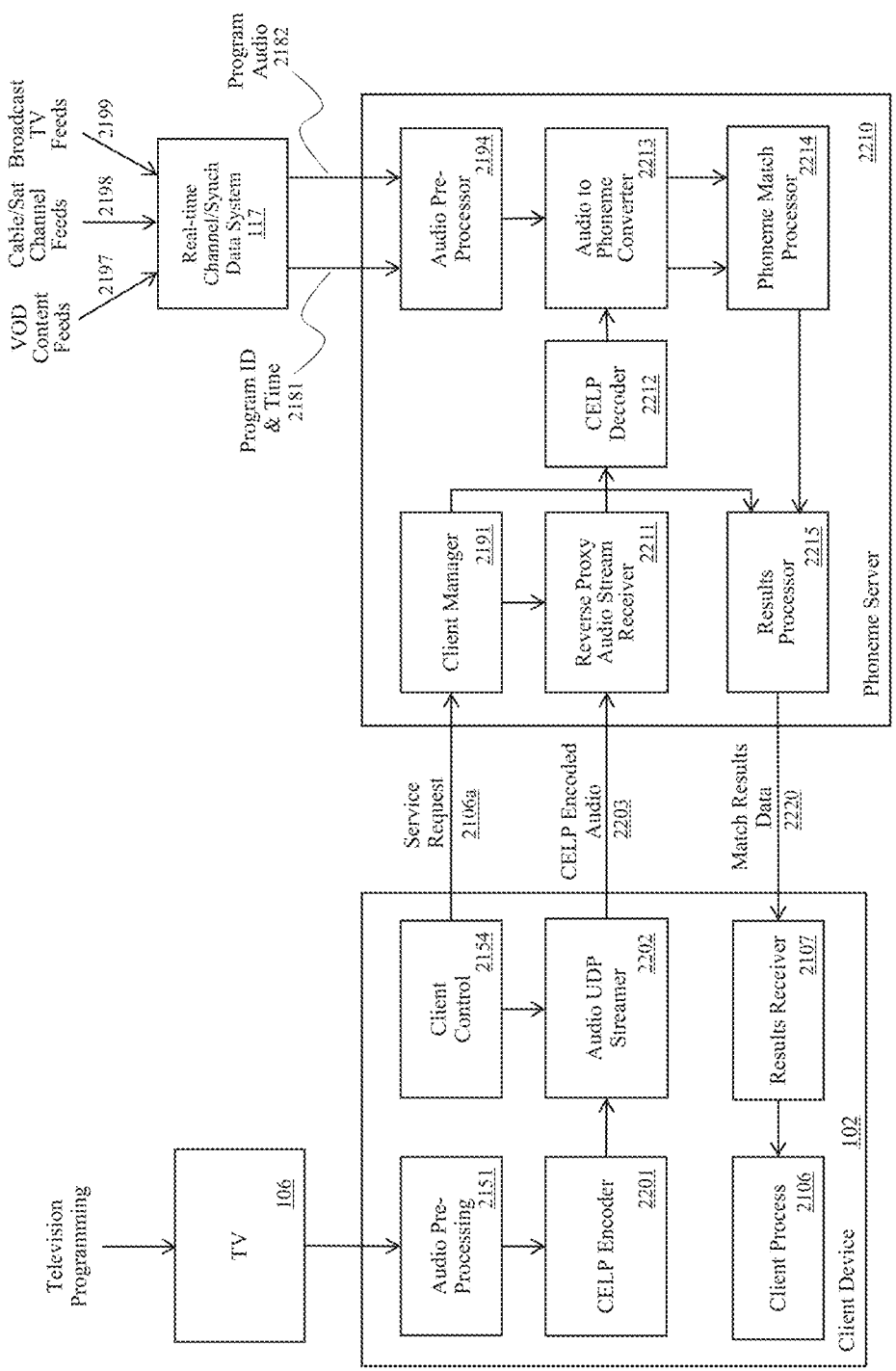
FIG. 3C is a block diagram of the client and server system with the identification process executed by the server. Though the system of this disclosure is optimize for distributed processing by the client, there may be some embodiments where a centralized processing of fingerprints from the client may be advantageous, in accordance with an exemplary embodiment.

In some embodiments, the process of identifying (matching) unknown audio to known or reference audio is performed by the client device 104 as diagrammed in FIG. 3A. In another embodiment of FIG. 3C, the identification is performed centrally in a server environment 2210 where the client provides a stream of audio 2203 to a reverse-proxy audio stream receiver 2211 where the audio stream is highly compressed using, for example only, the code excited linear predictive (CELP) coding method similar in concept to the audio coding as used in mobile phone audio transmission.

The process of identifying the unknown audio in the embodiment of FIG. 3A is by means of matching continuous strings of phonemes which are generated by the initial stages of a speech recognition process but not further processed by either the reference system 2195 or the client system 2152 for the purposes of identifying unknown audio at the client. The elements of the real-time channel/synch data system 117 perform the following server-side tasks; the reference system generates a plurality of phoneme streams from the audio of certain television programming received by input system 122. The sources of television programming can include but are not limited to broadcast television channels 2199 received over the air or any television programming received via cable or satellite TV systems 2198, or programming received or retrieved from streaming Internet-based content servers 2197.

In some embodiments, the received television audio is assumed to be of time-critical value such as live sports programming. The audio is first processed by an audio pre-processor service 2194 then presented to the audio to phoneme converter service 2195 where the outputted phonemes are represented by discrete numerical values and stored in a time-windowed speech data cache 123 which can store a specific number of phonemes in a first in first out (FIFO) database of a size determined by the storage needs of the processes. In one embodiment, the database might hold a few hours to several days of television programming audio in the form of phoneme elements.

In one embodiment, the audio pre-processor service 2194 performs the function of normalizing the audio by first restricting the bandwidth of the audio to the telephone voice range of 300 Hz to 3400 Hz to reduce non-voice audio that would otherwise interfere with the creation of speech phonemes. This function is performed via the audio bandpass filter service 2302. A further step in the process is to limit the dynamic range of the volume of the audio by means of the audio dynamic range compressor service 2303. This step maintains an even volume level of a person speaking which improves the consistency of the phoneme conversion process from any given segment of speech audio. A further step in the pre-processing is the audio pre-distortion processor 2401 which provides a multiplicity of pre-distorted audio outputs for each audio signal input. The pre-distorted signals mimic the distortion caused by the audio received at the client 106 and 122 such as from a mobile phone microphone from personal digital device 104, a laptop microphone from personal digital device 118 or microphone pair. Each output of the pre-distortion processor service 2401 is next applied to a speech filter 2402 as diagrammed in FIG. 3G. The output of 2402 for each input has a processed audio signal and a voice activity detector (VAD) 2601*b* which is applied to the audio to phoneme generator service 2402. The VAD 2601*b* is utilized by the phoneme generator 2402 to gate the conversion process on when voice is present and off when not present to limit spurious data generation in the output phoneme stream for each audio source that is applied.

Figures 3D, 3E:
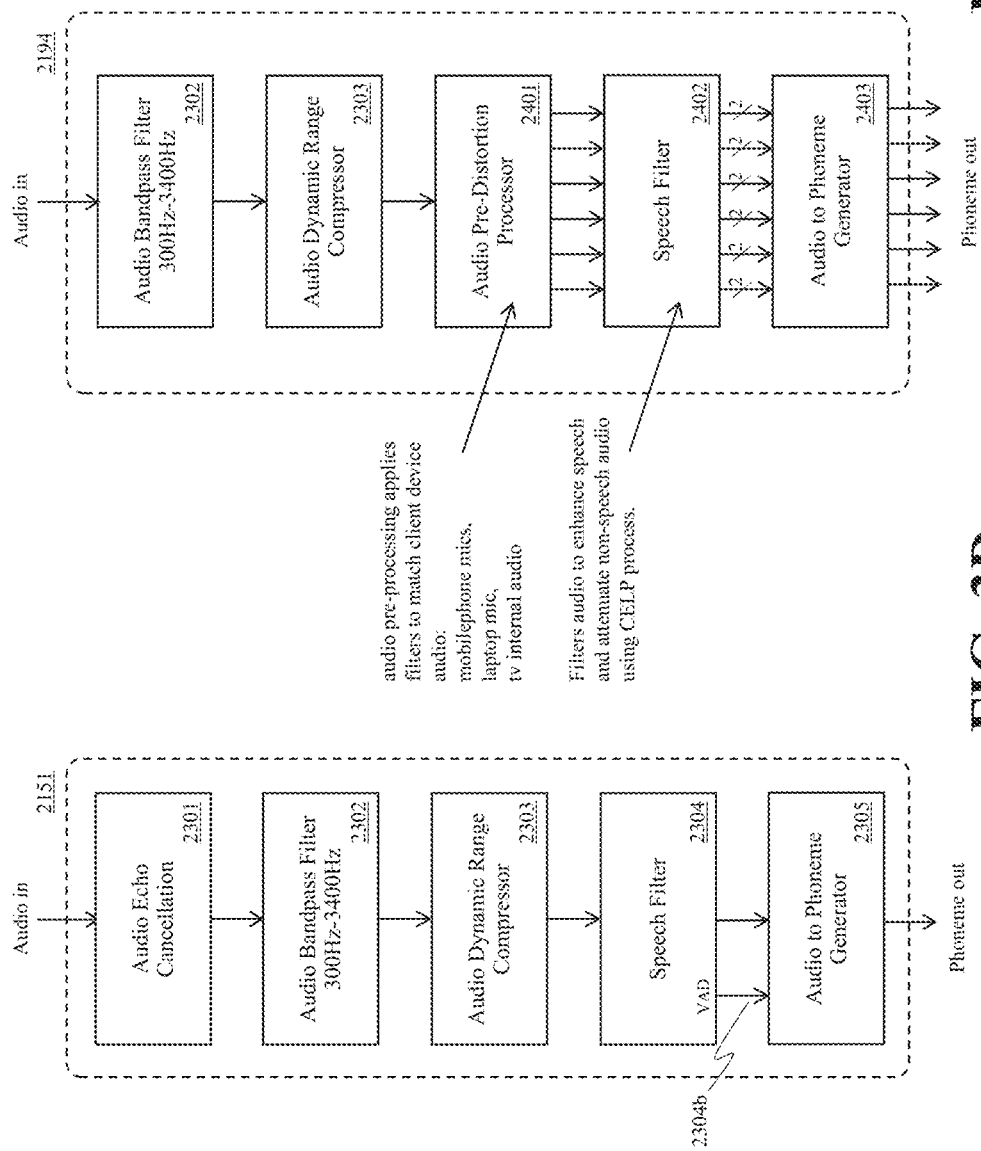
FIG. 3D is a block diagram of the audio pre-processing that is applied to the unknown audio as received by the client, in accordance with an exemplary embodiment.
FIG. 3E is a block diagram of the audio pre-processing that is applied to the reference audio as received by the server system at a process known to the skilled person as ingest where known audio from related television program is acquired for use in the matching system, in accordance with an exemplary embodiment.

In some embodiments, the audio pre-processing 2151 seen in FIG. 3D includes an audio echo cancellation service 2301 which is performed first as the full range of audio available to the system, such as from a microphone on the mobile device, will contain echoes of the audio emanating from a source, such as a television. Audio echoes can disrupt the accurate generation of phonemes from speech and removed, if possible, in some embodiments. The audio room echoes are more accurately detected and removed if done prior to any other audio processing. After echo removal, the audio is reduced in bandwidth to that of the telephone voice range of 300 Hz to 3400 Hz to reduce non-voice audio that would otherwise interfere with the creation of speech phonemes. This function is performed by an audio bandpass filter service 2301. A further step in the process of the audio is to restrict its dynamic range which is done by the audio dynamic range compressor service 2303 which, like its counterpart in the server sub-system 2194, this step attempts to maintain an even volume level of the audio received by the microphones of the personal digital device 104 or 118 which improves the consistency of the phoneme conversion process from any given segment of speech audio. The audio signal is further applied to the speech filter service 2304 the processes of which are further explained below. The output of the speech filter 2304 is finally applied to the audio to phoneme generator 2305 along with a voice activity detector (VAD) 2304*b* gating signal. The audio to phoneme generator 2305 then converts the audio to a stream of phonemes to be used for identifying the unknown audio received by the client device.

Figures 3F, 3G:
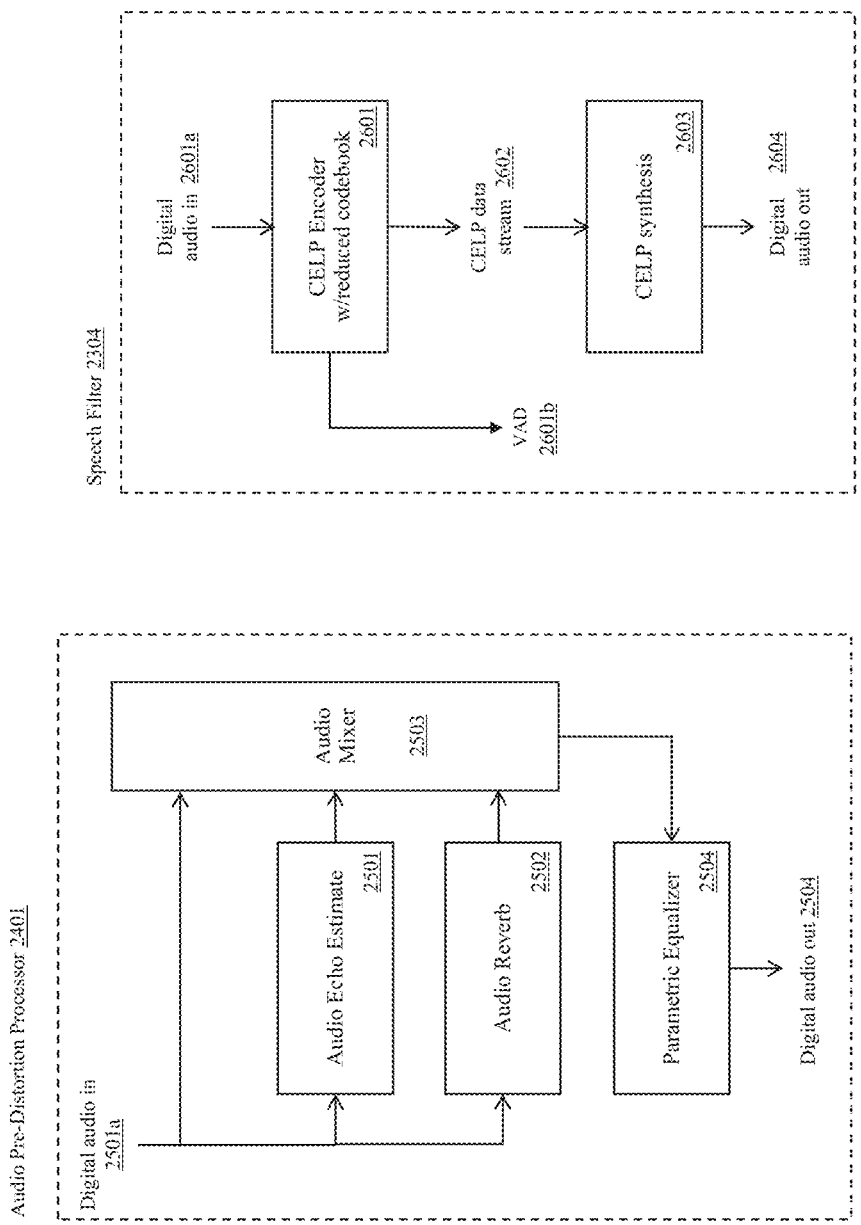
FIG. 3F is a block diagram of the audio pre-distortion processor of the client system, in accordance with an exemplary embodiment.
FIG. 3G is a block diagram of the speech filter utilized by both the client and server processes to remove background noise and isolate the speech signal, in accordance with an exemplary embodiment.

The block diagram of FIG. 3F shows the audio pre-distortion processor 2401 method where some audio echo is generated from the incoming audio and added to the signal to estimate the echo that will remain in the client device even after the echo removal step 2301 above. In a similar step some reverberation is applied by the audio reverb 2502 process to the received audio signal to again estimate the acoustic reverb that would be in a typical home environment from receiving audio from a television viewed at a typical viewing distance in an average sized home living room or TV room. The original audio received by the pre-distortion module 2501*a* is mixed with the echo generated audio 2501 and the reverb generated audio 2505 and mixed by the audio mixer 2503 to a single audio stream with the estimated echo and reverb in a predetermined proportion which is then applied to parametric equalizer 2504 which filters the audio to approximate the audio bass to treble curve of a typical living room user environment 102 as heard by the microphone of the client devices 104 and 118, among other potential clients. The audio is then output to downstream processing steps of the server system at digital audio out 2504.

Referring to FIG. 3B, to uniquely identify the program source, such as the specific sport event, as well as uniquely identify the audiovisual source, such as the channel or streaming service, in certain embodiments the real-time channel/synch data system 117 may pull data about the events within the audiovisual content 300, 302 and 304 as well as the sources of the audiovisual content from multiple data sources or from a single data source that may be delivered via a variety of means that include over a communications channel such as the Internet. These event data sources may include but are not limited to sports event data sources, spot advertising schedules, live event data sources such as concert performances speeches or awards programs, and electronic program guide data sources containing data about channel operators, channels, and programs. In certain embodiments, there is a dedicated software service 134 in the interactive services platform 100 that communicates with one or more sources for event data and electronic program guide data 133. In certain embodiments there is at least one source of electronic program guide data that may include but is not limited to: video service provider channel lineups, channel numbers, channel logo images, channel and network unique identifiers, program identifiers, program title, program description, program duration, program rating and other detailed data surrounding audiovisual programming. In some embodiments, a unique ID representing the source of each audiovisual stream referenced by the electronic program guide data may be referenced by the real-time channel/synch data system 117 whereby once that unique ID is transmitted to client software applications, the software client can then request a richer set of data such as channel logo images and sports event team data from one or more additional services or data feeds.

Referring to FIG. 3B, in an exemplary embodiment, the real-time channel/synch data system 117 generates phoneme streams for multiple audiovisual channels in parallel such as for Channel 1 300, Channel 2 302 through Channel X 304 and joins the datasets together in combination with relevant event and program data for each as managed by a real-time channel program data TEL system 134 via a multiplexor service 318 to deliver to multiple client software applications 103 such as by storing in a speech data cache 123 which is delivered as a data table in response to a request by the core real-time API service 105. In addition to speech data and event data the multiplexor 318 incorporates timestamp data from a timestamp data source 320 such that each unique speech data element is associated with a reference time against a timeline. This timestamp data will be used by the client software applications 103 as a reference point to determine the latency between i) the time at which the user is seeing a performance moment inside the event as it is displayed to them in the audiovisual presentation 112 and ii) the point of time as close as possible to the live performance moment itself. In one embodiment, the point of time as close as possible to the live performance moment is approximated by applying (e.g., adding) to the signal receipt timestamp as recorded by the real-time channel/synch data system 117 an offset value. The offset value may be determined by applying known latencies of each audiovisual channel source and corresponding delivery and transmission chains to the point in time that the signal related to the performance moment is received at the interactive services platform 100.

In FIG. 3G, a block diagram is shown illustrating an exemplary speech filter 2304 and 2402. The digital audio signal 2601*a* is received (in the example of 2304 and is the same for each instance of the speech filter of 2402) and applied to a code excited linear prediction (CELP) encoder 2601 which encodes the audio with a signal processing step well known to one skilled in the art. Such processes are typified by adaptive multi-rate (AMR) as well as the public domain encoder/decoder process such as SPEEX. In this process of encoding audio, the system will strongly favor conversion of voice audio to the output data stream over non-voice audio. In addition, certain implementations of the CELP codec will also provide a voice activity detector (VAD) which can be useful for gating on and off the process of converting audio to phonemes. This processing helps with the generation of consistent and more accurate phoneme streams from audio signals for both the server system as well as the clients of the service.

It should be appreciated that the sub-processes described above that precede the conversion of audio-to-phoneme streams, such as the audio bandpass filter 2302, dynamic range compressor 2303, audio pre-distortion processor 2401, and the speech filter 2402, would serve to increase the accuracy of the operation of the disclosed system.

Figure 3H:
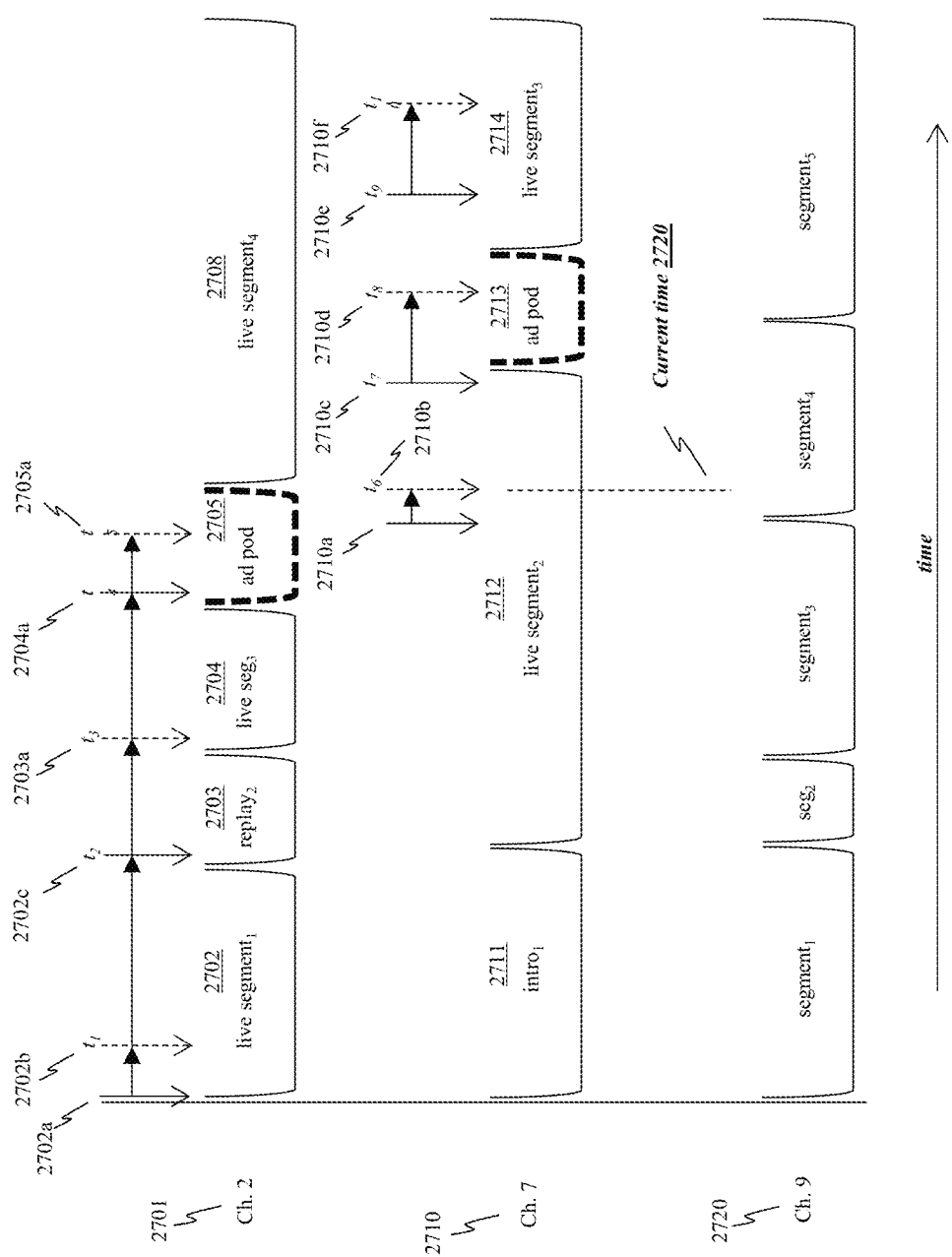
FIG. 3H is a time chart of television programming segments showing predicted time intervals of TV programming identification and to illustrate typical client behavior while participating with the disclosed system's gaming activities, in accordance with an exemplary embodiment.
Figure 31:
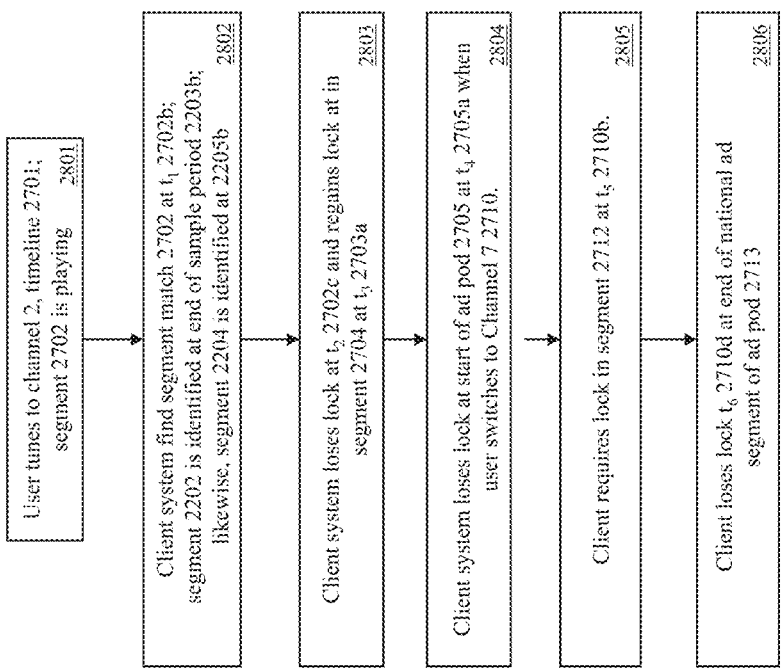
Figure 30:
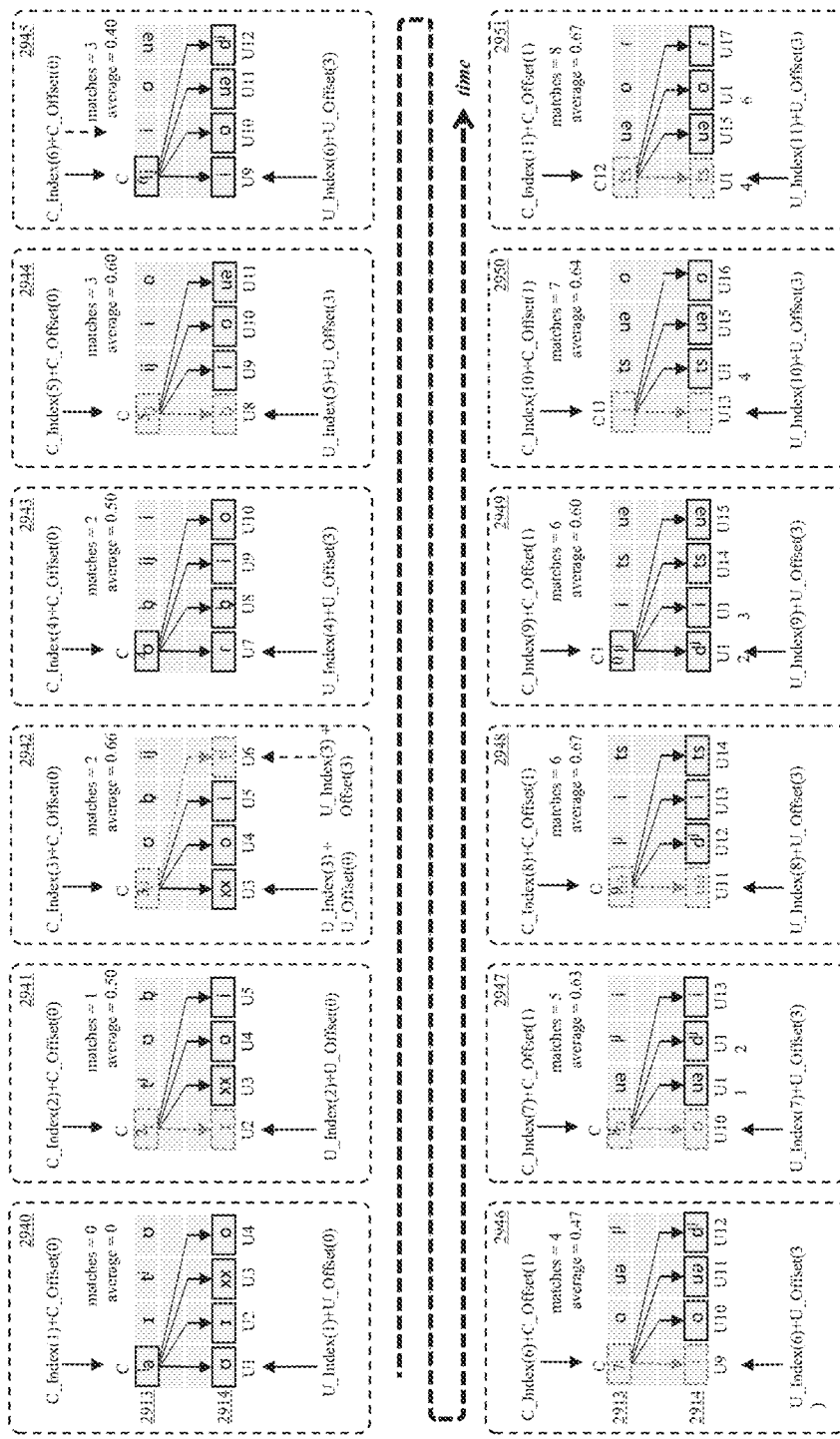

In one embodiment, the disclosure is processing audio received by a client 102 of the system, converting the audio to a phoneme stream, then attempting to match the received audio to a multiplicity of candidate audio received from the server sub-system 2190 from the speech data cache 146. The time chart of FIG. 3H illustrates the audio received by a client where the user is initially viewing, by way of example only, a live sports program on channel 2 2701. The disclosed system, at time $t_1$ 2702*b* identifies the program 2702 and continues to identify the program until, in this example, there is an instant replay of a game segment 2703, and in some embodiments of the disclosed system, the system will indicate a no-match with the programming at time $t_2$ 2702*c* thereby disabling any function of the system dependent upon a valid identified program. Upon resumption of the live play of the sporting event at time $t_3$ 2703*a* within the detection time window of typically three seconds, the system of the disclosure will once again indicate a successful identification of the program viewed by the user. Next, at time $t_4$, a group of TV advertisements (an ad pod) begins, and the system, in one embodiment, indicates no identification of the audio of the program as advertisements may vary from region to region in the many broadcast markets. Further in this example, the user decides to change channels during the ad break at time is 2705*a* and tunes to channel 7 2710 where the system detects the current program, another live sports program, at time $t_6$ 2710*b* and the above sequence continues. These steps are outlined in the method chart of FIG. 3I.

Figures 3J, 3K:
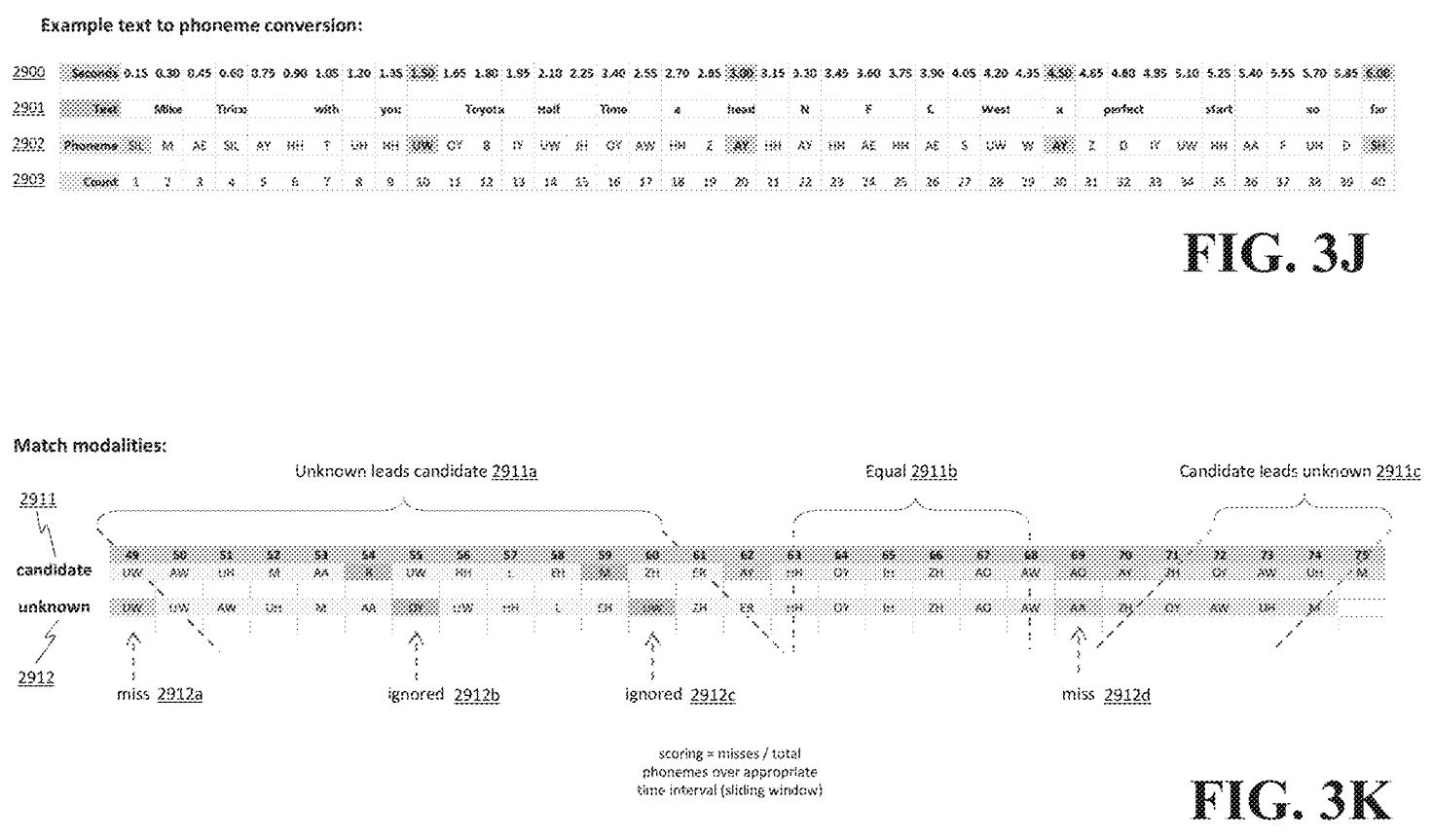

The phoneme matching process can be better understood beginning with FIG. 3J where the text of certain audio from a live football game is laid out over a predefined time period (e.g., 6 seconds). Persons having skill in the art will appreciate that other time periods may be used. The disclosed system generates a phoneme representation 2902 of the spoken words 2901 approximately every 150 milliseconds which is metered on line 2900 such that the six second phrase generated 40 phonemes 2903. The phoneme generation may occur at time intervals other than every 150 milliseconds.

We then see in FIG. 3K that the same spoken phrase when received by the microphone of the client device 104 results in a similar but not exact phoneme stream 2912 when compared to the known audio (candidate) 2911 that was generated by the disclosed system phoneme server 2190. A visual inspection of the two phoneme streams 2911 and 2912 reveal that the two streams are close in content, but each contains phonemes not found in the other 2912*a* and 2912*d*, phonemes that do not match for the same speech syllable utterance 2912*b* and 2912*c*, and missing phonemes that should have been formed and included in the phoneme stream such as with the unknown stream 2912 at column 70. This aspect of data analysis is sometimes referred to as noisy data where sometimes stream 2911 leads stream 2912 as highlighted at 2911*a*; other times 2911 is equal to 2912 as highlighted at 2911*b*; and, sometimes 2911 trails 2912 as highlighted at 2911*c*.

Figures 3L, 3M:
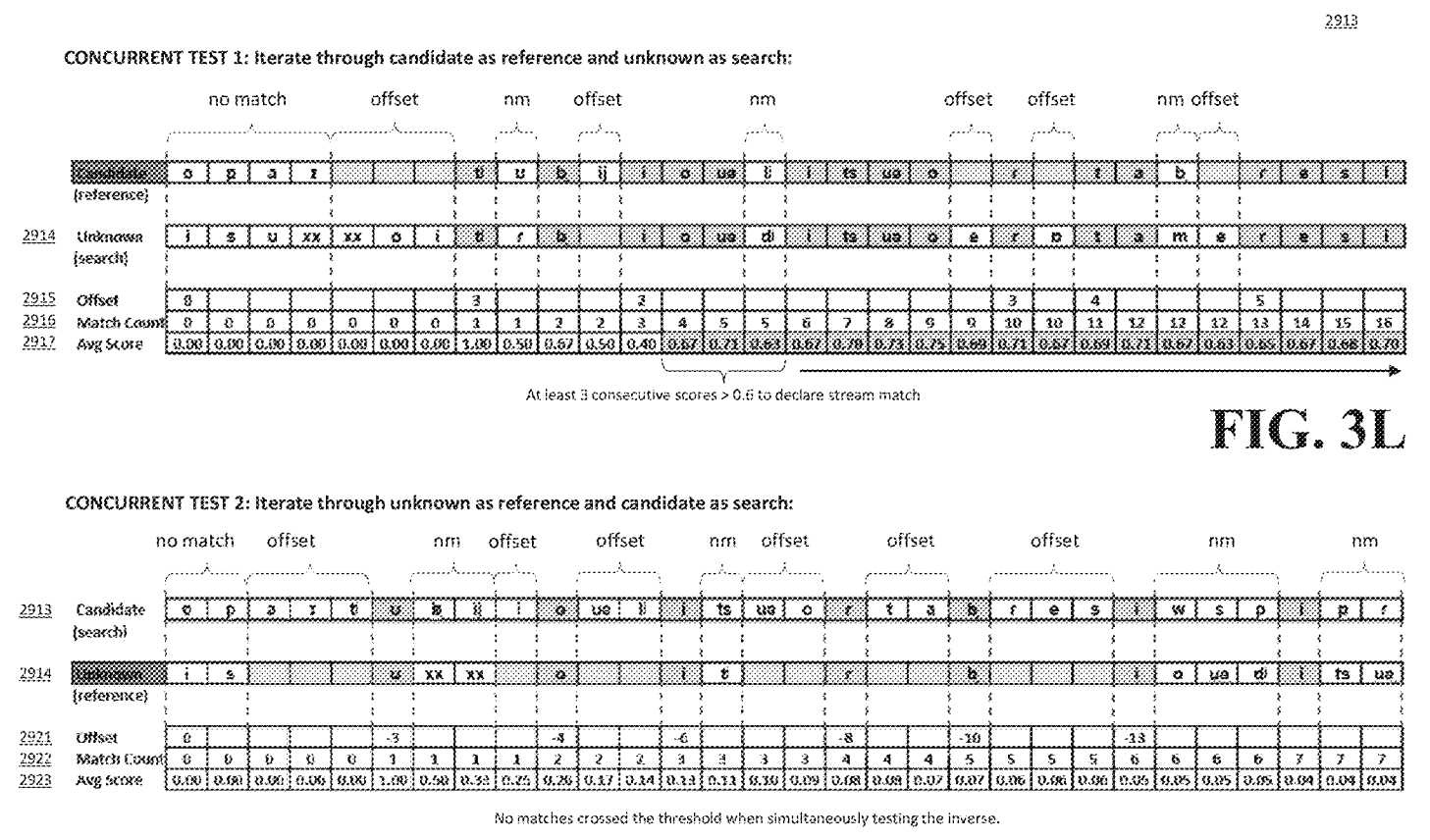

In some embodiments, the matching of noise data is addressed as shown starting in FIG. 3L. As each phoneme stream of candidate compared to unknown contracts and expands stochastically, a matching pattern such as testing a phoneme of one stream against the phonemes of the other by iteration may fail. Likewise, forming vectors from groups of phonemes and conducting nearest neighbor search patterns may also fail. The disclosed system defines an algorithm that conducts a simple search as illustrated in FIG. 3O with certain constraints and additional processes.

Referring to FIG. 3O, starting with candidate stream 2913 at position C1, as illustrated in 2940, that value is tested against any of the four positions in the unknown phoneme stream 2914 created by the client device 102. When the first four positions of 2914 are tested, and, in this example, none match, the candidate 2913 index C_Index(1) is incremented once in 2941 to C_Index(2) as is the unknown index U_Index(2). Here, matching phoneme values are found at the first U position in this block 2941. A match counter is incremented (from zero to one) and an average match score is calculated which now equals 0.5. Again, both C and U indexes are incremented, and, in 2942, value C3 is tested against the four U values. A match is found at unknown position U6. As the first three values in this unknown group of four phonemes are not found in the candidate stream at the same positions, the unknown stream offset counter is incremented by three such that the unknown stream pointer now points at position U6 {U_Index(3)+U_Offset(3)} where the match value to candidate phoneme C3 was found. One effect of this action has been to realign in time the two stream pointers. The match counter is incremented to 2 and the new average of matches is 0.66.

In the next iteration, when both C and U indexes have been incremented in 2943, again no matches were found of the candidate value C4 compared to the four unknown test values (U7 to U10). The match average now drops to 0.5 and the indexes are incremented to the next test 2944. Here again a match is found in the first cells of each stream. The match score is incremented to 3 and the match average now equals 0.60.

In the next test 2945, no match is found and the average drops to 0.4, however, as the match average was above 0.5 for three consecutive tests, the process of matching now only increments the candidate C Offset leaving the unknown index and offset unchanged. A match is found at C_Index(6) with C Offset(1) and U_Index(6) and U_Offset(3).

Figure 3N:
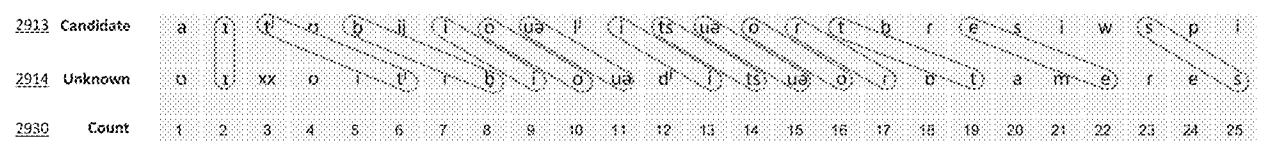

The testing continues in this manner of four phonemes per test. The results of this test are seen in FIG. 3N where matched phonemes are encircled, and the search pattern is revealed. In this example, the candidate 2913 is always leading the unknown 2914 but never consistently in phoneme offset.

When more than four phonemes are tested of one stream against another, the number of matches may decrease as the streams may fall out of alignment, which would corrupt the score causing the average of matches to drop. Also, inherent noise in the phoneme generation process may cause the two streams in a matching process to slowly lead and lag each other with periods of phoneme alignment in between. As such, in some embodiments, searches are conducted forwards and backwards between the two streams under test to track the expansion and contraction of the streams due to this presence of unpredictable noise in the data and the commensurate shifting in time relationship between the two streams.

Hence, in testing two streams for matching phoneme symbols bi-directional testing may be used, as discussed. In some embodiments, bi-directional testing can be accomplished via software by conducting two unidirectional tests in parallel where the first test, as illustrated in FIG. 3L shows the candidate stream as the reference and the unknown stream as the search stream. A parallel test is conducted, as illustrated in FIG. 3M where the unknown stream is the reference, and the candidate stream is the search stream.

The result of this parallel method of testing is equivalent to a bi-directional test with a single test pair but much simpler algorithmically and reveals that the first test in FIG. 3L produces the best results with a match count average rising to and staying above 0.6 after 12 phoneme samples are tested. The disclosed system's match process algorithm requires the test score to average at or above 0.6 for at least three consecutive tests for a stream match to be declared found.

Conversely, with the unknown stream as the reference in FIG. 3M, the two streams, though the same, never achieve lock (above an average match of 0.6). However, this is not always the case, and the opposite does occur when the test of FIG. 3M produces a positive match and FIG. 3L does not. The flow chart of FIG. 3P diagrams the testing algorithm discussed above.

Figure 3P:
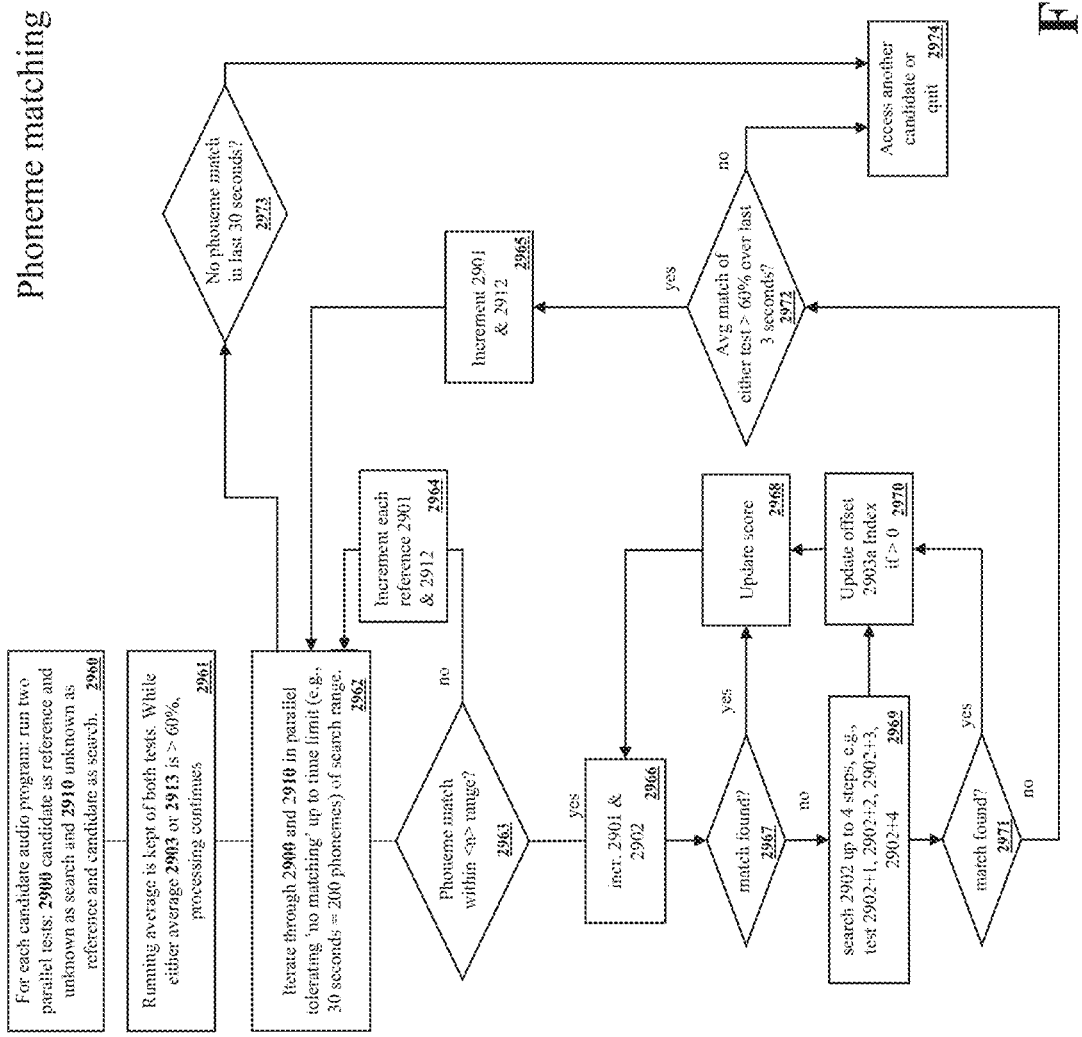
FIG. 3P is a flow chart of the matching process of FIG. 3O, in accordance with an exemplary embodiment.

In the flow chart of FIG. 3P, 2960, when an unknown audio program is compared to a candidate audio program in an attempt to identify the unknown audio, two tests are conducted in parallel with the candidate phoneme stream compared to the unknown phoneme stream and vice versa. This is because either of the two streams can be ahead in time and then fall behind in time and then again be ahead in time. Accordingly, in some embodiments, the search accounts for the shifting time relationship. Without being bound by theory, this is believed to be due to the limited number of symbols for phonemes and their high repetition rate.

One way to search unstable time relationships would be to test a reference stream against a search stream in a bi-directional fashion which could be very complicated as the time alignment shifts and there would be a need to know when the aligned has moved between ahead, equal, or lagging.

Another means of testing for matching is to run two tests in parallel and in 2961 keep a running average of both tests, 2903 and 2913. When either crosses a 60% threshold, a match is declared, and processing continues.

Otherwise, in 2962 iterate through the two streams for a period of time, perhaps 30 seconds or 200 phonemes, for example only, and then in 2963 test for a match within range <n>, which is typically four phonemes. If no, increment the indexes of both streams 2964 and continue. If yes, increment both indexes 2901 and 2902 at 2966 and test for match found 2967. If yes, update score 2968 and return to step 2966 to increment 2901 and 2902. If no match 2967 the search 2902 up to 4 steps ahead 2969 and test for match found 2971. If yes, in 2970 update offset 2903a index if the search ahead was one or more additional positions ahead of the current index, 2970.

If no match is found at 2971, then at 2972 test the average match score of both parallel tests and, if either is greater than 60% over the last three seconds, continue to 2965 and repeat the cycle. If the test is no, neither test is above 60% then at 2974 access another test candidate and if all test candidates are exhausted, continue testing from the first test candidate or quit.

Another option, in some cases, when all tests fail is to transmit for display on the user device to the user device for dis be to alert the user to better position their mobile device for clearer audio reception from the nearby television, or any number of other options as the use case requires.

In reference to FIG. 3B, the disclosed system seeks to acquire audio from a television program, typically but not limited to live sports programming, by a microphone means of a client device such as a mobile phone 104 or a laptop computer 118 or by directly sampling the audio of a digital program within the confines of a smart TV 124. The client software system is described in detail elsewhere in this disclosure. The disclosure's identification sub-system as described above is part of a process illustrated in FIG. 3A and FIG. 3C.

From the server-side perspective of FIG. 3A, television programming is acquired from a multiplicity of sources 2197, 2198, 2199 at an ingest process 122. The programming is processed through the steps outlined above and converted to a phoneme representation and stored in a time-windowed speech data cache 123. This cache 123 is a FIFO database that will contain only a limited number of seconds, minutes, hours, or days of content as prescribed by the system that it supports. The phonemes that are stored in the database 123 are also stored in multiple modified instances where the audio that was transformed into phonemes has been pre-distorted by an audio pre-processor to shape the audio to better represent expected audio from differing client devices such as mobile phones of APPLE or SAMSUNG or laptop microphone systems, as described herein.

In some embodiments, when the client device 102 running the client application 103 connects with the interactive services platform 100 through the core real-time API service 105, the client reports its provenance whereupon the core real-time service 105 delivers pre-processed phoneme streams that best match the acoustic characteristics of the client device 102 associated with that provenance. For example, if the operator service utilizing the disclosed system is utilizing 20 TV program channels, when a client 103 connects to begin a session with the service, via service request 2156a, the client 103 may be provided with a continuous stream of the 20 streams of phonemes produced from the audio of the 20 supported live sports programs which were produced from audio pre-distorted to better match the total acoustic signature of the personal digital device 102 running the connecting client 103 (e.g., microphone type, microphone placement, room acoustics, etc.).

In some embodiments, when the data spools to the client device 2156b, the client software 103 receives a transport data stream which envelopes the multiplicity of live sports program audio in the phoneme representation described above. The client software 103 demultiplexes the received data in 2155 and stores the data in a temporary local receive cache 2156. Also, in some embodiments, the client software 103 makes requests to the core real-time API service 105 for the most current window of speech data from the speech data cache 123 and the core real-time API service 105 delivers the window of data directly in its response as a data structure which the client software stores in the temporary local receive cache 2156.

As exemplified in FIG. 3B when a working session begins such as an application providing live sports betting, users in multiple user environments 101, 112 and 107 watch and/or listen to live sports programs as the audiovisual presentations 106, 108 and 116 which are processed as described above by the client software 103, 111 and 114 and converted into phoneme streams tracking the audio received by means of 2151 and 2152. The client software 103 111 and 114 requests phoneme streams from the speech data cache 123 from the core real-time API service 105 and stores them in the receive cache 2156. The phoneme match processor 2153 then processes this disclosure's algorithm to test one by one the available audio phoneme streams in the receive cache 2156 in an attempt to match the audio picked up in the user's environment 101 107 and 112. In an exemplary embodiment, if the client software 103 111 and 114 finds a match it stores the reference data mapped to the matching phoneme streams received by the interactive services platform 100 such as a program or event ID and extraction time stamp that was mapped to the matching speech data pattern source as well as calculate the offset between the mapped timestamp data and the timestamp data of when the speech data was extracted by the client software 103, 111 and 114 to calculate the user latency (e.g., glass-to-glass latency). The program or event ID and latency (e.g., glass-to-glass latency) value are sent to the interactive services platform 100 and the core real-time API service 105 uses that data to retrieve recommendations of interactive content such as bet offers and promotional offers for the client software 103 to format and display the offers as interactive graphical elements.

FIG. 3Q depicts an exemplary data structure 2974 used by the core real-time API service 105 to deliver a time window of phoneme data from multiple live programs, such as live sports event programs, to the client software 103 that can be tailored to the device 102 running the client software 103. In some embodiments, the data structure may consist of a set of tables representing discrete durations of time such as one second whereby the entire data structure represents a time window, such as ten seconds, as a candidate phoneme source for the client software 103 to search for a match. Referring to FIG. 3Q, in some embodiments, one table entry 2975 may contain attributes such as an "ID" value representing the order and identity of the table in the set of tables (a value of "1" in this example), a "stationID" attribute which uniquely represents the station, channel, streaming provider or other means of identifying how the user is consuming the audiovisual program (a value of "4872162" in this example), a "millunixstamp" attribute which represents the timestamp in milliseconds of when the real-time channel/synch data system 117 extracted the audio and converted to phonemes with an additional latency added representing the known latency of the transmission channel between the live event and the real-time channel/synch data system 117 ("1648819304000" in this example), and a "sequence" attribute which represents the chronologically ordered set of speech sounds or phonemes extracted during the specified time duration ("'ha', 'i', 'lo', 'gr', 'ga', 'lo', 'te', 're', 'ih'" in this example). Table 2976 represents the speech data for the next duration of time following table 2975, and the sequence continues until the time window is complete and a new sequence can begin representing speech data from the same time window for another stationID.

Figure 4A:
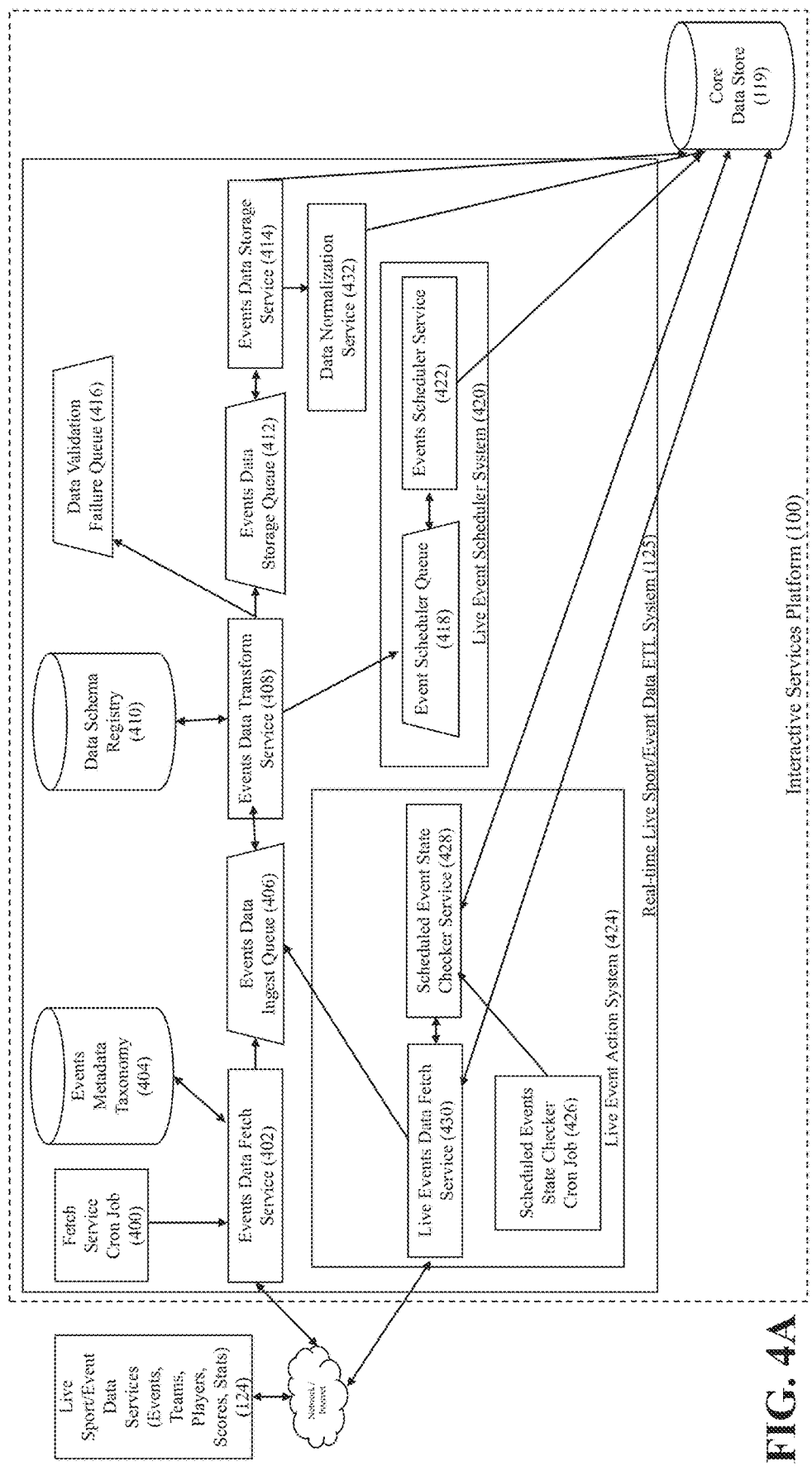
FIG. 4A is a systems diagram of the real-time live sport/event data ETL system and its subsystems including the live event scheduler system and live event action system, in accordance with an exemplary embodiment.

FIG. 4A depicts an exemplary overall system architecture of the real-time live sport/event data ETL system 125 which ingests, normalizes, stores and schedules event data from multiple live event data services 124 including live sports event data into the core data store 119. The real-time live sport/event data ETL system 125 retrieves data about future, past and presently occurring live events such as live sports events including the details about sports venues, teams and players for sports events over a communications network such as the Internet from a variety of sport/event data sources 124 including providers such as SPORTRADAR, DELTATRE, GRACENOTE and STATS PERFORM. In certain embodiments, there is at least one source of sports event data 124 that may include but is not limited to team data, player data, score data, stats for detailed events that have taken place in the game, image data including player and team logo images, program ID and channels providing coverage of the event, and other detailed data surrounding the sports event.

Referring to FIG. 4A, in an exemplary embodiment, a fetch service cron job 400 is scheduled to run at a periodic interval, such as at 12 AM every day for example, which initiates the events data fetch service 402. The events data fetch service 402 first loads the published events metadata taxonomy 404 which defines the relevant event set for the interactive services platform 100 such as the sports leagues that are supported and the key data properties related to those event sets that need to be pulled by the events data fetch service 402 from each sports/event data service 124, which can include attributes such as league name, league ID, API version, language, format and others. The events metadata taxonomy 404 also contains rules about each data provider 124 such as whether the provider will return a large data table containing all desired attributes about a sports event, including all team profile data and team participant profile data, or if the provider will return specific data structures for each game element containing IDs for more granular data structures which are used for subsequent data requests.

Based on the data contained within the events metadata taxonomy 404 the events data fetch service 402 contacts each sports/event data source 124 to request upcoming event schedule data for each league ID. In certain embodiments, for every schedule it receives from a sports/event data service 124 it typically contains a list of game IDs for each game in the schedule as well as other related data such as the team names and IDs of the teams competing in the game, venue data, game start time and others. In an exemplary embodiment, this data is stored in an events_data data structure by the events data fetch service 402 and is pushed to the events data ingest queue 406 where it sits until it is pulled from the queue by the events data transform service 408.

In certain embodiments, based on rules for the sports/event data source 124 defined in the events metadata taxonomy 404, for every game ID retrieved by the events data fetch service 402, the events data fetch service 402 can then contact the sports/event data source 124 to request additional data about the teams competing in the game. Depending on the embodiment, this can include but is not limited to team IDs, team names, team city, team profiles, team stats, and the roster of team players and player IDs for each team that are set to compete in the game. In some embodiments, each set of data related to a specific sports team retrieved from the events data fetch service 402 is stored in a sports_teams data structure and sent to the events data ingest queue 406 where it sits until it is pulled from the queue by the events data transform service 408.

In certain embodiments, based on rules for the sports/event data source 124 defined in the events metadata taxonomy 404, for every participant ID for the sports teams retrieved by the events data fetch service 402, the events data fetch service 402 can then contact the sports/event data source 124 to request additional profile data about each participant competing in the game. This can include but is not limited to the player's full name, nicknames, jersey number, personal information, stats and other profile data. In some embodiments, each set of data related to a specific sports team participant retrieved from the events data fetch service 402 is stored in a sports_participants data structure and sent to the events data ingest queue 406 where it sits until it is pulled from the queue by the events data transform service 408.

In an exemplary embodiment, the events data transform service 408 runs continuously and scans the events data ingest queue 406 for any objects of data to be removed from the queue and analyzed. The events data transform service 408 loads the published data schemas from the data schema registry 410 which contain data schemas used to validate and normalize each data object retrieved from the events data ingest queue 406 based on an understanding of the proper data formatting from each events data provider 124 as well as normalized data structures that can be consistent across all data providers.

In an exemplary embodiment, the events data transform service 408 removes an object from the events data ingest queue 406 such as the oldest object or newest object placed on the queue and analyzes the data object. The data object is validated against the appropriate data schema from the data schema registry 410 to ensure each field of data inside the data object is valid according to the schema. If the fields of the data object are valid according to the appropriate schema, then the data object is normalized to a new data structure based on a normalized schema independent of sports/events data provider 124 and placed on the events data storage queue 412 where it sits until it is pulled from the events data storage queue 412 by the events data storage service 414. If the data object is determined to be invalid based on the appropriate schema from the data schema registry 410 it is moved to the data validation failure queue 416 for later examination.

In an exemplary embodiment, if the valid normalized data object is an events_data data object, a copy of the data object is published to the event scheduler queue 418 inside the live event scheduler system 420. Inside the live event scheduler system 420 the event scheduler service 422 continuously pulls in each events_data data object from the event scheduler queue 418 and analyzes it. If the event start time property of the sports event described in the events_data data object is the present day, the event scheduler service 422 creates a new data object of type scheduled_events_today and maps the data from the events_data data object into it. The event scheduler service 422 further analyzes the event start time property and writes a new triggerStartDateTime value into the new data object which is a timestamp of when the live event action system 424 should contact the corresponding sport/event data source 124 to begin requesting and processing dynamic live event data such as live stats, game events and box scores. In an exemplary embodiment, the event scheduler service 422 loads the new scheduled_events_today data object directly into the core data store 119. If a similar data object has already been loaded into the core data store 119 the status of the old and new objects is first compared by the event scheduler service 422 to make sure data about an in-progress event is not being overwritten.

Referring to FIG. 4A, in an exemplary embodiment, the events data storage service 414 runs continuously and scans the events data storage queue 412 for any objects of data to be removed from the queue and analyzed. For each object the events data storage service 414 removes from the events data storage queue 412 and analyzes, based on its data object type it is stored into a specific location or collection type in the core data store 119. In an exemplary embodiment, example collections are events_data, sports_teams, sports_venues and other collections. If a similar data object has already been loaded into the core data store 119 the status of the old and new objects is first compared by the events data storage service 422 and older versions of the same objects can be replaced by newer versions. The events data storage service 414 invokes the data normalization service 432 which runs on the new data object and uses a "fuzzy logic" algorithm to find matches for events across disparate data records. Examples of criteria used in certain embodiments can include but are not limited to event start time, spelling of team names including use of diacritics, player name spelling, venue name and location and others. In certain embodiments, when matches are found it creates a new data collection in the core data store 119 called a cross reference collection where data from matching records are joined. In some embodiments the IDs contained in each data object associated with the same event are normalized to be the same IDs.

Referring to FIG. 4A, in an exemplary embodiment, the live event action system 424 fetches, processes and loads dynamic data elements about live events at the moment they are occurring. The scheduled event state checker cron job 426 is scheduled to run at a periodic interval such as every ten minutes which initiates the scheduled event state checker service 428. The scheduled event state checker service 428 searches the core data store 119 for data objects of type scheduled_events_today. For each scheduled_events_today object it compares the triggerStartDateTime timestamp to the current time of day. If the timestamp falls within a determined time range and the status of the event is not "closed" or "in progress", the scheduled event state checker service 428 modifies the scheduled_sports_events_today entry in the core data store 119 to change its status to "in progress" and invokes the live events data fetch service 430 with data about the event from the scheduled_events_today object.

In an exemplary embodiment, based on the data contained in the scheduled_events_today object, the live event data fetch service 430 requests dynamic data from the corresponding sports/event data sources 124 including dynamic live event data such as live stats, game events and box scores. Data objects received are then pushed to the events data ingest queue 406 where they will be analyzed, normalized and transformed by the events data transform service 408. Data updates are fetched on a continuous cycle, such as every 5 seconds for example, until an "event completed" message is received or detected in the data received from the corresponding sports/event data service 124. When the "event completed" message is received or detected by the live event data fetch service 430 it stops requesting new data from the corresponding sports/event data services 124 and it modifies the corresponding scheduled_events_today entry in the core data store 119 to change its status to "completed."

FIG. 4B depicts an exemplary data structure 432 that can be fetched by the events data fetch service 402 or from the live event data fetch service 430 from a live event data service 124 in certain embodiments. The exemplary sports data provider feed data structure 432 is an XML feed data structure comprised of fields 434 and corresponding values 436 describing sport event schedules for a league 438 (NBA in this example), for each league a season 440 (2021 in this example), for each season a set of games 442 including an example game 444 with game ID "1112131415" with properties including a scheduled start time 446 ("2021-10-19T23:30:00Z" in this example) the home team 448 (Milwaukee Bucks in this example) and away team 450 (Brooklyn Nets in this example) venue profile data 452 (Milwaukee's Fiserve Forum in this example) and some data describing the television coverage of the event 454 (the "TNT" national cable network in the example). In certain embodiments, data from this exemplary sports data provider feed data structure 432 will be used by the real-time live sport/event data ETL system 125 to populate data objects that can include events_data, sports_teams, sports_venues and other objects as well as IDs that can be used in preferred embodiments by the events data fetch service 402 or the live event data fetch service 430 to fetch additional data from a live sport event data service 124. Though the exemplary data structure provided is in XML format, it will be appreciated to one skilled in the art that there are numerous possible embodiments such as data structures in JSON, PJSON, HTML, YAML, CSV, RSS, Atom, SUP and other combinations that will be useful in some embodiments.

FIG. 4C depicts exemplary data structures that can be contained within the published sports metadata taxonomy 404 which the events data fetch service 402 loads which defines the relevant event set for the interactive services platform 100 such as the sports leagues that are supported and the key data properties related to those event sets that need to be pulled by the events data fetch service 402 from each sports/event data service 124. Referring to FIG. 4C, exemplary data structure 456 contains sample metadata taxonomy data for the "NFL" league, where exemplary data structure 458 contains metadata taxonomy data for the "NBA" league, where exemplary data structure 460 contains metadata taxonomy data for the "NHL" league, and where exemplary data structure 462 contains metadata taxonomy data for the "MLB" league. The exemplary metadata taxonomy data structures use a JSON data structure comprised of fields 464 and corresponding values 466 describing sample attributes such as API version numbers, languages, current season to request schedules, sport name and an Identifier used to reference additional data. Though the exemplary data structure provided is in JSON format, it will be appreciated to one skilled in the art that there are numerous possible embodiments such as data structures in XML and other combinations that will be useful in some embodiments.

FIG. 4D depicts exemplary JSON data structures that contain data about sports events that are used by services within the real-time live sport/event data ETL system 125. In some embodiments, exemplary events data ingest queue data object 468 is an events_data data object whose data originated from "providerxyz" as one of the sports/event data sources 124 created by the events data fetch service 402 containing sample sport event data fields 472 with corresponding values 474 that is sent to the events data ingest queue 406 where it sits until it is pulled from the queue by the events data transform service 408.

Referring to FIG. 4D, exemplary events data storage queue data object 470 is a events data normalized data object whose data originated from "providerxyz" as one of the sports/event data sources 124 created by the events data transform service 414 containing sample sport event data fields 476 with corresponding values 478 that is sent to the events data storage queue 412 where it sits until it is pulled from the queue by the events data storage service 414 where upon analysis it is stored into a specific location or collection type in the core data store 138. Though the exemplary data structures provided in FIG. 4D are in JSON format, it will be appreciated to one skilled in the art that there are numerous possible embodiments such as data structures in XML and other combinations that will be useful in some embodiments.

FIG. 4E depicts an exemplary data schema registry data structure 480 from the data schema registry 410 that can be used by the events data transform service 408 within the real-time live sport/event data ETL system 125. In an exemplary embodiment, the events data transform service 408 analyzes data objects it has removed from the events data ingest queue 406 and uses the registry data structure for the corresponding data object type from the data schema registry 410 to validate that each expected field 482 contained within the object has a value 484 that adheres to the correct data format for the field and that the fields with values are minimally complete. Though the exemplary data structures provided in FIG. 4E are in JSON format, it will be appreciated to one skilled in the art that there are numerous possible embodiments such as data structures in XML and other combinations that will be useful in some embodiments.

FIG. 4F depicts an exemplary scheduled_events_today data structure 486 in the collection of live events occurring today in the core data store 119. The event scheduler service 422 creates a new data object of type scheduled_events_today and maps the fields 488 and corresponding values 490 data from the events_data data object into it and loads the new scheduled_events_today data object directly into the core data store 119. The scheduled event state checker service 428 searches the core data store 138 for data objects of type scheduled_events_today such as the exemplary scheduled_events_today data structure 486 and invokes the live event data fetch service 430 with data about the event from the scheduled_events_today data object if its triggerStartDateTime value 492 (in the example "2022-03-09T02:00:00.000Z") falls within an established threshold. Though the exemplary data structures provided in FIG. 4F are in JSON format, it will be appreciated to one skilled in the art that there are numerous possible embodiments such as data structures in XML and other combinations that will be useful in some embodiments.

Figure 5A:
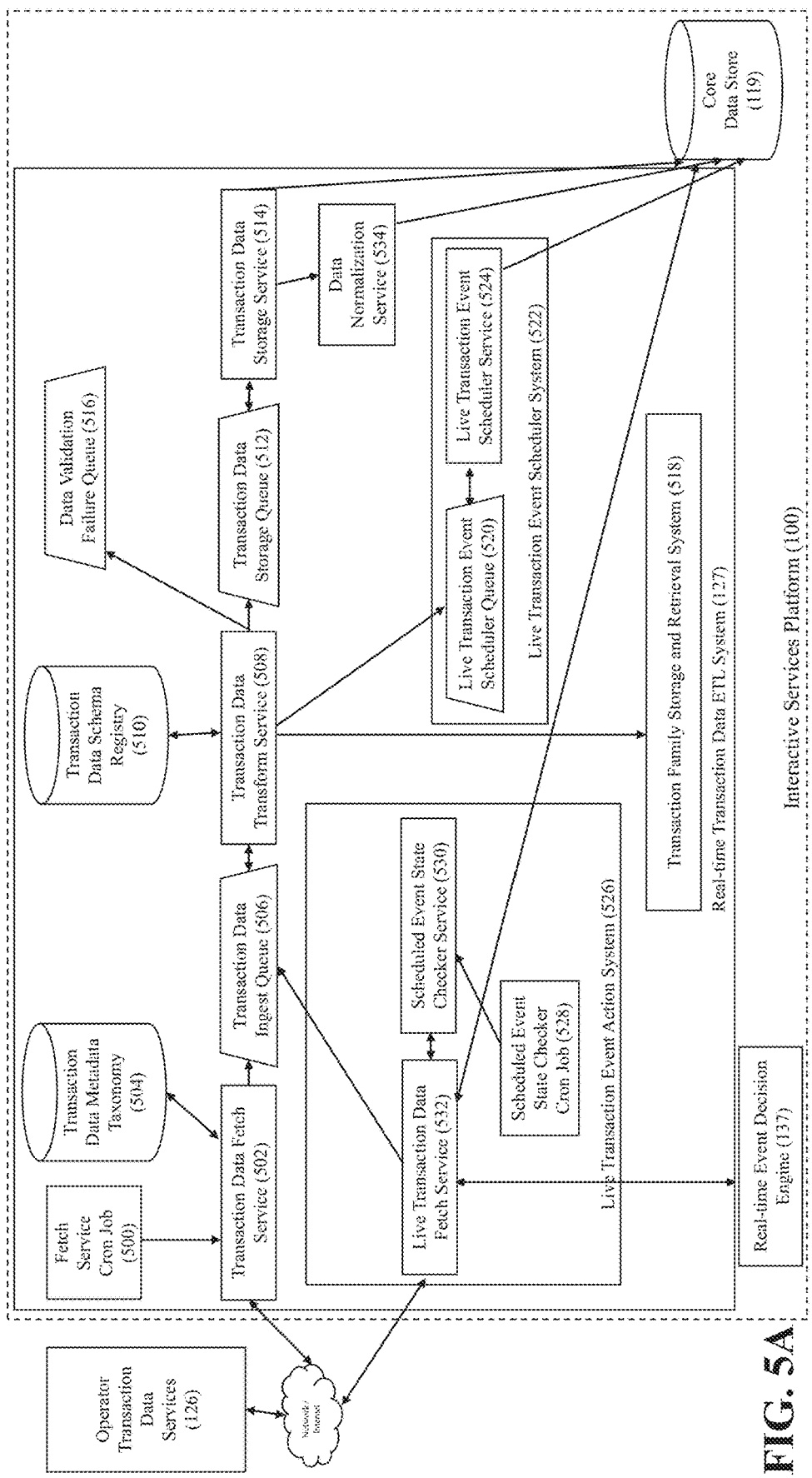
FIG. 5A is a systems diagram of the real-time transaction data ETL system and its subsystems including the live transaction event scheduler system and the live transaction event action system, in accordance with an exemplary embodiment.

FIG. 5A depicts an overall system architecture of the real-time transaction data ETL system 127 which ingests, normalizes, stores and schedules live event transaction data from multiple operator transaction data services 126 into the core data store 119 and, during live events, directly into the real-time event decision engine 137 using a similar system and method to that which is used for live event data as shown in FIG. 4A. The real-time transaction data ETL system 127 retrieves data about future and presently occurring live events such as live sports events including the details about the sports events as well as specific bet offers associated with those events over a communications network such as the Internet from a variety of operator transaction data sources 152 including providers such as METABET, KAMBI GROUP and directly from sportsbook operators themselves. In certain embodiments, there is at least one source of bet data 148 for a sports event that may include but is not limited to "point spread" bets, "money line" bets, "prop" bets, "parlay" bets, and other bet markets surrounding the sports event.

Referring to FIG. 5A, in an exemplary embodiment, a fetch service cron job 500 is scheduled to run at a periodic interval, such as at 12 AM every day for example, which initiates the transaction data fetch service 502. The transaction data fetch service 502 first loads the published transaction metadata taxonomy 504 which defines the relevant transaction event offer set for the interactive services platform 100 such as the bet market operator IDs, the sports leagues that are supported and the key data properties related to those event sets that need to be pulled by the transaction data fetch service 502 from each operator transaction data service 126, which can include attributes including but not limited to league name, league ID, group name, group ID, API version, language, format, offering ID, regulation data and others. The transaction data metadata taxonomy 504 also contains rules about each transaction data provider 126 such as whether the provider will return a large data table containing all desired attributes about a transaction event, including all available bet offers associated with the event, or if the provider will return specific data structures for each event containing IDs for more granular data structures which are used for subsequent data requests.

In an exemplary embodiment, based on the data contained within the transaction data metadata taxonomy 504 the transaction data fetch service 502 contacts each operator transaction data source 126 to request upcoming transaction event schedule data for each league or group ID. In certain embodiments, for every schedule it receives from a transaction data service 126 it typically contains a list of event IDs for each game or transaction event in the schedule as well as other related data. In some embodiments the transaction data fetch service 502 first requests from the transaction data service 126 the list of available groups or leagues for which there are transactions available. Based on rules for the transaction data source 126 defined in the transaction data metadata taxonomy 504, for every event ID retrieved by the transaction data fetch service 502, the transaction data fetch service 502 can then contact the transaction data source 126 to request all available transactions for the event. In some embodiments, data received from the transaction data service 126 are stored in either offers_feed_event data objects and offers_feed_transaction_offer data objects by the transaction data fetch service 502 and are pushed to the transaction data ingest queue 506 where they sit until they are pulled from the queue by the transaction data transform service 508. In some embodiments, data received from the transaction data service 126 are stored in a single complex data object by the bet data fetch service 502 and is pushed to the transaction data ingest queue 506 where it sits until it is pulled from the queue by the transaction data transform service 508.

In an exemplary embodiment, the transaction data transform service 508 runs continuously and scans the transaction data ingest queue 506 for any objects of data to be removed from the queue and analyzed. The transaction data transform service 508 loads the published transaction data schemas from the transaction data schema registry 510 which contain data schemas used to validate and normalize each data object retrieved from the transaction data ingest queue 506 based on an understanding of the proper data formatting from each transaction data provider 126 as well as normalized data structures that can be consistent across all data providers.

The transaction data transform service 508 removes an object from the transaction data ingest queue 506 such as the oldest object or newest object placed on the queue and analyzes the data object. The data object is validated against the appropriate transaction data schema from the transaction data schema registry 510 to ensure each field of data inside the data object is valid according to the schema. If the fields of the data object are valid according to the appropriate schema, then the data object is normalized to a new data structure based on a normalized schema independent of transaction data provider 126 and placed on the transaction data storage queue 512 where it sits until it is pulled from the transaction data storage queue 512 by the transaction data storage service 514. If the data object is determined to be invalid based on the appropriate schema from the data schema registry 510 it is moved to the data validation failure queue 516 for later examination. If the valid normalized data object is a transaction_offers data object a copy of the data object is simultaneously published by the transaction data transform service 508 to the transaction family storage and retrieval system 518 where links will be established between the transaction offer and any other similar transaction offers for the same event.

In an exemplary embodiment, if the valid normalized data object is a offers_feed_event data object a copy of the data object is published by the transaction data transform service 508 to the live transaction event scheduler queue 520 inside the live transaction event scheduler system 522. Inside the live transaction event scheduler system 522 the live transaction event scheduler service 520 continuously pulls in each offers_feed_event data object from the live transaction event scheduler queue 520 and analyzes it. If the event start time property of the transaction event described in the offers_feed_event data object is the present day, the live transaction event scheduler service 524 creates a new data object of type scheduled_events_today and maps the data from the offers_feed_event data object into it. The live transaction event scheduler service 524 further analyzes the event start time property and writes a new triggerStartDateTime value into the new data object which is a timestamp of when the live event transaction offer action system 526 should contact the corresponding operator transaction data source 126 to begin requesting and processing dynamic live transaction data including but not limited to updated odds, new prop bet offers, expired bet offers and others. In some embodiments, the live bet event scheduler service 524 loads the new scheduled_events_today object directly into the core data store 119. If a similar data object has already been loaded into the core data store 119 the status of the old and new objects is first compared by the live transaction event scheduler service 524 to make sure data about an in-progress event is not being overwritten.

Referring to FIG. 5A, in an exemplary embodiment, the transaction data storage service 514 runs continuously and scans the transaction data storage queue 512 for any objects of data to be removed from the queue and analyzed. For each data object the transaction data storage service 514 removes from the transaction data storage queue 512 and analyzes, based on its data object type it is stored into a specific location or collection type in the core data store 119. In certain embodiments, example collections are transaction_events, transaction_offers, transaction_outcomes, transaction_combinations and other collections. If a similar data object has already been loaded into the core data store 119 the status of the old and new objects is first compared by the transaction data storage service 522 and older versions of the same objects can be replaced by newer versions. In certain embodiments, the transaction data storage service 514 invokes the data normalization service 534 which runs on the new data object and uses a "fuzzy logic" algorithm to finds matches for events across disparate data records. Examples of criteria used in certain embodiments can include but are not limited to event start time, spelling of team names including use of diacritics, player name spelling, venue name and location and others. In certain embodiments, when matches are found it creates a new data collection in the core data store 119 called a cross_reference_collection where data from matching records are joined. In some embodiments the IDs contained in each data object associated with the same event are normalized to be the same IDs.

Referring to FIG. 5A, in an exemplary embodiment, the live event transaction offer action system 526 fetches, processes and loads dynamic transaction data elements about live transaction events at the moment they are occurring. The scheduled event state checker cron job 528 is scheduled to run at a periodic interval, such as every ten minutes for example, which initiates the scheduled event state checker service 530. The scheduled event state checker service 530 searches the core data store 119 for data objects of type scheduled_events_today. For each scheduled_events_today object it compares the triggerStartDateTime timestamp to the current time of day. If the timestamp falls within a determined time range, the scheduled event state checker service 530 modifies the scheduled_events_today entry in the core data store 119 to change its status to "in progress" and invokes the live transaction offer data fetch service 532 with data about the event from the scheduled_events_today object.

In an exemplary embodiment, based on the data contained in the scheduled_events_today object, the live transaction offer data fetch service 532 requests dynamic data from the corresponding operator transaction data sources 126 such as dynamic live transaction event data including but not limited to updated odds, new prop bet offers, expired bet offers and others. Data objects received by the live transaction offer data fetch service 532 are then pushed to the transaction data ingest queue 506 where they will be analyzed, normalized and transformed by the transaction data transform service 508. The live transaction offer data fetch service 532 simultaneously pushes a copy of the live transaction offer data to the real-time event decision engine service 137 for use in updating transactions that are referenced in arrays of transaction recommendations for users, such as removing bet offers that have a "closed" property from future bet offer recommendation requests. In an exemplary embodiment, data updates are fetched by the live transaction data fetch service 532 on a continuous cycle, such as every 5 seconds for example, until an "event completed" message is received or detected in the data received from the corresponding transaction data service 126. When the "event completed" message is received or detected by the live transaction offer data fetch service 532 it stops requesting new data from the corresponding operator transaction data services 126 and it modifies the corresponding scheduled_events_today entry in the core data store 119 to change its status to "completed" and can do the same for any other associated data objects for the same event used by other services such as the connected scheduled_airings_today object.

Figure 5B:
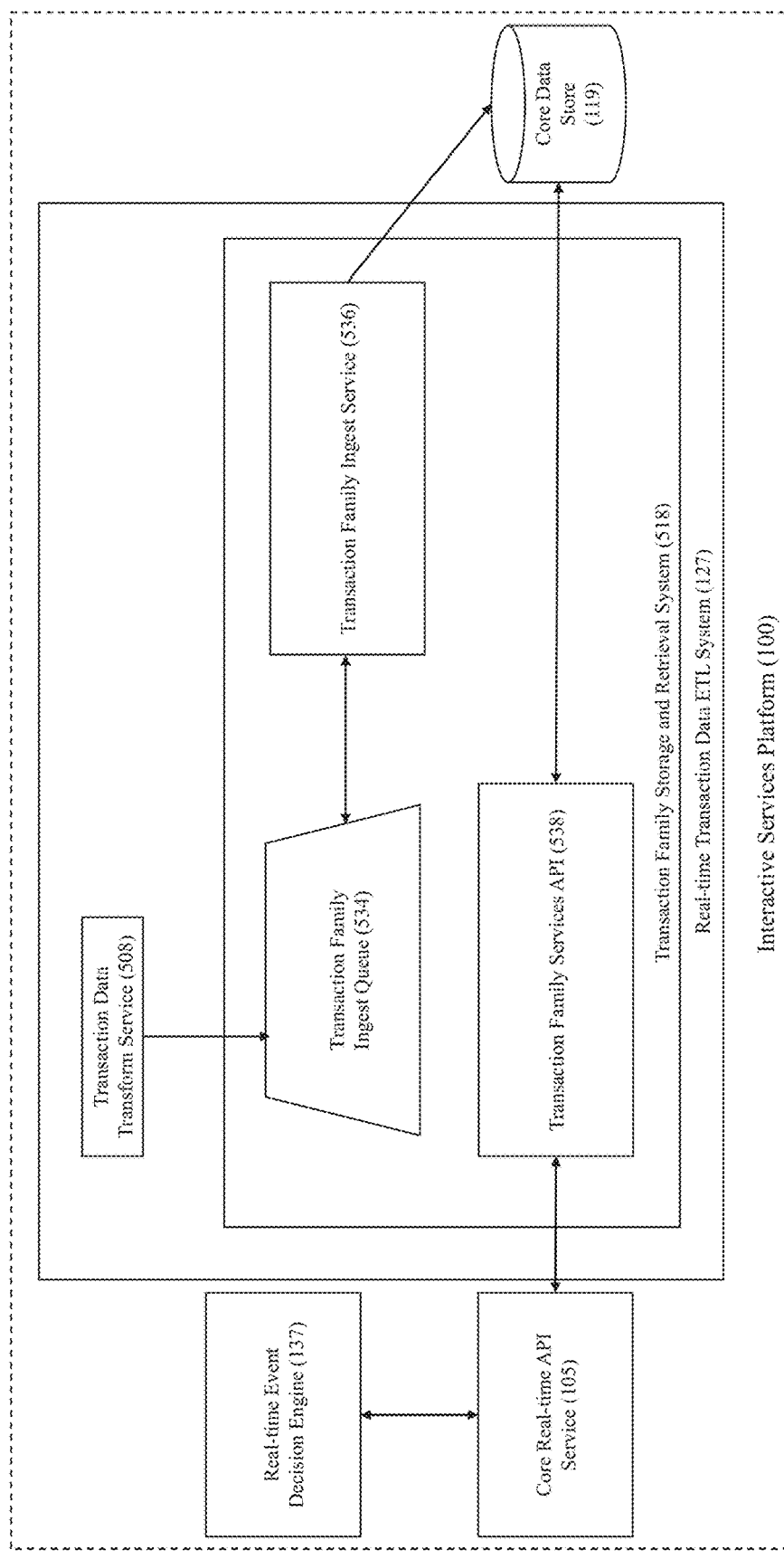
FIG. 5B is a systems diagram of the transaction family storage and retrieval system for creating and extending transaction families as part of the real-time transaction data ETL system, in accordance with an exemplary embodiment.

FIG. 5B depicts an overall system architecture of the transaction family storage and retrieval system 518 in an exemplary embodiment which ingests event transaction data and creates links between each transaction and any other similar transactions for the same event. The transaction data transform service 508 publishes a copy of all transaction offer data objects to the transaction family ingest queue 534 where it sits until it is pulled from the queue by the transaction family ingest service 536. The transaction family ingest service 536 operates continuously and removes an object from the transaction family ingest queue 534 such as the oldest object or newest object placed on the queue and analyzes the data object. For each transaction offer data object the transaction family ingest service 536 loads rules, such as league-specific and bet-offer-type-specific rules, that instruct the service how to create a new augmented transaction data object with the required data necessary to be grouped into a "transaction family" where it can be connected to similar transactions. It runs a process which identifies transactions with similar properties to the augmented transaction and joins the transactions, falling back to creating a new single-transaction family if no relevant transaction families are found. Lastly it sets the joined transactions into a highly performant data cache such as ELASTICACHE as part of the core data store 119 so that it can be easily and quickly retrieved by the transaction family services API 538 when requests for transaction family data are made by the core real-time API service 105.

Referring to FIG. 5B, in an exemplary embodiment, during a live transaction event, the core real-time API service 105 requests an array of recommended transaction IDs for a specific user from the real-time event decision engine 137. For each transaction ID received, the core real-time API service 105 calls the transaction family services API 538 with the transaction ID. The transaction family services API 538 references the transaction ID in the data cache within the core data store 119 and uses the transaction's cache key to find in cache all joined transactions to the transaction ID, constructs the response containing all transactions in the same transaction family as the original transaction ID along with all of the key properties of transactions and delivers the response back to the core real-time API service 105. The core real-time API service 105 sends this data to the client experience service 121 which marries this data marries the data to operator and device specific layout templates and sends its response to the client software 103 to display a carousel of interactive widgets including a widget for the transaction and transaction family.

Figure 5C:
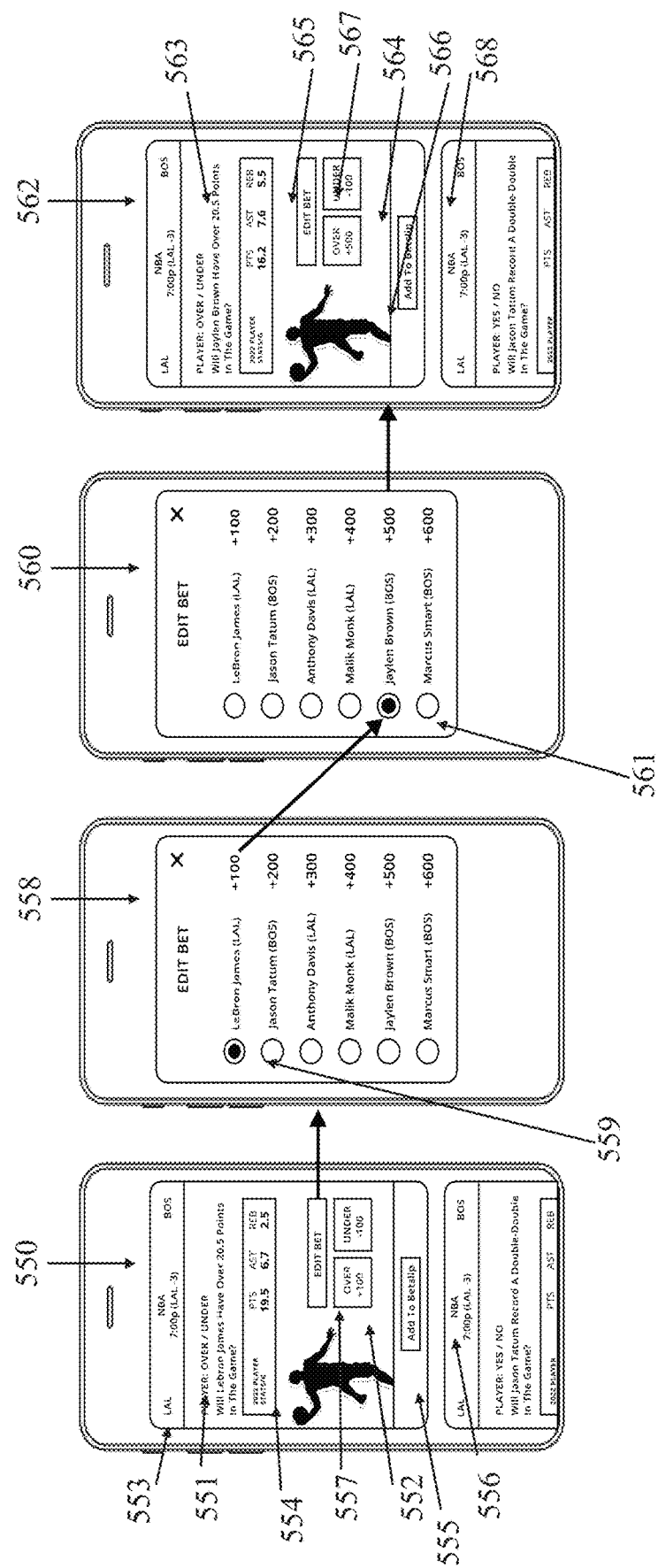
FIG. 5C is a diagram showing an exemplary user interface of the client software where a user is navigating a real-world transaction family and selecting their preferred transaction to place an order, in accordance with an exemplary embodiment.

FIG. 5C illustrates an exemplary user experience in accordance with an embodiment of the invention that demonstrates a unique user experience enabled by the interactive services platform 100 as a result of the transaction family storage and retrieval system 518 working in conjunction with the real-time event decision engine 137 and core real-time API service 105. A user who is using the client software 103 as part of the operator software application 104 on their personal digital device 102 has received a set of recommended offers from the interactive services platform 100 which the client software 103 has presented to the user as a "carousel" of interactive widgets 550 which in this example is during an NBA basketball game event between the Los Angeles Lakers and the Boston Celtics teams. In this embodiment the widget carousel is highlighting a single interactive widget with a recommended bet offer 551, which in this example is a "Player Over/Under" prop bet for whether Los Angeles Lakers player Lebron James will score over 20.5 points in the game with corresponding odds for two possible outcomes 552. In this embodiment the interactive services platform 100 has combined the bet offer 551 with additional related stats and information pertaining to the event and bet offer 551 that were ingested and linked from a sports/event data provider 124 including information about the teams, venue, game clock and score 553, relevant player stats for Lebron James 554 that are relevant to the transaction 551, and an image representing the player Lebron James 555. In this embodiment the user is also shown interactive elements such as buttons representing the outcomes and odds 552 to select, an "Edit Bet" button 557 to explore the family of available transactions connected to the transaction 554 and a button to place a bet by adding it to their betslip 556 as part of the operator software application 104.

Referring to FIG. 5C, the user selects the "Edit Bet" button 557 and is shown a screen with variations on the transaction shown 551 that have been linked by the transaction family storage and retrieval system 518 as members of the transaction family of transaction 551. In this embodiment this is shown to the user in screen 558 as a set of radio buttons with alternate outcomes of the transaction 551 which in this case is allowing the user to select from a list of different players 559 from the Los Angeles Lakers and Boston Celtics with varying odds that they will score over 20.5 in the game including Jason Tatum, Anthony Davis, Malik Monk, Jaylen Brown and Marcus Smart. In screen 560 the user has selected an alternate transaction 561 to the original transaction 551 where the player is Jaylen Brown from the Boston Celtics and is then taken to screen 560 where the user sees the original widget screen updated to reflect the new alternative bet offer 563. Screen 562 is updated with new odds representing the two new bet outcomes 564. In this embodiment the interactive services platform 100 has combined the new bet offer 563 with additional related stats and information pertaining to the event and bet offer 563 that were ingested and linked from a sports/event data provider 124 including relevant player stats for Jaylen Brown 565 that are relevant to the bet offer 563, and an image representing the player Jaylen Brown 566. The user can interact with buttons representing the new outcomes and odds 564 to select, the "Edit Bet" button 567 to continue to explore the family of available bet offers connected to the bet offer 563 and a button to place the bet by adding it to their betslip 568 given the client software is integrated with the operator software application 104.

Figure 5D:
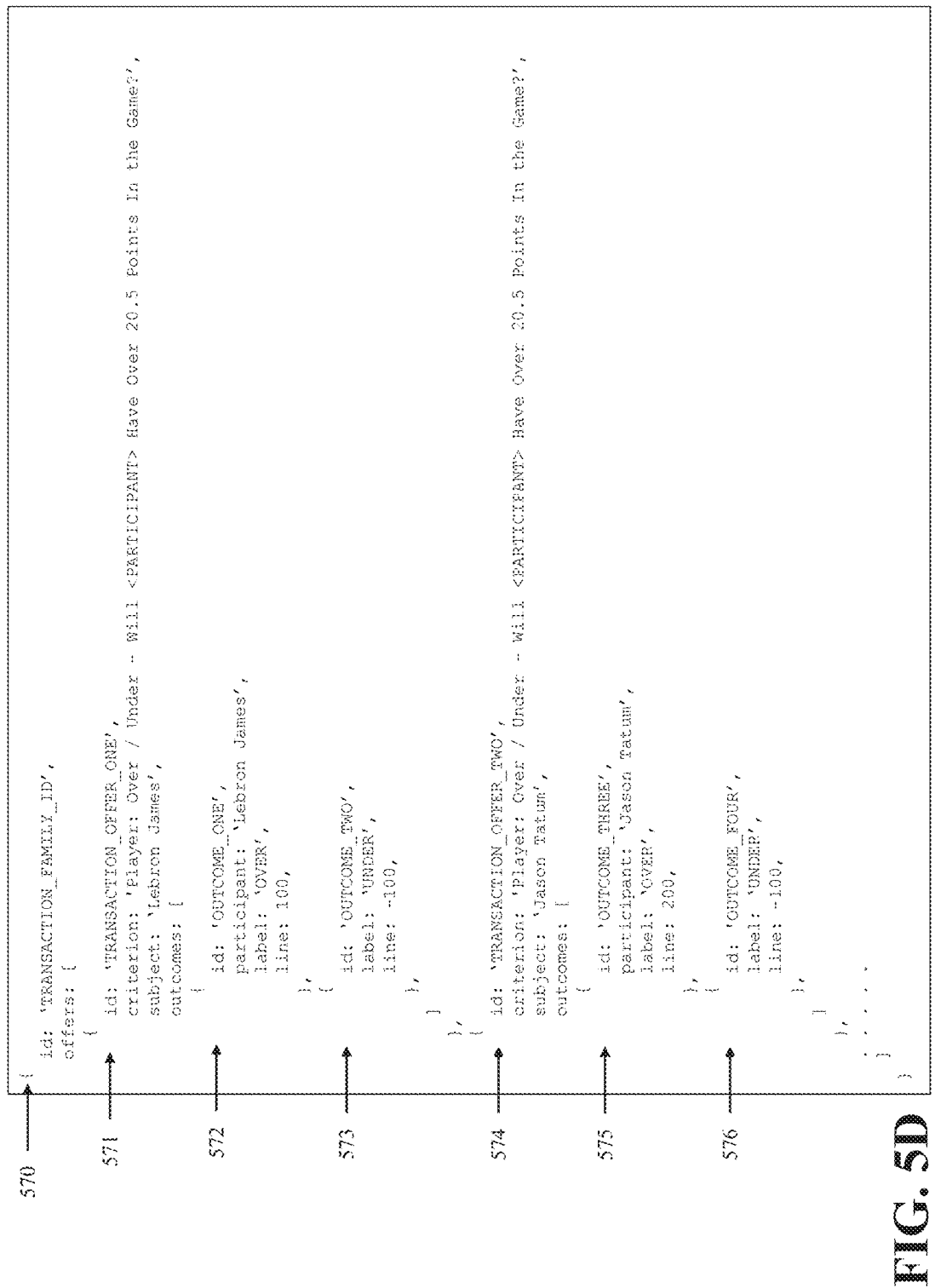
FIG. 5D is a chart diagram of an exemplary transaction family data structure used by the transaction family storage and retrieval system, in accordance with an exemplary embodiment.

FIG. 5D depicts an exemplary transaction family data structure 570 created by the transaction family ingest service and stored in the highly performant cache as part of the core data store 119 that could be used by the client software 103 to display the user experience in FIG. 5C. The transaction family data structure 570 has an ID value 'TRANSACTION_FAMILY_ID' that is mapped to its cache key value for easy lookup and retrieval by the transaction family services API 538. In this exemplary transaction family data object there are two linked transaction offers 571 and 574 where their ID values are mapped to their cache key values. The transaction offers 571 and 574 share a common criterion which in the example is "Player: Over/Under—Will <PARTICIPANT> Have Over 20.5 Points In The Game?" The subject of transaction offer 571 is "Lebron James" while the subject of transaction offer 574 is "Jason Tatum" which represents how the transaction offers will surface in the widget when the transaction family is shown, as is depicted in FIG. 5C. Transaction offer 571 has two possible outcomes and corresponding odds or "lines" 572 and 573, as does transaction offer 574 have two possible outcomes and corresponding "lines" 575 and 576. The exemplary data structure 570 would contain additional transaction offers corresponding to the additional bet options illustrated in FIG. 5C such as "Anthony Davis," "Malik Monk," "Jaylen Brown," and "Marcus Smart."

Figure 6A:
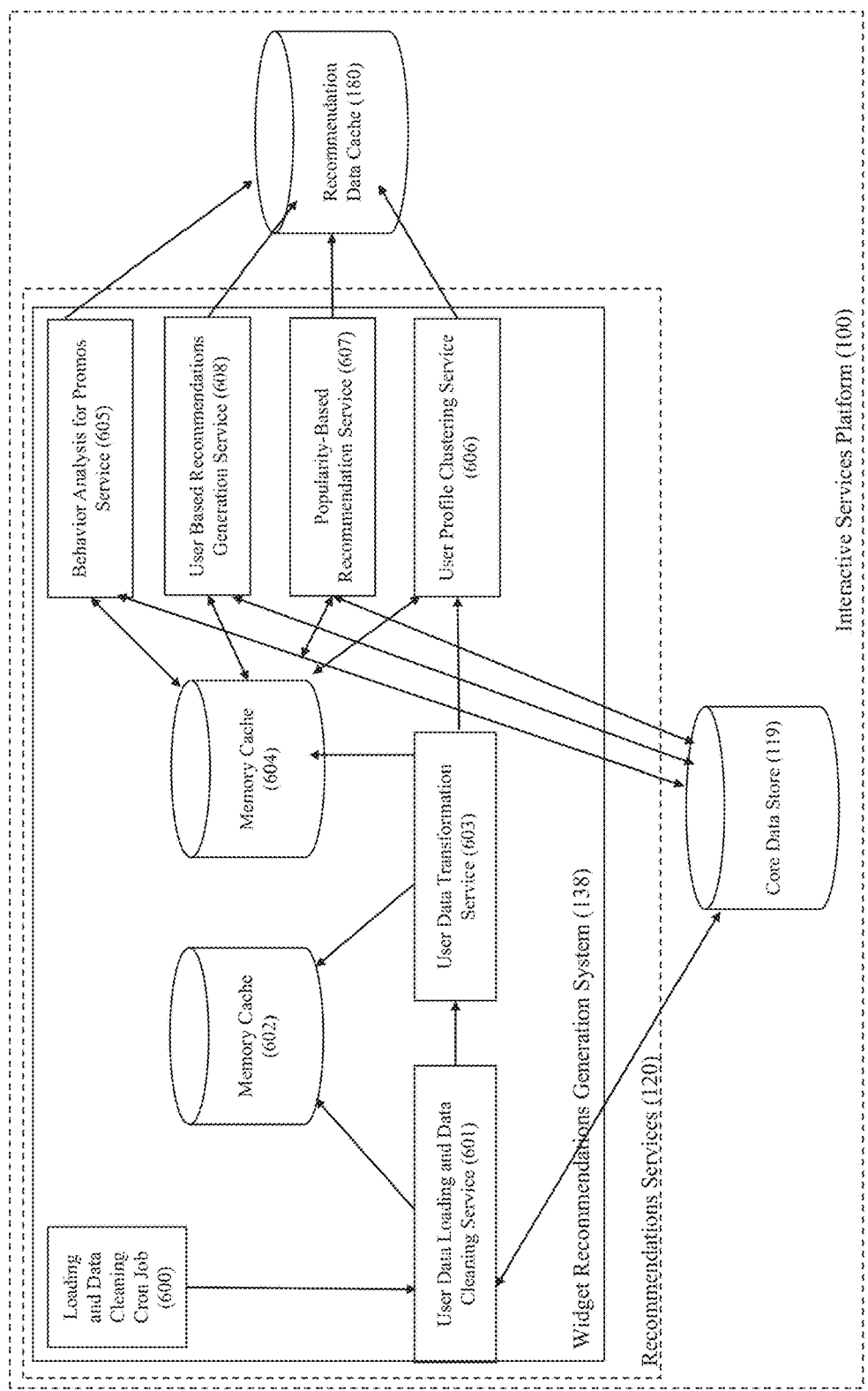
FIG. 6A is a systems diagram of the widget recommendations generation system as a subsystem of the recommendation services system, in accordance with an exemplary embodiment.

FIG. 6A depicts an overall systems architecture of the widget recommendations generation services 138, in an exemplary embodiment, which ingests and normalizes characteristic data about every user to generate personalized recommendations of transactions and promotional offers for future live events. The loading and data cleaning cron job 600 is scheduled to run at a periodic interval, such as every night at 2 AM for example, which initiates the user data loading and cleaning service 601. The user data loading and cleaning service 601 loads member activity data from the core data store 119 for all users that was ingested from multiple member activity services 128 and stores it in a memory cache 602. This data can include past bet opportunities the user has rejected, past bet opportunities the user has taken and the outcome of those bets, as well as many other possible datapoints about the user's behavior with the service provider that can include but are not limited to preferred sport, team, players, devices, bet types, time of day for placing bets, typical amounts wagered and many other datapoints. This data can also include behavior and telemetry data for all users based on their interactions with the client software 103 and operator software application 104 or other operator applications. In addition, the user data loading and cleaning service 601 loads consumer behavior data from the core data store 119 for all users that was ingested from multiple sources for consumer data 135 and stores it in a memory cache 602. This data can include but is not limited to credit history data, demographics data, purchase history data, household income data, online behavior including websites visited and applications used, and many other datapoints.

Referring to FIG. 6A, in an exemplary embodiment, the user data loading and cleaning service 601 loads the datapoints for each user from memory cache 602 and joins the datapoints from all data sources based on common user IDs, cleans the data and stores the joined data into a memory cache 602. The user data loading and cleaning service 601 invokes the user data transformation service 603 which loads the joined cleaned datapoints for all users from memory cache 602 and uses algorithms for dimensionality reduction that synthesizes and reduces the characteristic data for each and every user into a single "observation" array of a reduced set of values and stores them into a memory cache 604. In some embodiments, the user data transformation service 603 runs variance thresholding algorithms known to those skilled in the art which analyzes each column of data to confirm whether it meets an established threshold of values and if it fails to meet the threshold the column is deleted from memory cache 604. In some embodiments, the user data transformation service 603 runs principal component analysis algorithms known to those skilled in the art to determine which dimensions of the data are the ones that show the most significant spread of values as opposed to providing minimal differentiation, with the intent of representing the data in an observation array with the minimum amount of variables/dimensions needed for unsupervised clustering whereby variables with low variance or with dependencies on other variables are deleted from memory cache 604. The output of the user data transformation service 603 are a set of observation arrays for every user stored in memory cache 604 based on historical activity and behavioral attributes that are as efficient as possible for unsupervised clustering.

In an exemplary embodiment, the user data transformation service 603 loads into memory cache 604 all future transactions, promotional offers and event data for future events from the core data store 119. In an exemplary embodiment, the user data transformation service 603 starts multiple recommendation generation services simultaneously which use the observation data calculated for each user stored in the memory cache 604 and analyzes future events, transaction offers and promotional offers to formulate recommended offers using different approaches as certain approaches may be most effective for certain users whereas other approaches will be most effective for other users. In certain embodiments, the user data transformation service 603 initiates the behavior analysis for promos service 605 which loads observation arrays for each user and all available promotional offers from the memory cache 604. Using the observation array for each user calculated by the user data transformation service 603 as well as additional fields of user data from the core data store 119, the behavior analysis for promos service 605 calculates a rank order probability that each promotional offer will appeal to the user and stores the array of promotional offer IDs in rank order in promotional offers recommendation arrays 623 in the recommendation data cache 180. In certain embodiments, based on future events data from the core data store 119 and fields of user data from the core data store 112, the behavior analysis for promos service 605 calculates an array of event IDs for each future event rank ordered by probability that the user would watch the event and stores that array in the recommendation data cache 180 as well as the user data store 114 which can be used to signal the user at the start of events or with special promotional offers including by push notifications, email, in-app messages, text message and other communication forms.

In an exemplary embodiment, the user data transformation service 603 initiates the user profile clustering service 606 which uses unsupervised clustering algorithms to find clusters of users with common behaviors and attributes that will become profiles used to classify all possible transactions based on the likelihood of the transaction to cause each profile member to engage with it. In certain embodiments the user profile clustering service 606 runs unsupervised clustering algorithms known to those skilled in the art such as density-based spatial clustering of applications with noise ("DBSCAN") and algorithms for ordering points to identify the clustering structure ("OPTICS") as well as other similar approaches. After these algorithms have completed, every user in the data set is labeled according to their cluster or profile and that data together with the attributes that define each cluster are recorded in the recommendation data cache 180 as well as the core data store 119. In certain embodiments, the user profile clustering service 606 loads every available transaction for all future events from the core data store 119 and assigns it a probability rating of user engagement for each cluster by calculating the distance of certain attribute values from the value ranges defined by the cluster where the ratings are written into the recommendation data cache 180. In certain embodiments, for every cluster of users, for every future event, an array of transactions is created by the user profile clustering service 606 where the transaction IDs are rank ordered in the array based on the probability the transaction will drive engagement from users who are part of the cluster. The arrays are stored in the profile-specific transaction recommendation arrays 625 (FIG. 6B) in the recommendation data cache 180.

In an exemplary embodiment, the user data transformation service 603 initiates the popularity-based recommendations service 607 which uses the member activity data from the core data store 119 and calculates an array of transaction IDs for every future event rank ordered based on the overall popularity of every transaction for the event (the number of people who have already made the transaction) and stores the array most popular transaction recommendation rrrays 624 in the recommendation data cache 180. In an exemplary embodiment, the user data transformation service 603 initiates the user-based recommendations generation service 608 which loads every available transaction for all future events from the core data store 119 and assigns it a probability rating of appeal to each specific user through use of algorithms that take into account the user's explicit and implicit actions towards historical transactions such as non-negative matrix factorization where the ratings are written into the recommendation data cache 180. In certain embodiments, for every user, for every future event, an array of transactions is created by the user-based recommendations generation service 608 where the transaction IDs are rank ordered in the array based on the probability the transaction will drive engagement from each user. The arrays are stored in user-specific transaction recommendation arrays 626 in the recommendation data cache 180 and the core data store 119.

Figure 6B:
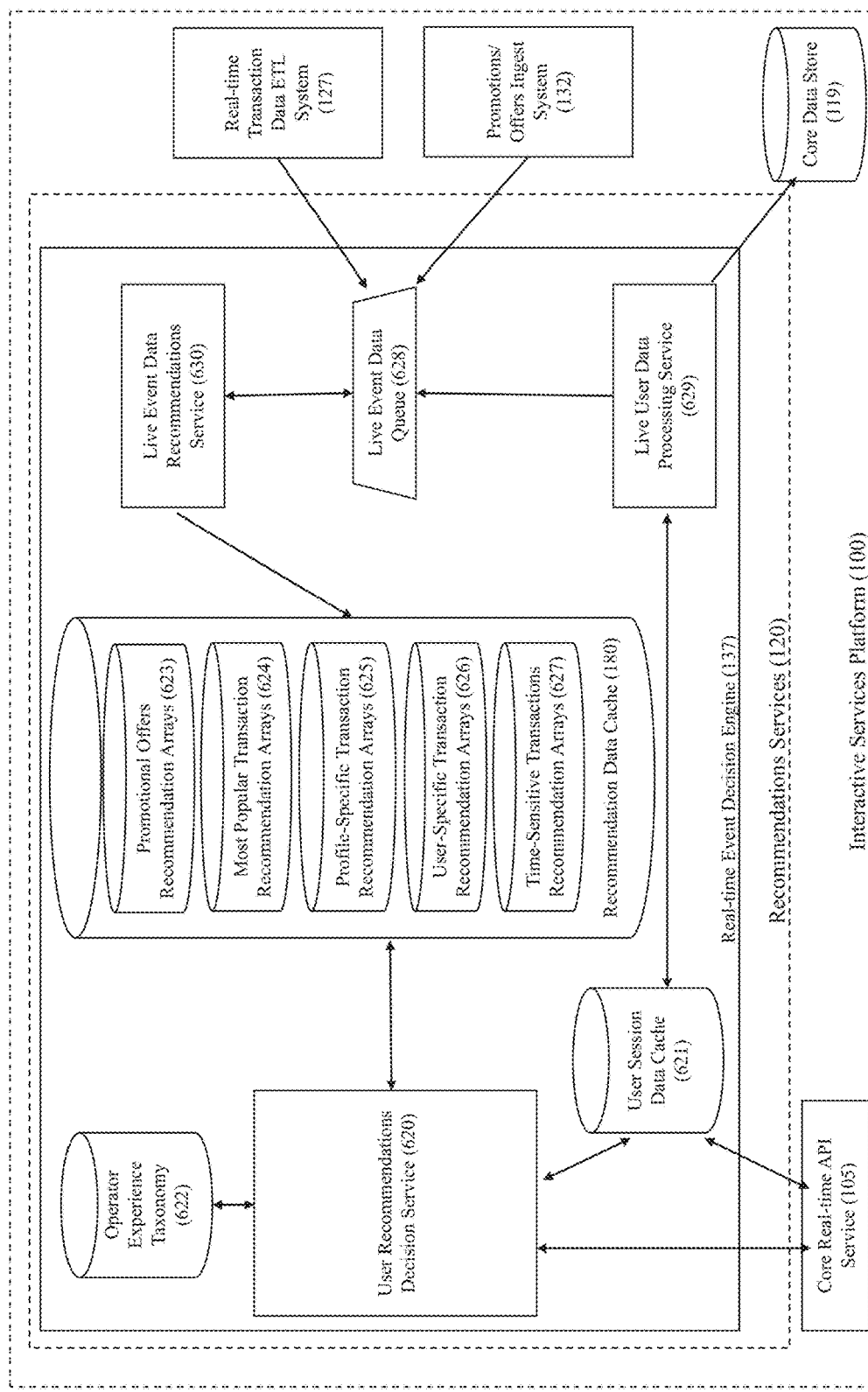
FIG. 6B is a systems diagram of the real-time event decision engine as a subsystem of the recommendation services system, in accordance with an exemplary embodiment.

FIG. 6B depicts an overall system architecture used in certain embodiments of the real-time event decision engine 137 which fulfills requests for a personalized and time-sensitive group of transactions and offers made by the core real-time API service 105. Referring to FIG. 6B, in certain embodiments the user recommendations decision service 620 receives a recommendations request from the core real-time API service 105 with the operator key, user ID, event ID and latency value (e.g., glass-to-glass latency value) for the user environment 101. The user recommendations decision service 620 begins a session for the user ID and uses the user session data cache 621 to retrieve updates from the user's interactions with widgets representing transactions and promotional offers in the client software 103 which can be used to optimize the recommendations decisioning algorithm. In certain embodiments, based on the user's operator key, the user recommendations decision service 620 loads in the appropriate operator experience taxonomy 622 which contains filters and weighting criteria related to recommendation decisioning that has been set as business rules by the operator service provider. Depending on the embodiment, the operator experience taxonomy 622 can include parameters such as the priority weighting of promotional offers in the recommendation's response, the prioritization of time-sensitive transactions such as prop bets in the response, how the latency (e.g., glass-to-glass latency) is applied as a filter to recommending time-sensitive transactions, and others.

In certain embodiments, the user recommendations decision service 620 incorporates operator-specific rules from the operator experience taxonomy 622 and data about any past recommendations presented to the user from the user session data cache 621 and selects recommended transactions and offers to put into a single recommendation array (aggregated, for example, in user recommendations decision service 620) from a pool of multiple event-specific arrays in the recommendation data cache 180 using reinforcement learning algorithms such as the multi-armed bandit algorithm as well as others known to those skilled in the art. In certain embodiments, based on the multi-armed bandit algorithm, the user recommendations decision service 620 may select new transaction IDs from the user-specific transaction recommendation array 626 for the user ID and event ID representing the most highly recommended bet offers that have not yet been shown to the user based on the context of the event and the user's past behaviors and attributes as well as their viewing and/or listening latency. In certain embodiments, based on the multi-armed bandit algorithm, the user recommendations decision service 620 may select new transaction IDs from the most popular transaction recommendation array 624 for the event ID representing the most highly recommended bet offers that have not yet been shown to the user based on the overall popularity of future bets for that event based on the number of members who have already placed those bets.

In certain embodiments, based on the multi-armed bandit algorithm, the user recommendations decision service 620 may select new offer IDs from the promotional offers recommendation array 623 for the user ID and event ID representing the most highly recommended promotional offers that have not yet been shown to the user based on the context of the event and the user's behaviors and attributes. In certain embodiments, based on the multi-armed bandit algorithm, the user recommendations decision service 620 may select new transaction IDs from the profile-specific transaction recommendation array 625 for the event ID and the user's "cluster" representing the most highly recommended bet offers that have not yet been shown to the user based on the context of the event for the segment of users of which the user is a member.

In certain embodiments, based on the multi-armed bandit algorithm, the user recommendations decision service 620 may select new transaction IDs from the time-sensitive transactions recommendation array 627 for the event ID representing time-sensitive transactions that are likely to expire soon (such as player prop bets during a live sports event) based on the context of the event and the user's "glass-to-glass" viewing latency. The user recommendations service 620 returns the ordered array of recommended transaction IDs and offer IDs from multiple sources of recommendations with weighting and presentation priority determined by the multi-armed bandit algorithm to the core real-time API service 105. After the user has been shown interactive widgets created from the recommendation array by the client software 103, the client returns telemetry data to the core real-time API service 105 about what recommendations the user acted upon and which ones they did not act upon which the core real-time API service 105 stores in the user session data cache 621 for the user recommendations decision service 620 to incorporate as part of a feedback loop to optimize the multi-armed bandit algorithm for future recommendations.

Simultaneously, the nature of live events, such as live sports betting events, causes real-time fluctuations of new, changing and expired transactions which can be dynamically incorporated into the recommendations decisioning in some embodiments. Referring to FIG. 6B, in an exemplary embodiment, dynamic updates to an operator's transactions, such as changes to bet markets including updated odds, new prop bet offers, expired bet offers and others, are ingested into data objects by the live transaction data fetch service 532 as part of the real-time transaction data ETL system 127 and copies of those data objects are added to the live event data queue 628. Simultaneously, updated promotional offers such as new offers manually added by operators using the promo/offers management dashboard 131 or dynamically requested from other third-party promotion/offers sources 130 such as dynamic advertising servers are ingested into data objects by the promotions/offers ingest system 132 and are added to the live event data queue 628.

The live user data processing service 629 may also pull telemetry data about the user's engagement with recommended transactions, which it may pull simultaneously or in parallel, and offers through the client software 103 which it copies into data objects and places on the live event data queue 628. In some embodiments this data can include confirmed transactions that the user has placed, feedback of transactions recommended to the user that the user did not act upon, the user's dwell time on certain widgets, as well as feedback from the operator API services that certain transactions have expired. The live user data processing service 508 stores a copy of these data objects into the user data store 119 for use in generating future recommendations for the user by the widget recommendations generation system 138.

In an exemplary embodiment, the live event data recommendations service 508 continuously scans the live event data queue 628 for new data objects and if there is at least one object present it removes the object from the queue 628 and analyzes it. If the data object represents a new time-sensitive or high priority promotional offer the live event data recommendations service 630 adds the offer to the promotional offers recommendation arrays 623 for the corresponding event. If the data object represents a promotional offer that has expired the live event data recommendations service 630 removes the offer from the promotional offers recommendation arrays 623 for the corresponding event. If the data object represents a transaction made by a user, the live event data recommendations service 630 updates the most popular transaction recommendation arrays 624 to reflect the increase in popularity of the transaction and removes the transaction from the user-specific transaction recommendation array 626 for the corresponding event.

In an exemplary embodiment, if the data object represents a new transaction the live event data recommendations service 630 uses an algorithm similar to that used by the user profile clustering service 606 to calculate the probability that the transaction will appeal to each cluster of users by calculating the distance of certain attribute values from the value ranges defined by the cluster; the live event data recommendations service 630 stores the transaction ID into the corresponding cluster array for the event in the profile-specific transaction recommendation arrays 625 where the order of the placement of the ID into the array is based on the probability rating the transaction will appeal to each cluster. If the data object represents a change to a transaction, such as a change to the odds for a live sport event bet offer, the live event data recommendations service 630 removes the old transaction ID from the profile-specific transaction recommendation arrays 625 for the event and uses an algorithm similar to that used by the user profile clustering service 606 to calculate the probability that the updated transaction will appeal to each cluster of users by calculating the distance of certain attribute values from the value ranges defined by the cluster; the live event data recommendations service 630 stores the transaction ID into the corresponding cluster array for the event in the profile-specific transaction recommendation arrays 625 where the order of the placement of the ID into the array is based on the probability rating the transaction will appeal to each cluster. If the data object represents a transaction that has expired the live event data recommendations service 630 removes the transaction ID from all arrays for the event in the recommendation data cache 180. If the data object represents a time-sensitive transaction, such as a player prop bet in a live sport event, the live event data recommendations service 630 adds it to the time-sensitive transactions recommendation 627 arrays.

FIG. 6C depicts an exemplary portion of a user observation array set 640 generated within the widget recommendations generation services 138 by the user data transformation service 603 for use by services such as the user profile clustering service 606 to generate arrays of recommended transactions and promotional offers. Inspecting the user observation array set more closely 641 shows a row of probability values 642 representing the bet history and behaviors of a user with User ID 00016E13-1343-44DE-A7FE-31F8345D0823 whereas the next row of probability values 643 represent the bet history and behaviors of a user with User ID 0002299E-ABE6-4147-94AF-3CE1C6B4D3DE. Each column in the representative user observation array set 641 represents a probability value synthesized across characteristic data that can include the user's bet history as ingested from operator member activity services 128, consumer data sources 135 or based on past user interactions with the client software 103 as stored in the core data store 119.

In some embodiments column 644 represents an "odds" value that can be the average (decimal/European) odds placed by the user across all their observed bets. In some embodiments column 645 represents a "bets_placed" value that can be a normalized representation of the total number of bets placed by the user. In some embodiments column 646 represents a "stake" value that can be a normalized representation of the average stake per bet placed by the user. In some embodiments column 647 represents a "combination_odds_latest" value that can be the average of the updated combination odds for all combinations placed by the user (including single bet combinations). In some embodiments column 648 represents a "combination_depth" value that can be the average depth of the combinations placed by that user, where a 0 value would mean the user only placed single bet combos. In some embodiments column 649 represents a "mobile_bet_count" value that can be the proportion of bets the user placed in the software client 103 running as a component of the operator software application 104 on a mobile device. In some embodiments column 650 represents a "web_bet_count" value that can be the proportion of bets the user placed in the software client 103 running as part of an operator's software 104 in the form of a web browser-based experience. In some embodiments the observation array 641 represents each user's affinity to certain teams within certain sports leagues such as column 651 which represents a "michigan_bet_count" value that can be the proportion of bets the user placed that favored the University of Michigan college football team in the NCAA football league. In some embodiments column 652 represents a "penn_bet_count" value that can be the proportion of bets the user placed that favored the Penn State college football team in the NCAA football league. In some embodiments the observation array 641 can represent each user's affinity for certain bet types such as column 653 which represents a "BET_BUILDER_bet_count" value that can be the normalized proportion of bets the user placed that where classified as a "bet builder" type. In some embodiments column 654 which represents a "SIMPLE_bet_count" value that can be the normalized proportion of bets the user placed that where classified as a "simple" type. In some embodiments the observation array 641 can represent the proportion of bets the user placed in any given category such as the columns 655 which represent each user's normalized proportion of bets in an exemplary set of bet categories. Though the exemplary data structures provided in FIG. 6C are in a tabular format, it will be appreciated to one skilled in the art that there are numerous possible embodiments such as data structures in NoSQL and other combinations that will be useful in some embodiments.

Figure 7:
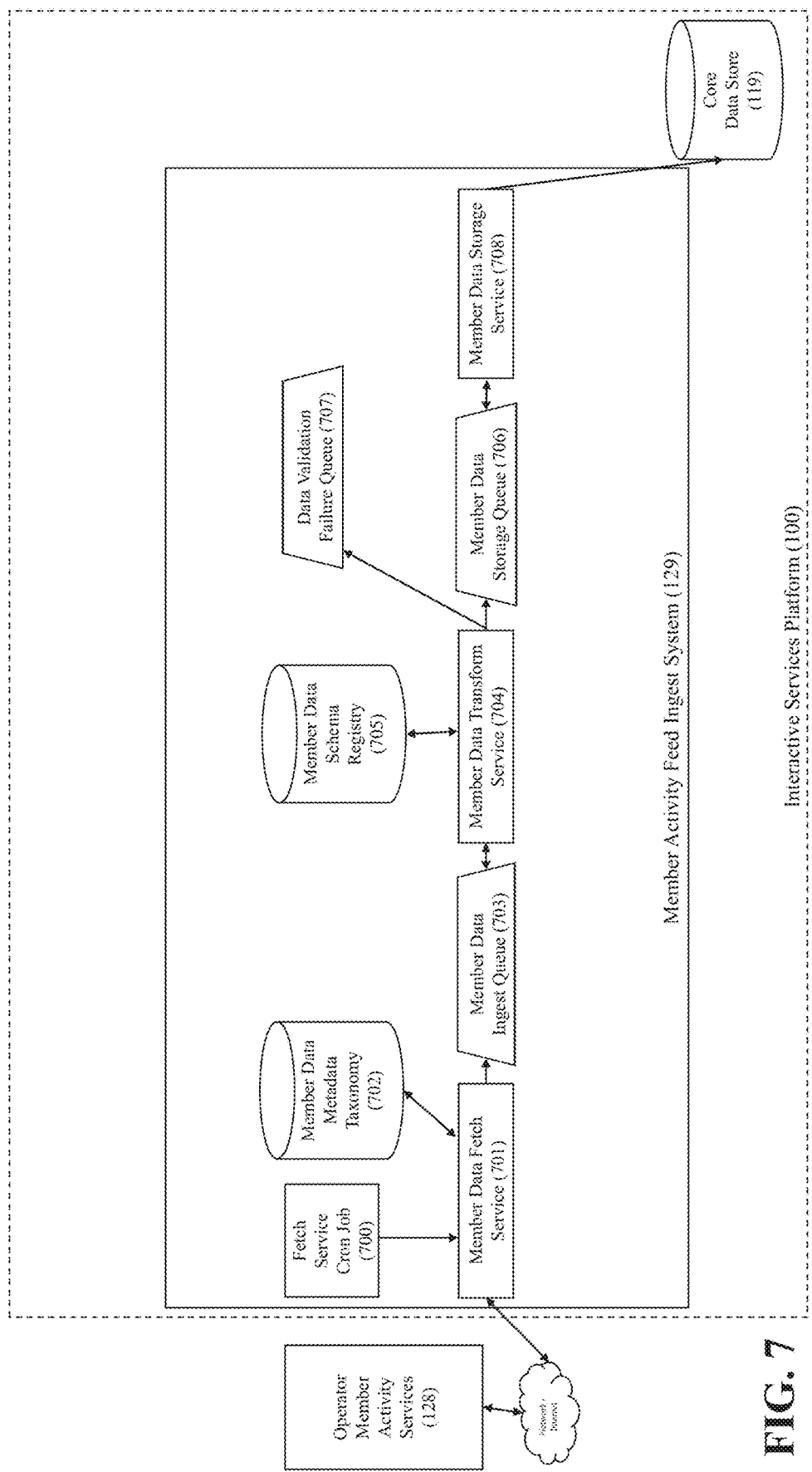
FIG. 7 is a systems diagram of the member activity feed ingest system ingesting and processing historical behavior data from users with operator services, in accordance with an exemplary embodiment.

FIG. 7 depicts an exemplary overall system architecture of the member activity feed ingest system 129 which ingests, normalizes and stores member activity feed data from multiple operator member activity services 128 into the core data store 119 using a similar system and method to that which is used for live event data as shown in FIG. 4A. The member activity feed ingest system 129 retrieves data about transactions that have been made by members of operator services, including data describing member activities such as bets that users have placed with sportsbook operators, over a communications network such as the Internet from a variety of operator transaction data sources 128 including providers such as BET365, KAMBI GROUP, IGT and directly from sportsbook operators themselves. In certain embodiments, this data can include not only explicit actions taken by users such as bets placed with sportsbook operators or ICASINO games played, but also implicit actions recorded such as bet offers or promotional offers that were viewed but not acted upon either as part of their use of the client software 103, the operator software application 104 or other software applications.

Referring to FIG. 7, in an exemplary embodiment, a fetch service cron job 700 is scheduled to run at a periodic interval such as every hour which initiates the member data fetch service 701. The member data fetch service 701 first loads the published member data metadata taxonomy 702 which defines the key data properties that can be pulled by the member data fetch service 701 from each operator member activity service 156, which can include attributes including but not limited to member ID, transaction ID, event ID, amount spent or stake, odds at the time the bet was placed, origin of the transaction, and others. The member data metadata taxonomy 702 also contains rules about each member activity data provider 156 such as whether the provider will return a large data table containing all desired attributes about a member, including all actions taken by the member, or if the provider will return specific data structures for each member or event containing IDs for more granular data structures which are used for subsequent data requests.

Based on the data contained within the member data metadata taxonomy 702 the member data fetch service 701 contacts each operator member activity data source 156 to request data about transactions made by every user for completed and future events. In some embodiments, data received from the operator member data service 128 are stored in either transaction_combinations data objects and transaction_outcome_selections data objects by the member data fetch service 701 and are pushed to the member data ingest queue 703 where they sit until they are pulled from the queue by the member data transform service 704. In other embodiments, data received from the operator member activity data service 128 are stored in a single complex data object by the member data fetch service 701 and is pushed to the member data ingest queue 703 where it sits until it is pulled from the queue by the member data transform service 704.

In an exemplary embodiment, the member data transform service 704 runs continuously and scans the member data ingest queue 703 for any objects of data to be removed from the queue and analyzed. The member data transform service 704 loads the published member data schemas from the member data schema registry 705 which contain data schemas used to validate and normalize each data object retrieved from the member data ingest queue 703 based on an understanding of the proper data formatting from each member activity data provider 128 as well as normalized data structures that can be consistent across all data providers.

The member data transform service 704 removes an object from the member data ingest queue 703 and analyzes the data object. The data object is validated against the appropriate member data schema from the member data schema registry 705 to ensure each field of data inside the data object is valid according to the schema. If the fields of the data object are valid according to the appropriate schema, then the data object is normalized to a new data structure based on a normalized schema independent of operator member activity data provider 128 and placed on the member data storage queue 706 where it sits until it is pulled from the member data storage queue 706 by the member data storage service 708. If the data object is determined to be invalid based on the appropriate schema from the member data schema registry 705 it is moved to the data validation failure queue 707 for later examination.

Referring to FIG. 7, in an exemplary embodiment, the member data storage service 708 runs continuously and scans the member data storage queue 706 for any objects of data to be removed from the queue and analyzed. For each data object the member data storage service 708 removes from the member data storage queue 706 and analyzes, based on its data object type it is stored into a specific location or collection type in the core data store 119.

Figure 8:
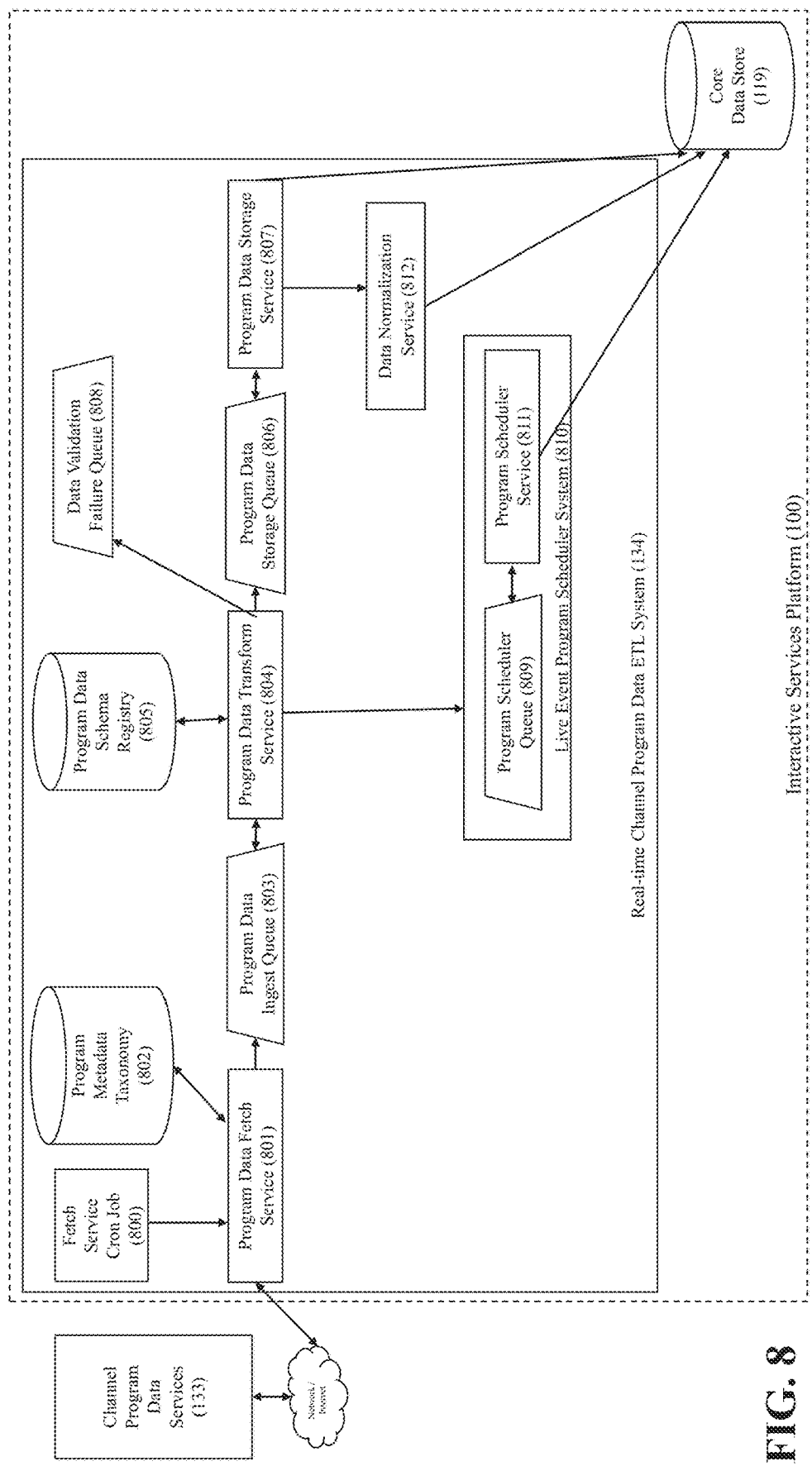
FIG. 8 is a systems diagram of the real-time channel program data ETL system including the live event program scheduler subsystem, in accordance with an exemplary embodiment.

FIG. 8 depicts an exemplary embodiment of an overall system architecture of the real-time channel program data ETL system 134 which ingests, normalizes, stores and schedules live event viewing schedule data from multiple channel program data services 133 into the core data store 119 using a similar system and method to that which is used for live event data as shown in FIG. 4A. The real-time channel program data ETL system 134 retrieves data about future live events such as live sports events including the details about timing, national and/or local channel, service provider or streaming platform to view the event, over a communications network such as the Internet from a variety of channel program data services 152 including GRACENOTE and TIVO/ROVI as well as schedule data delivered directly from broadcast/streaming platforms themselves.

Referring to FIG. 8, in an exemplary embodiment, a fetch service cron job 800 is scheduled to run at a periodic interval such as at 12 AM every day which initiates the program data fetch service 801. The program data fetch service 801 first loads the published program metadata taxonomy 802 which defines the relevant program set for the interactive services platform 100 such as the program data feed sources, supported event types such as which sports leagues are supported and the key data properties related to those event sets that need to be pulled by the program data fetch service 801 from each channel program data service 166, which can include but is not limited to attributes such as video service provider channel lineups, channel numbers, channel logo images, channel and network unique identifiers, program identifiers, program title, program description, program duration, program rating and other detailed data surrounding audiovisual programming.

Based on the data contained within the program metadata taxonomy 802 the program data fetch service 801 contacts each channel program data source 133 to request upcoming channel program data for all providers for a fixed time duration (such as the next seven days for example). In some embodiments, for every schedule it receives from a channel program data service 133 the schedule will contain a list of program IDs for each item in the schedule as well as other related metadata. In some embodiments, data received from the channel program data service 166 are stored in data objects by the program data fetch service 801 and are pushed to the program data ingest queue 803 where they sit until they are pulled from the queue by the program data transform service 804.

In an exemplary embodiment, the program data transform service 804 runs continuously and scans the program data ingest queue 803 for any objects of data to be removed from the queue and analyzed. The program data transform service 804 loads the published program data schemas from the program data schema registry 805 which contain data schemas used to validate and normalize each data object retrieved from the program data ingest queue 803 based on an understanding of the proper data formatting from each channel program data provider 133 as well as normalized data structures that can be consistent across all channel program data providers.

The program data transform service 804 removes an object from the program data ingest queue 803 and analyzes the data object. The data object is validated against the appropriate program data schema from the program data schema registry 804 to ensure each field of data inside the data object is valid according to the schema. If the fields of the data object are valid according to the appropriate schema, then the data object is normalized to a new data structure based on a normalized schema independent of channel program data provider 133 and placed on the program data storage queue 806 where it sits until it is pulled from the program data storage queue 806 by the program data storage service 807. If the data object is determined to be invalid based on the appropriate schema from the data schema registry 805 it is moved to the data validation failure queue 808 for later examination.

In some embodiments, if the valid normalized data object is an airings data object a copy of the data object is published by the program data transform service 804 to the program scheduler queue 809 inside the live event program scheduler system 810. Inside the live event program scheduler system 810 the program scheduler service 811 continuously pulls in each airings data object from the program scheduler queue 809 and analyzes it. If the event start time property of the live event program described in the airings data object is the present day, the program scheduler service 811 creates a new data object of type scheduled_airings_today and maps the data from the airings data object into it. The program scheduler service 811 further analyzes the event start time property and writes a new triggerStartDateTime value into the new data object which is a timestamp of when all real-time ingest systems within the interactive services platform 100 should begin to ingest their sources. In some embodiments, this includes scheduling the real-time channel/synch data system 117 to start to analyze the audiovisual feed from the channel feed/synch service 122 for the live event program for use with synchronization and latency (e.g., glass-to-glass latency) calculation by the client software 103. In some embodiments, the program scheduler service 811 loads the new scheduled_airings_today object directly into the core data store 119. If a similar data object has already been loaded into the core data store 119 the status of the old and new objects is first compared by the program scheduler service 811 to make sure data about an in-progress event is not being overwritten.

Referring to FIG. 8, in an exemplary embodiment, the program data storage service 807 runs continuously and scans the program data storage queue 806 for any objects of data to be removed from the queue and analyzed. For each data object the program data storage service 807 removes from the program data storage queue 806 and analyzes, based on its data object type it is stored into a specific location or collection type in the core data store 138. If a similar data object has already been loaded into the core data store 138 the status of the old and new objects is first compared by the program data storage service 807 and older versions of the same objects can be replaced by newer versions. The program data storage service 807 invokes the data normalization service 812 which runs on the new data object and uses a "fuzzy logic" algorithm to finds matches for events and programs across disparate data records. Examples of criteria used in some embodiments are event start time, spelling of team names including use of diacritics, player name spelling, venue name and location and others. When matches are found it creates a new data collection in the core data store 138 called a cross_reference_collection where data from matching records are joined. In some embodiments the IDs contained in each data object associated with the same event are normalized to be the same IDs.

Figure 9:
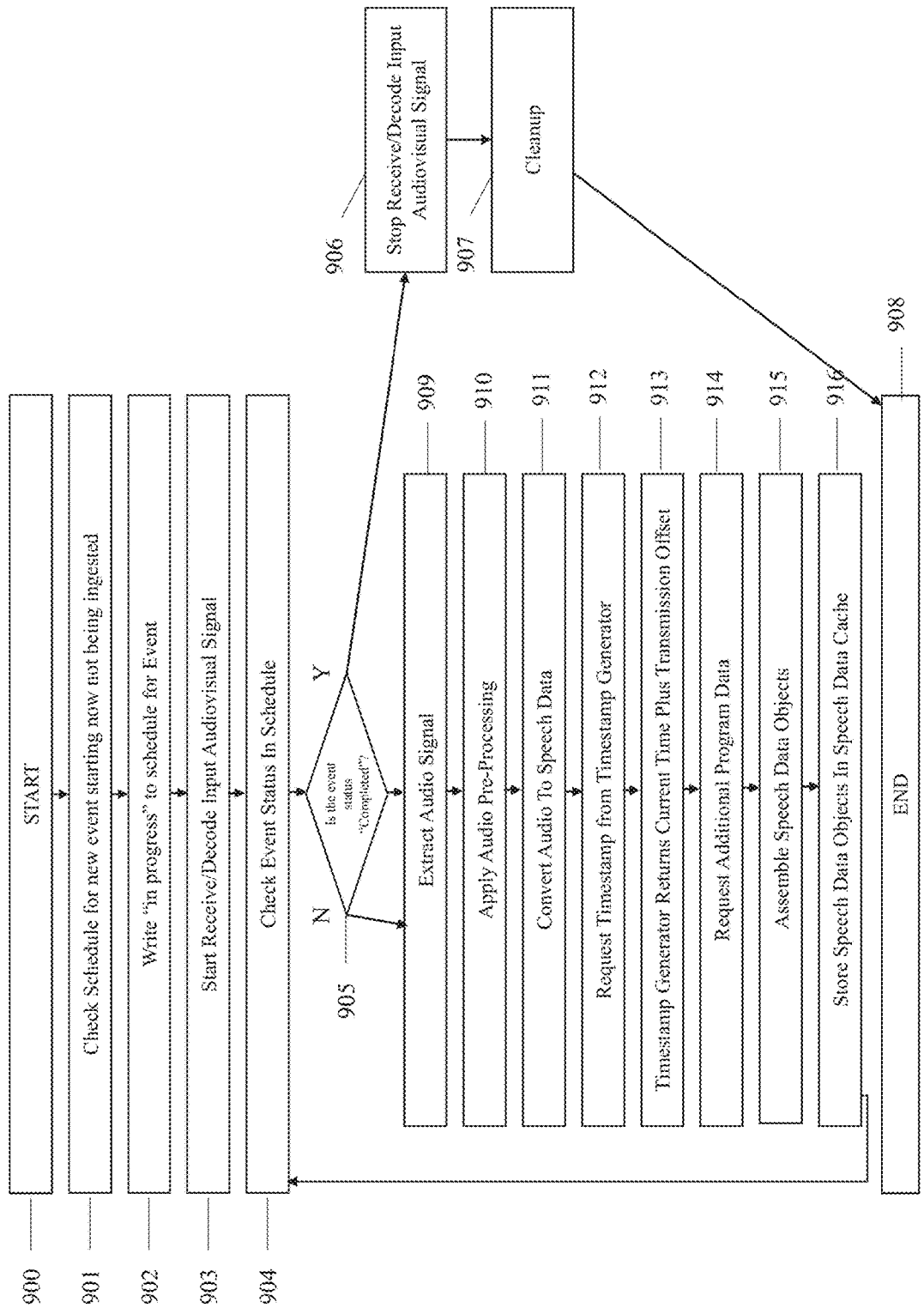
FIG. 9 is a method chart of the process of ingesting audiovisual content for a scheduled live event, converting to phoneme data and storing with timestamps and program data, in accordance with an exemplary embodiment.

FIG. 9 is a flow chart illustrating exemplary steps for the real-time channel/synch data system 117 to ingest audiovisual content for a scheduled live event, convert to phoneme data and store with timestamps and program data in the speech data cache 123. Referring to FIG. 9, the exemplary steps start at 900. In step 901 the real-time channel/synch data system 117 continuously checks the scheduled_airings_today data objects in the core data store 138 for events whose triggerStartDateTime value fall into a particular range from the current time and are not already "In Progress" or "Completed." In step 902 if it finds an event that meets this criteria it marks the event as "In Progress" in the scheduled_airings_today data object. In step 903 the real-time channel/synch data system 117 begins receiving and decoding the input audiovisual signal corresponding to the event in the scheduled_airings_today object from the channel feed/synch services 122. In step 904 the real-time channel/synch data system 117 checks the event status of the scheduled_airings_today data object to see if another service has marked the event as "Completed." In step 905 if the event status is "Completed" it proceeds to step 906, otherwise it proceeds to step 909. In step 906 the event has ended and the decoding of the input audiovisual signal is stopped. In step 907 any necessary cleanup steps are taken including in some embodiments an "Event End" data table is written to the speech data cache 123. The exemplary steps may proceed to the end step 908.

Referring to FIG. 9, in step 909 the real-time channel/synch data system 117 extracts the audio data from the decoded audiovisual signal for a fixed window of time (such as 5 seconds for example). In step 910 the audio pre-processing service 2194 creates multiple duplicate copies of the audio data and applies multiple filters to each to simulate different microphone and room audio conditions for various personal digital devices 102 that can affect phoneme conversion. In step 911 for each set of pre-processed audio data, the audio-to-phoneme converter 2195 converts the data to a set of phonemes mapped to a time duration within the audio data (such as 150 milliseconds for example). In step 912 the speech guide and time data multiplexor 318 requests a timestamp for the audio data from the timestamp generator 320 passing the program ID identifying the channel feed/synch service 122 that was the source of the input audiovisual signal such as but not limited to a broadcast television network delivered over-the-air 2199, a cable/satellite channel from a cable/satellite provider 2198, or an Internet-based live/VOD streaming service 2197. In step 913 the timestamp generator 320 returns a timestamp value to the speech guide and time data multiplexor 318 that is the sum of the current timestamp plus a latency offset value that is an estimate of the known latency of the audiovisual channel source and corresponding delivery and transmission chains associated with the program ID.

In step 914 in certain embodiments the speech guide and time data multiplexor 318 requests additional program data related to the program ID from the core data store 119 such as but not limited to channel numbers, channel logo images, channel and network unique identifiers, program identifiers, program title, program description, program duration, program rating and other detailed data surrounding audiovisual programming. In step 915 the speech guide and time data multiplexor 318 assembles speech data objects combining phoneme streams, timestamp data and program data for each personal digital device 102. In step 916 the speech guide and time data multiplexor 318 stores the speech data objects into the speech data cache 123 such that the core real-time API service can fetch the most current time window of speech data to return to the client software 103. The real-time channel/synch data system 117 proceeds to return to step 904 to repeat.

Figure 10A:
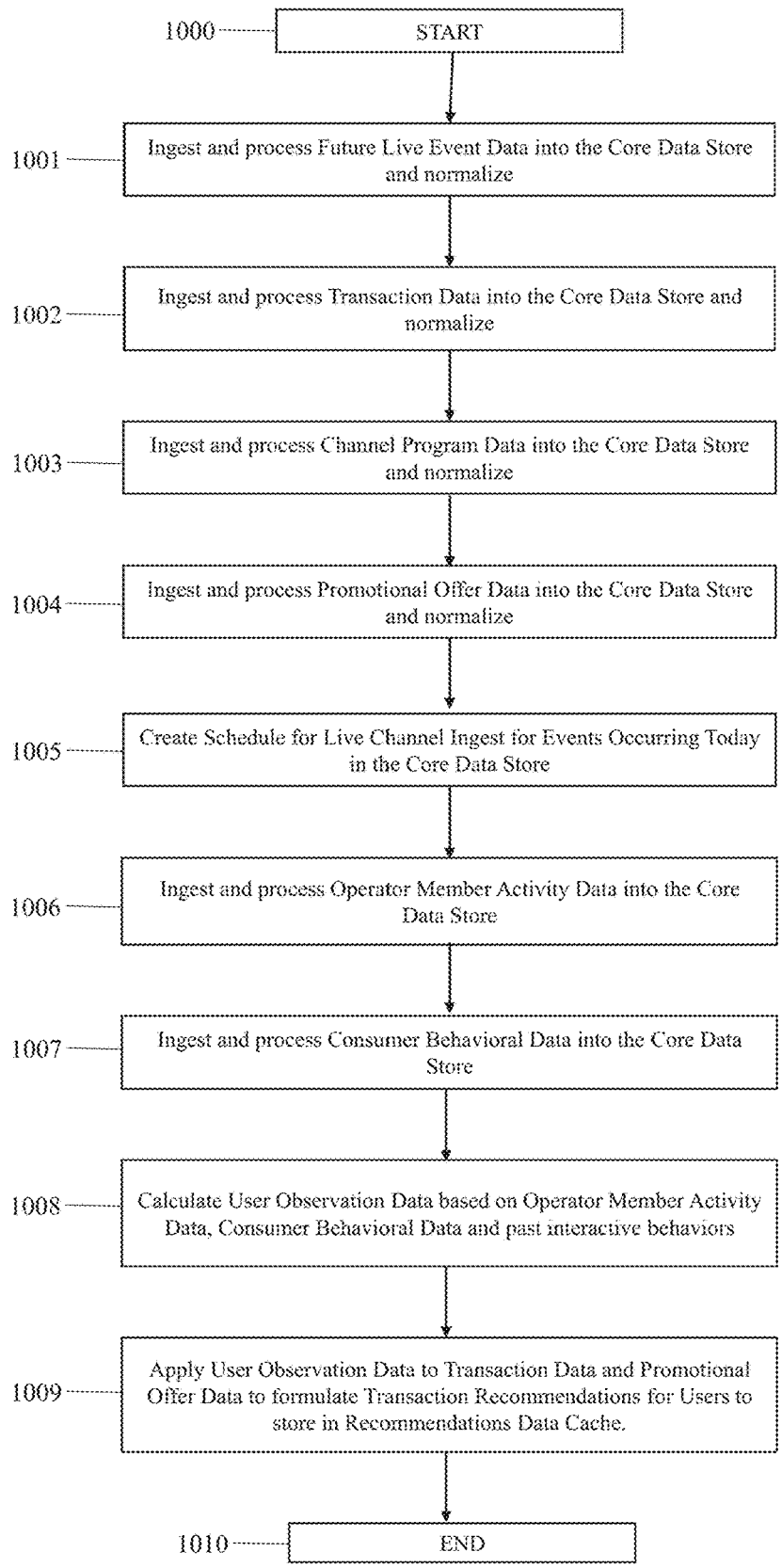
FIG. 10A is a method chart of the process of event data and user data ingestion, processing, normalizing and linking to generate recommendations in advance of a live event, in accordance with an exemplary embodiment.

FIG. 10A is a flow chart illustrating exemplary steps for the preparation work of ingesting, normalizing and analyzing multiple disparate datasets surrounding future live events with the goal of recommending real-time, personalized interactive offers to users such as sports bet offers synchronized to televised events in accordance with an embodiment of the invention. Referring to FIG. 10A, the exemplary steps start at 1000. In step 1001 future event data such as data describing future sports schedules, games, teams and participants is ingested from sport/event data services 124 and processed by a real-time live sport/event data ETL system 125 and stored into the core data store 119 where it is normalized and connected to other similar data objects. In step 1002 future event transaction data such as data describing bet offers and outcomes for future sports events is ingested from transaction data services 126 and processed by a real-time transaction data ETL system 127 and stored into the core data store 119 where it is normalized and connected to other similar data objects.

In step 1003 channel program data describing the times, channels and services where future events such as live sports events can be consumed as an audiovisual program is ingested from channel program data services 133 and processed by a real-time channel program data ETL system 134 and stored into the core data store 119 where it is normalized and connected to other similar data objects. In step 1004 data containing promotional offers and advertisements are ingested from promotions/offers services 130 and the promo/offers management dashboard 131 and processed by a promotions/offers ingest system 132 and stored into the core data store 119 where it is normalized and connected to other similar data objects. In step 1005 a schedule can be created for the real-time channel/synch data system 117 which specifies exactly what times and channels to ingest audiovisual content from channel feed/synch services 122 for use with content identification and latency calculation in conjunction with the client software 103.

In step 1006 member activity data such as data describing historical transactions made by users that are members of operator services such as historical bets placed with online sports betting providers are ingested from operator member activity services 128 and processed by a member activity feed ingest system 129 and stored into the core data store 119. In step 1007 consumer behavioral data for users such as transactions made on external services and detailed demographic data are ingested from consumer data sources 135 and processed by the user data query service 136 and stored in the core data store 119. In step 1008 the widget recommendations generation services 138 calculates observation data for every user based on operator member activity data for that user from step 1006, consumer behavioral data from step 1007 and data about past interactions with the client software 103 stored in the core data store 119. In step 1009 the widget recommendations generation services 138 applies the observation data to transaction data from step 1008 and promotional offer data from step 1004 to formulate transaction and offer recommendations for all users for all future events and stores the recommendations in the recommendation data cache 180. The exemplary steps may proceed to the end step 1010.

Figure 10B:
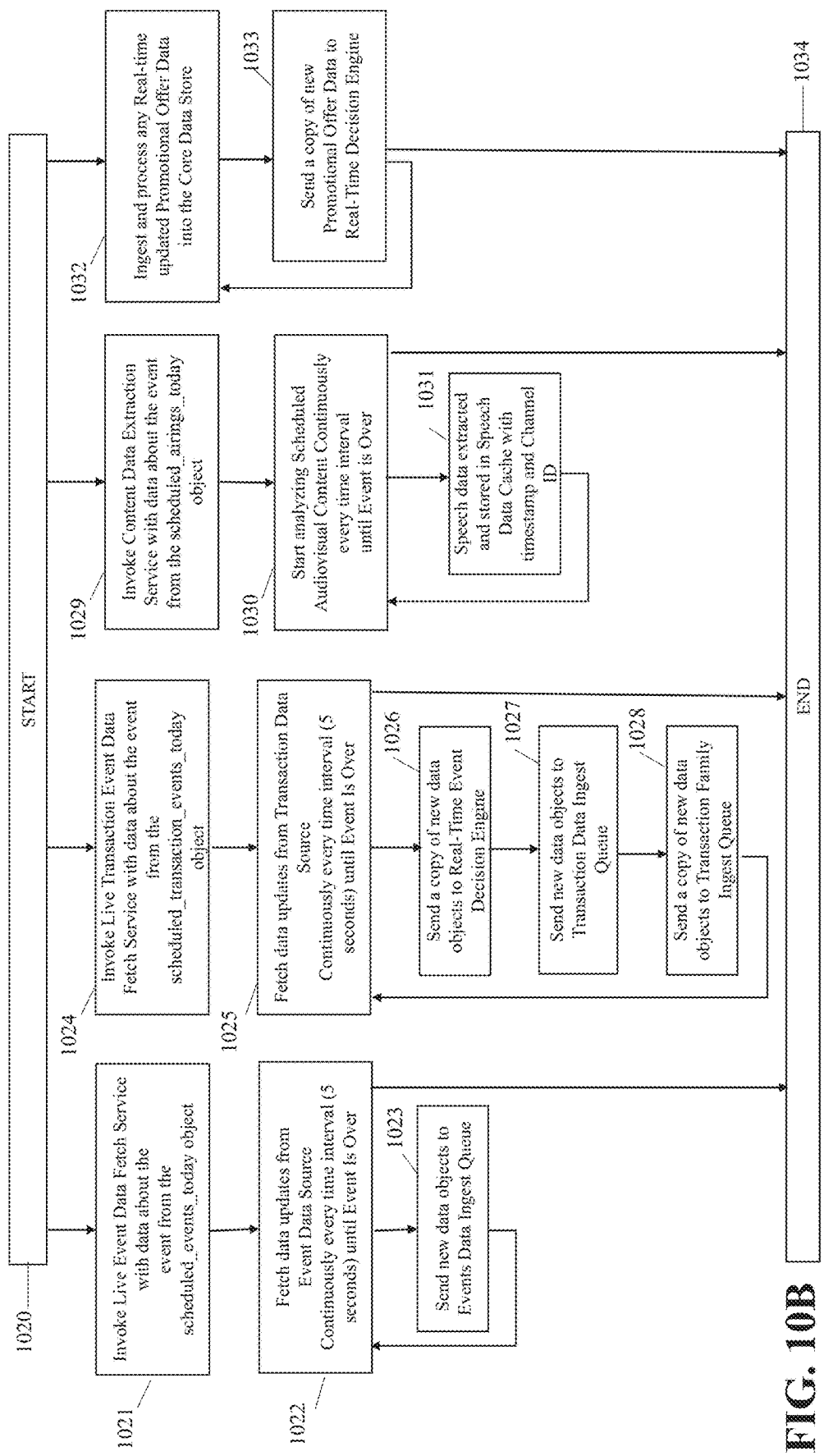
FIG. 10B is a method chart of the simultaneous ingestion and processing of dynamic data by the event data ingest normalization and transformation services during a live event, in accordance with an exemplary embodiment.

FIG. 10B is a flow chart illustrating exemplary steps for the ingesting, normalizing and processing multiple disparate datasets surrounding events that are dynamically updating in real-time as the event is taking place with the goal of recommending real-time, personalized interactive offers to users such as sports bet offers synchronized to televised events in accordance with an embodiment of the invention. Referring to FIG. 10B, the exemplary steps start at 1020. In step 1021 based on the ingest start time of a scheduled event such as a live sport event, the scheduled event state checker service 428 invokes the live event data fetch service 430 with data about the event from the scheduled_events_today object. In step 1022, based on the data contained in the scheduled_events_today object, the live event data fetch service 430 requests dynamic data from the corresponding sports/event data sources 124 including dynamic live sports event data used to enhance the user experience and enhance recommended transactions such as live stats, noteworthy in-game events and box scores. In step 1023 for every new set of data received the corresponding new data objects are pushed to the events data ingest queue 406 for processing. Data updates are fetched on a continuous cycle such as every 5 seconds until an "event completed" message is received or detected in the data received from the corresponding sports/event data service 124.

In step 1024, which can occur simultaneously to step 1021, based on the ingest start time of a scheduled transaction event such as a live sport event with bet offers, the scheduled transaction event state checker service 530 invokes the live transaction event data fetch service 532 with data about the event from the scheduled_transaction_events_today object. In step 1025, based on the data contained in the scheduled_transaction_events_today object, the live transaction event data fetch service 532 requests dynamic data from the corresponding transaction data sources 126 such as updated odds, new prop bet offers, expired bet offers and others and stores them in data objects. In step 1026 the live bet offer data fetch service 532 pushes a copy of the live transaction data to the real-time event decision engine service 137 for use in updating transactions that are referenced in arrays of transaction recommendations for users, such as removing bet offers that have a "closed" property from future bet offer recommendation requests. In step 1027 for every new set of transaction data received the corresponding new data objects are pushed to the transaction data ingest queue 506 for processing by the transaction data transform service 508. In step 1028 if the data object is a transaction_offers data object a copy of the data object is simultaneously published by the transaction data transform service 508 to the transaction family storage and retrieval system 518 where links will be established between the transaction and any other similar transactions for the same event. Transaction data updates are fetched on a continuous cycle, such as every 5 seconds for example, until an "event completed" message is received or detected in the data received from the corresponding transaction data service 126.

In step 1029, which can occur simultaneously to step 1021 and step 1024, based on the start time of a scheduled broadcast audiovisual event such as a live sport event, the real-time channel/synch data system 117 can invoke the phoneme extraction services 2194 and 2195 with data about the event from the scheduled_airings_today object. In step 1030, based on the data contained in the scheduled_airings_today object, the live broadcast event content data extraction service begins receiving the incoming audiovisual broadcast and converting audio data to speech data. In step 1031 the live broadcast event content data extraction service extracts speech data from the incoming audiovisual broadcast and stores it in the speech data cache 123 together with the channel ID and timestamp from the timestamp generator 320. Speech data can be extracted from the audiovisual broadcast on a continuous cycle, such as every 5 seconds for example, until there is an "event completed" value detected in the scheduled_airings_today object.

In step 1032, which can occur simultaneously to steps 1021, 1024, and 1029, the promotions/offers ingest system 132 continuously polls promotions/offers services 130 such as third-party advertising servers for updates to any promotions campaigns as well as any dynamically added or modified promotional campaigns added via the promos/offers management dashboard 131 and processes any new or modified real-time updated promotional offer data into the core data store 119. In step 1033 the promotions/offers ingest system 132 pushes a copy of the promotional offer data to the real-time event decision engine service 137 for use in updating promotional offers that are referenced in arrays of transaction recommendations for users, such as adding new campaigns, updating existing offers with new values or retiring campaigns that have ended. The exemplary steps may proceed to the end step 1034.

Figure 10C:
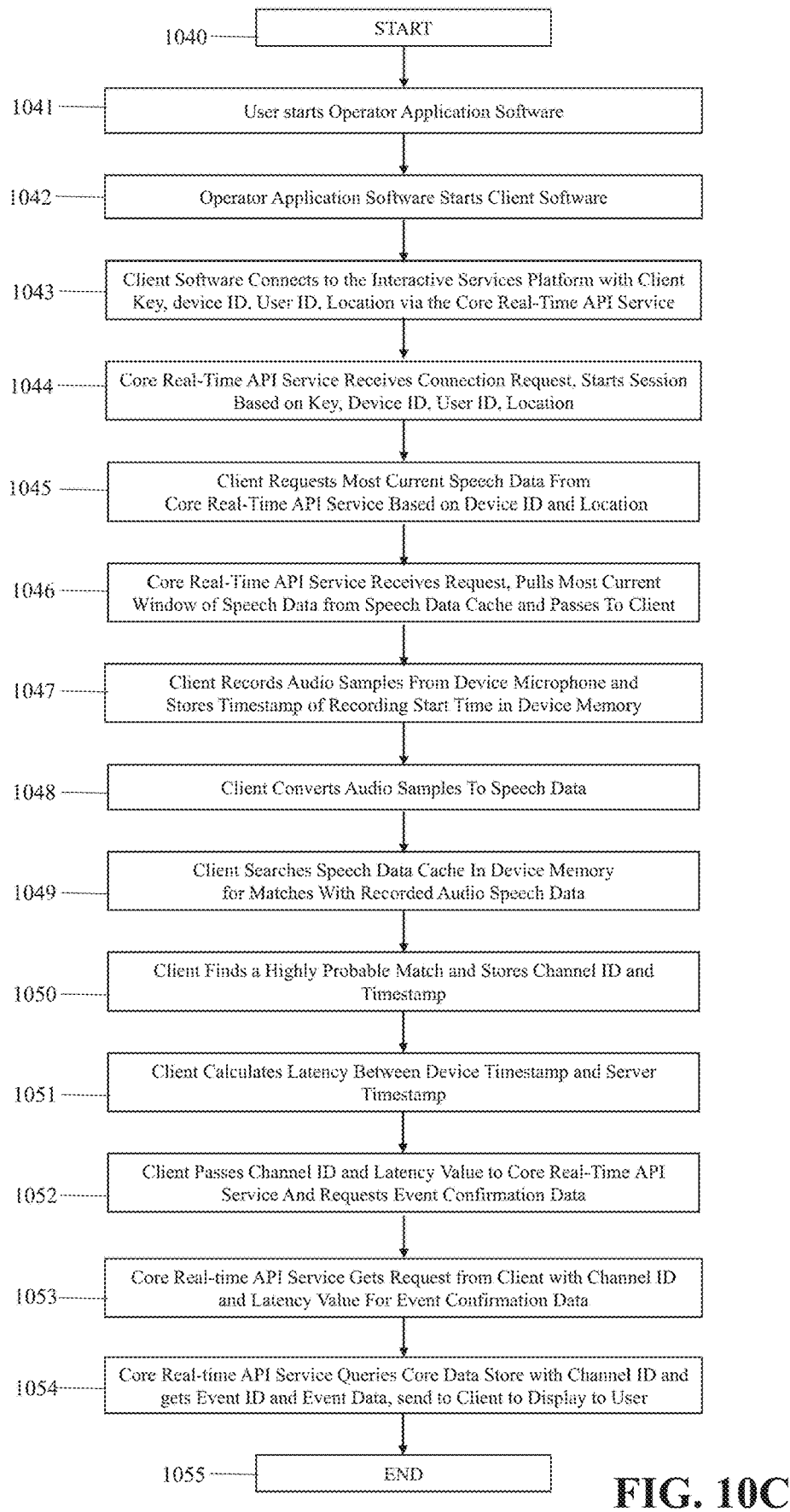
FIG. 10C is a method chart of the client software recognizing an audiovisual broadcast and calculating "glass-to-glass" latency using phoneme data from the interactive services platform, in accordance with an exemplary embodiment.

FIG. 10C is a flow chart illustrating exemplary steps for the interactions between client software 103 the audiovisual presentation 106 and the interactive services platform 100 as an event is taking place to determine the event the user is viewing and to determine latency (such as the "glass to glass" latency) between the user environment 101 and the actual live event timing in accordance with an embodiment of the invention. Referring to FIG. 10C, the exemplary steps start at 1040. In step 1041 based on a stimulus which could be generated by the interactive services platform 100 such as a mobile push notification, SMS message, email, event reminder or other notification, or initiated by the user themselves, the user starts the operator application software 104. Depending on the embodiment this software could be running in a variety of different user environments and different devices including a personal digital device such as a mobile device 102, a computer or laptop device 109 a smart television display 115 or other similar devices. In step 1042 the operator software application 104 starts the client software 103 while showing the user screen 200. In step 1043 the client software 103 connects to the interactive services platform 100 over a communications network such as the Internet by establishing communication with the core real-time API service 105 where the client software 103 passes the core real-time API service 105 values such as a client key identifying the operator application software 104, an ID that identifies the device running the client software 103 which will determine the client experience data as well as the selection of speech data returned to the client, an ID that identifies the user as a specific member of the operator service, a location value which can be used in filtering sources of audiovisual programming as well as filtering transactions that can be presented to the user.

In step 1044 the core real-time API service 105 receives the connection request from the client software 103 and begins an active session with the client software 103 based on the client key value, a device ID, the user ID and location.

In step 1045 the client software 103 makes a request from the core real-time API service 105 for a set of speech data and related channel IDs and timestamps based on the user's location and based on the ID of the device being used. In step 1046 the core real-time API service 105 receives the request from the client software 103 and pulls a set of data from the speech data cache 123 representing speech data extracted over the most current window of time associated with the device ID and associated with channels viewable to the user based on their location value and returns it to the client software 103 which stores it in device memory. In step 1047 either based on user action or automatically the client software 103 accesses the personal digital device 102 microphone and begins recording audio samples of audiovisual presentation 106 for a predetermined and/or fixed time duration and stores them together with the timestamp of the start of recording in device memory while showing the user screen 206. In step 1048 the client software 103 converts the audio samples to speech data such as phoneme strings and stores them in device memory. In step 1049 the client software 103 searches the speech data recorded from multiple broadcast channels it received from the interactive services platform 100 in step 1046 for a highly probable match with the converted audio sample speech data from step 1048.

In step 1050 the client software 106 finds a highly probable match between one of the channels converted into speech data by the interactive services platform 100 and the speech data converted from the audio samples it recorded of the audiovisual presentation 106 and stores the associated channel ID and timestamp in device memory. In step 1051 the client software 103 determines the latency (e.g., glass-to-glass latency) between the audiovisual presentation 106 as presented in the user environment 101 and the actual live event timing by subtracting the timestamp value stored by the client software 103 in step 1050 from the timestamp value stored by the client software 103 in step 1047. In step 1052 the client software 103 passes the channel ID and latency value to the core real-time API service 105 and requests information to display to the user confirming the channel and event that matches the audiovisual content 106. In step 1053 the core real-time API service 105 receives the request for channel and event confirmation to display as well as recommendations for synchronized interactive elements and transactions from the client software 103 including the channel ID and latency value. In step 1054 the core real-time API service 105 does a lookup in the core data store 119 with the channel ID and location data and retrieves the event ID for the audiovisual content along with associated event data to display to the user and returns the data to the client software 103 to present to the user inside the operator application 104 such as in the user interface element 214. The exemplary steps may proceed to the end step 1055.

Figure 11:
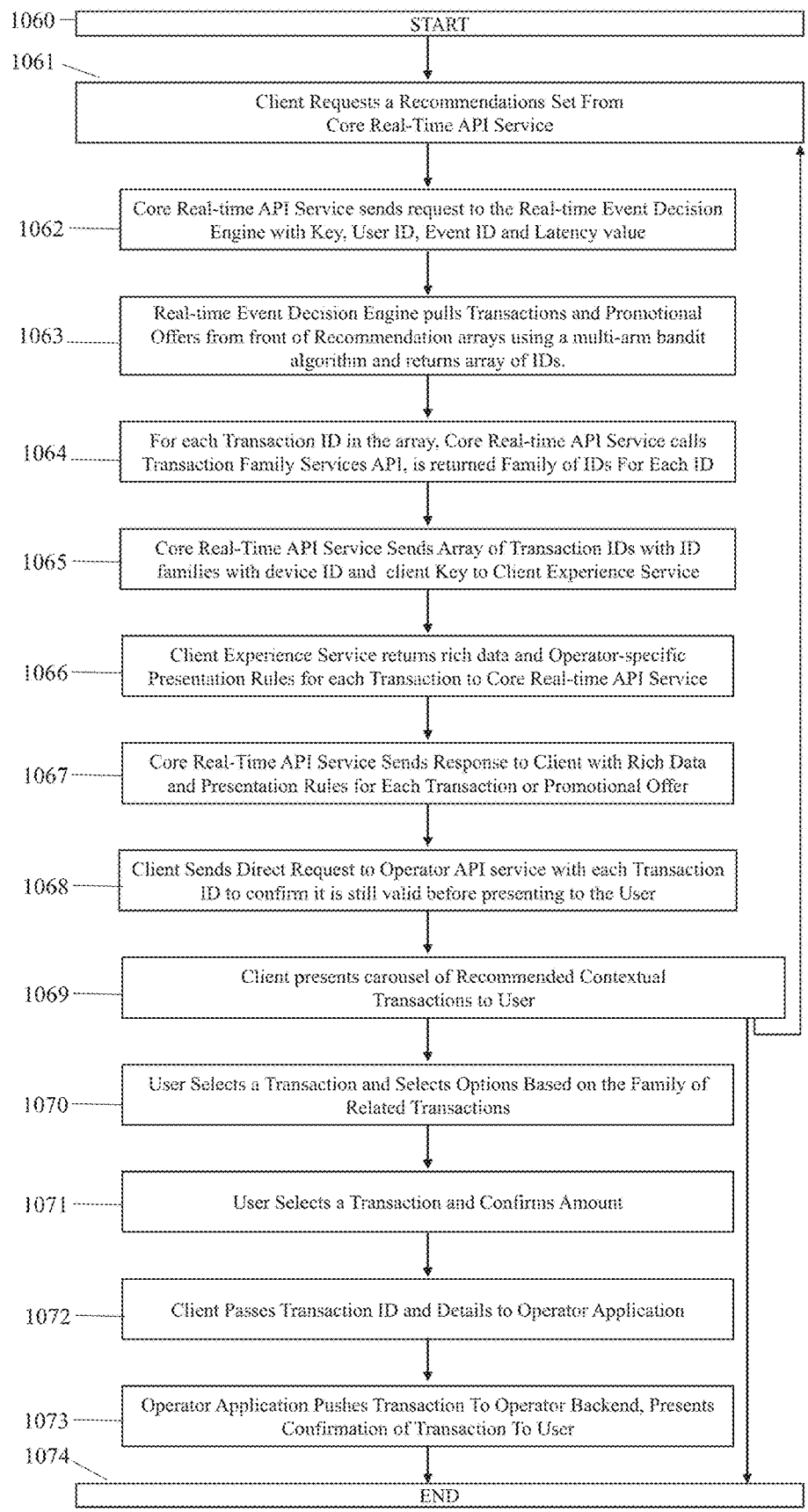
FIG. 11 is a method chart of the client software requesting transaction and offer recommendations from the interactive services platform and enabling the user to place an order with the operator platform, in accordance with an exemplary embodiment.

FIG. 11 is a flow chart illustrating exemplary steps for the interactions between the client software 103 and the interactive services platform 100 as an event is taking place with the goal of receiving recommended real-time personalized interactive offers to users such as sports bet offers synchronized to the audiovisual presentation 106 in accordance with an embodiment of the invention. Referring to FIG. 11, the exemplary steps start at 1060. In step 1061 the client software 103 requests recommendations for synchronized interactive elements and transactions for the event from the core real-time API service 105 to present to the user. In step 1062 the core real-time API service 105 makes a request to the real-time event decision engine 137 with the operator key, user ID, event ID and latency (e.g., glass-to-glass latency) value. In step 1063 the real-time event decision engine 137 pulls IDs for transactions and promotional offers from arrays of recommendations based on the operator service key, user ID, the event ID of the event being viewed, and the latency (e.g., glass-to-glass latency) value using a multi-armed bandit algorithm and returns an array of recommended IDs to the core real-time API service 105. In step 1064, for each transaction ID in the array, the core real-time API service 105 passes the ID to the transaction family storage and retrieval system 518 which returns an array of the entire family of transaction IDs that are related to the transaction ID provided the transaction ID or the transaction family of IDs are still valid. In step 1065 the core real-time API service 105 passes the array of recommended transaction family arrays to the client experience service 121 together with the ID of the device 102 running the client software 103 and the client key identifying the operator software application 104.

In step 1066 the client experience service 121 retrieves the presentation details for each transaction or offer ID from the core data store 119 as well as event data related to each transaction or offer ID and joins the data together with data presentation templates specific to the operator software application 104 and the user device 102 which it returns as a data object to the core real-time API service 105. In step 1067 the core real-time API service 105 returns the data object containing rich data and presentation formatting instructions for all recommended transactions and related transaction families to the client software 103. In step 1068 the client software 103 directly or through the operator software application 104 can make a call to the operator API service 139 to confirm each of the recommended transactions for each transaction ID are still valid such that any transactions that are no longer valid are deleted from the data object. In step 1069 the client software 103 presents as a carousel the recommended transactions and promotional offers for the user following the presentation formatting instructions for the operator software application 104 as shown in screen 542. If the event has ended and there are no recommended transactions or promotional offers to display the client software 103 may proceed to the end step 1073. After a duration of time has elapsed the client software 103 can return to step 1060 and request another set of recommended transactions and promotional offers from the core real-time API service 110 while also providing telemetry data about the user's engagement with the previous carousel. When the new carousel is received and is ready to be presented to the user, the widget carousel 216 can move vertically to where a prior carousel is visible 226 so that the more immediate widget carousel can appear in the same place.

In step 1069 the user selects a recommended transaction such as a bet offer 271 and selects an "Edit Bet" button 275 and sees variations on the bet offer shown 277 that are linked as members of the transaction family of bet offer 271 as shown in screen 276 as a set of radio buttons with alternate outcomes of the bet offer 271. In step 1070 the user selects an alternate bet option 279 to the original bet offer 271 and is then taken to screen 280 where the user sees the original widget screen updated to reflect the new alternative bet offer 281. In screen 283 the user decides to add the alternate bet offer 284 to their betslip with the sportsbook operator application 104 using the "Add to Betslip" button 286. In step 1071 the data from the transaction is passed by the client software 103 to the operator software application 104 as shown by the operator betslip overlay 287 where the user can confirm the dollar amount being wagered 288 on the bet offer 284 as shown in screen 289. In step 1072 the user presses the final "Place Bet" button 290 and the transaction is completed through the operator application 104 and the operator backend platform 139 as shown in overlay 291 in screen 292. The exemplary steps may proceed to the end step 1073.

Figure 12A:
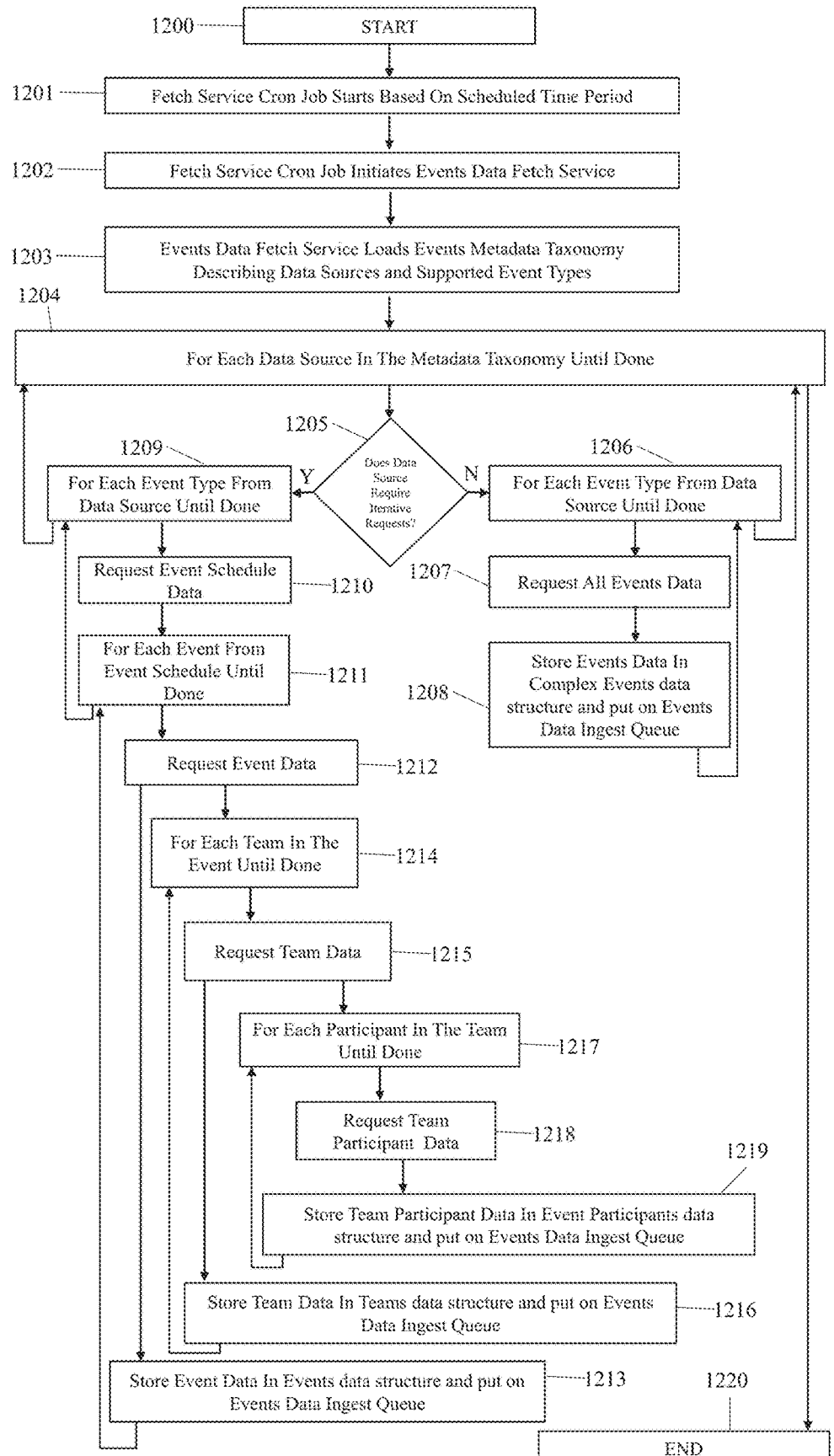
FIG. 12A is a method chart of the real-time live sport/event data ETL system ingesting data from live sport/event data services and placing data objects on the events data ingest queue, in accordance with an exemplary embodiment.

FIG. 12A is a flow chart illustrating exemplary detailed steps for the real-time live sport/event data ETL system 125 ingesting scheduled and live event data from multiple live event data services 124 including live sports event data into the core data store 119 in accordance with an embodiment of the invention. Referring to FIG. 12A, the exemplary steps start at 1200. In step 1201 the fetch service cron job 400 starts based on a scheduled periodic interval (such as at 12 AM every day for example). In step 1202 the fetch service cron job 400 initiates the events data fetch service 402. In step 1203 the events data fetch service 402 loads the published events metadata taxonomy 404 which defines the relevant event set for the interactive services platform 100 such as the set of sports leagues that are supported and the key data properties related to those event sets that need to be pulled by the events data fetch service 402 from each sports/event data service 124.

In step 1204 the events data fetch service 402 starts connecting to each sports/event data source 124 to request upcoming event schedule data for each event type such as a sports league ID. In step 1205 the events data fetch service 402 checks rules from the events metadata taxonomy 404 about each event data provider 124 for whether the provider will return a large data table containing all desired attributes about a sports event, including all team profile data and team participant profile data, or if the provider will return specific data structures for each game element containing IDs for more granular data structures which are used for subsequent data requests. In step 1206 if the sports/event data provider 124 does not require iterative requests and returns event schedule data for each supported event type in a single table, the events data fetch service 402 makes event schedule requests for each event type from the sports/event data provider 124 before returning to step 1204. In step 1207 the events data fetch service 402 makes an event schedule data request from the sports/event data provider 124. In step 1208 the events data fetch service 402 stores the request response from the sports/event data provider 124 into a complex data table typically containing, for a sports event, game IDs for each sports game in the schedule as well as other related data for each game such as team data, venue data, game start time, team participant data and others, and pushes the data object to the sports data ingest queue 406 where it sits until it is pulled from the queue by the sports data transform service 408.

In step 1209, if the sports/event data provider 124 does require iterative requests, the events data fetch service 402 makes event schedule requests for each event type from the sports/event data provider 124 before returning to step 1204. In step 1210 the events data fetch service 402 contacts the sports/event data source 124 to request upcoming event schedule data for each event type, such as a sports league ID. For every schedule it receives from a sports/event data service 124 it typically contains a list of game IDs for each game in the schedule as well as other related data such as the team names and IDs of the teams competing in the game, venue data, game start time and others. In step 1211 if the event data is not contained in the event schedule based on the sports/event data service 124, for each event ID contained in the schedule, the events data fetch service 402 proceeds to request event data until there are no more events left and can return to step 1209. In step 1212 the events data fetch service 402 proceeds to request event data for an event ID from the sports/event data service 124. In step 1213 the data from the request response is stored by the events data fetch service 402 in an events_data data structure by the events data fetch service 402 and is pushed to the events data ingest queue 406 before proceeding to step 1214.

In step 1214 for every sports event ID retrieved by the events data fetch service 402, for each team ID representing a team participating in the event, the events data fetch service 402 proceeds to request additional data from the sports/event data source 124 about each team. This can include team names, team city, team profiles, team stats, and the roster of team players and player IDs for each team that are set to compete in the game. In step 1215 the events data fetch service 402 requests team data for a team ID from the sports/event data service 148. In step 1216 the data from the request response is stored by the events data fetch service 402 in a sports_teams data structure by the events data fetch service 402 and is pushed to the events data ingest queue 406 before proceeding to step 1217.

In step 1217 for every sports team ID retrieved by the events data fetch service 402, for every participant ID representing a team participant, the events data fetch service 402 proceeds to request additional data from the sports/event data source 124 about each participant competing in the game. This data can include but is not limited to the player's full name, nicknames, jersey number, personal information, stats and other profile data. In step 1218 the events data fetch service 402 requests participant data for a participant ID from the sports/event data service 124. In step 1219 the data from the request response is stored by the events data fetch service 402 in a sports_participants data structure by the events data fetch service 402 and is pushed to the events data ingest queue 406. The exemplary steps may proceed to the end step 1220.

Figure 12B:
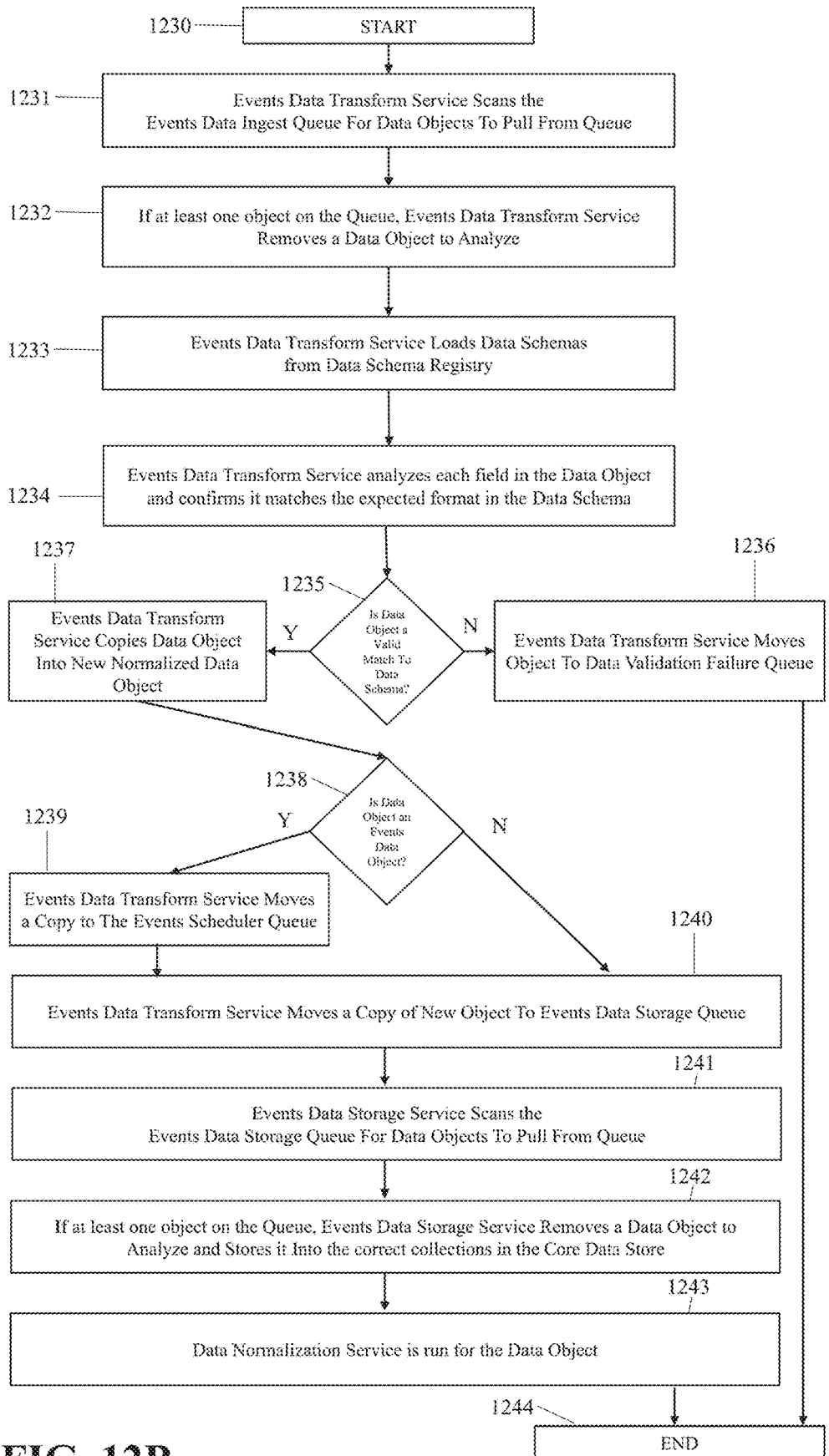
FIG. 12B is a method chart of the real-time live sport/event data ETL system transforming and normalizing data objects for storage in the core data store, in accordance with an exemplary embodiment.

FIG. 12B is a flow chart illustrating exemplary detailed steps for the real-time live sport/event data ETL system 125 normalizing, processing and storing scheduled and live event data from multiple live event data services 124 including live sports event data into the core data store 119 in accordance with an embodiment of the invention. Referring to FIG. 12B, the exemplary steps start at 1230. In step 1231 the events data transform service 408 scans the events data ingest queue 406 for any objects of data. In step 1232 if there is at least one data object on the events data ingest queue 406 the events data transform service 408 removes one object from the queue to be analyzed. In step 1233 the events data transform service 408 loads the published data schemas from the data schema registry 410 which contain data schemas used to validate and normalize each data object retrieved from the events data ingest queue 406 based on an understanding of the proper data formatting from each events data provider 124 as well as normalized data structures that can be consistent across all data providers.

In step 1234 the data object is validated against the appropriate data schema from the data schema registry 410 to ensure each field of data inside the data object is valid according to the schema. In step 1235 if the fields of the data object are invalid according to the appropriate schema, then the steps proceed to step 1236, otherwise they proceed to step 1237. In step 1236 the data object is determined to be invalid based on the appropriate schema from the data schema registry 410 and is moved to the data validation failure queue 416 for later examination. In step 1237 the data object is normalized to a new data structure based on a normalized schema independent of the sports/events data provider 124. In step 1238 if the valid normalized data object is an events_data data object the steps proceed to step 1239 otherwise they proceed directly to step 1240. In step 1239 the valid normalized data object is a events_data data object and a copy of the data object is published to the event scheduler queue 418 inside the live event scheduler system 420. In step 1240 the data object is placed on the events data storage queue 412 where it sits until it is pulled from the events data storage queue 412 by the events data storage service 414.

In step 1241 the events data storage service 414 scans the events data storage queue 412 for any objects of data to be removed from the queue 412 and analyzed. In step 1242, if there is at least one data object on the events data storage queue 412 the events data storage service 414 removes one object from the queue 412 and based on its data object type it is stored into a specific location or collection type in the core data store 119 if it is newer than a similar data object has already been loaded into the core data store 119. In step 1243 the data normalization service 432 is run on the new data object which uses a "fuzzy logic" algorithm that finds matches for events across disparate data records and when matches are found creates a new data collection in the core data store 119 called a cross_reference_collection where data from matching records are joined. The exemplary steps may proceed to the end step 1244.

Figure 12C:
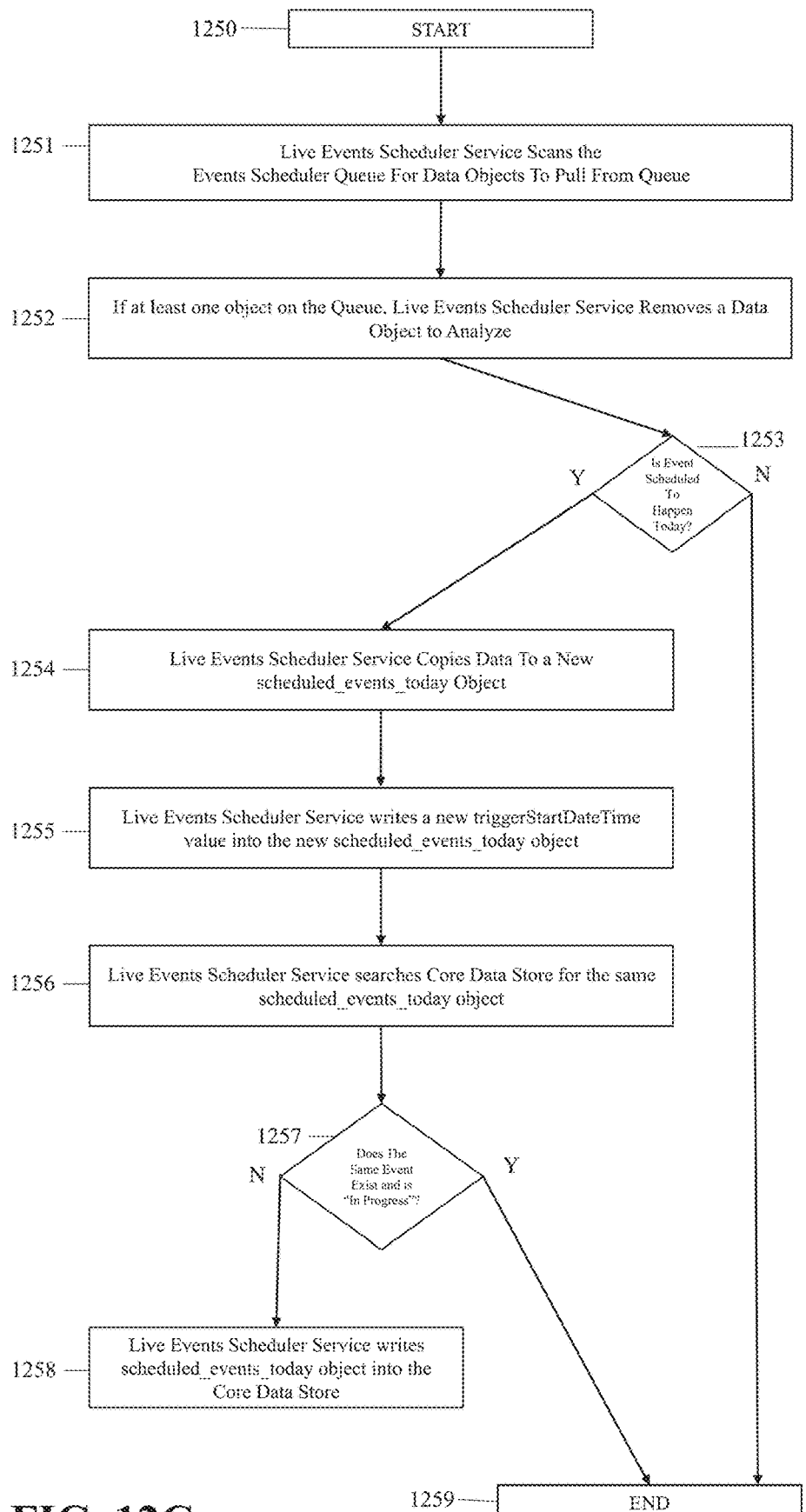
FIG. 12C is a method chart of the live event scheduler system creating a schedule for real-time dynamic data ingest as a live event is taking place, in accordance with an exemplary embodiment.

FIG. 12C is a flow chart illustrating exemplary detailed steps for the live event scheduler system 420 scheduling the ingest of live event data from multiple live event data services 124 including live sports event data into the core data store 119 in accordance with an embodiment of the invention. Referring to FIG. 12C, the exemplary steps start at 1250. In step 1251 the live events scheduler service 422 scans the events scheduler queue 418 for any objects of data to be removed from the queue 418 and analyzed. In step 1252, if there is at least one data object on the events scheduler queue 418 the live events scheduler service 422 removes one object from the queue 418. In step 1253 if the event is scheduled to happen today it is added to the day's event schedule in subsequent steps. In step 1254 the live events scheduler service 422 maps data from the events data object to a new scheduled_events_today data object. In step 1255 the live events scheduler service 422 further analyzes the event start time property in the events_data object writes a new triggerStartDateTime value into the new scheduled_events_today object which is a timestamp of when the live event action system 424 should contact the corresponding sport/event data source 124 to begin requesting and processing dynamic live event data such as live stats, game events and box scores. In step 1266 the live event scheduler service 422 searches the core data store 119 to see if a similar data object has already been loaded. In step 1257 if there is a schedule entry for the same event in the core data store 119, the status of the old and new objects is first compared by the live event scheduler service 422 to make sure data about an in-progress event will not be overwritten. In step 1258 if there is no similar event, or if there is one that is not in-progress, the live event scheduler service 422 writes the scheduled_events_today object into the core data store 119. The exemplary steps may proceed to the end step 1259.

Figure 12D:
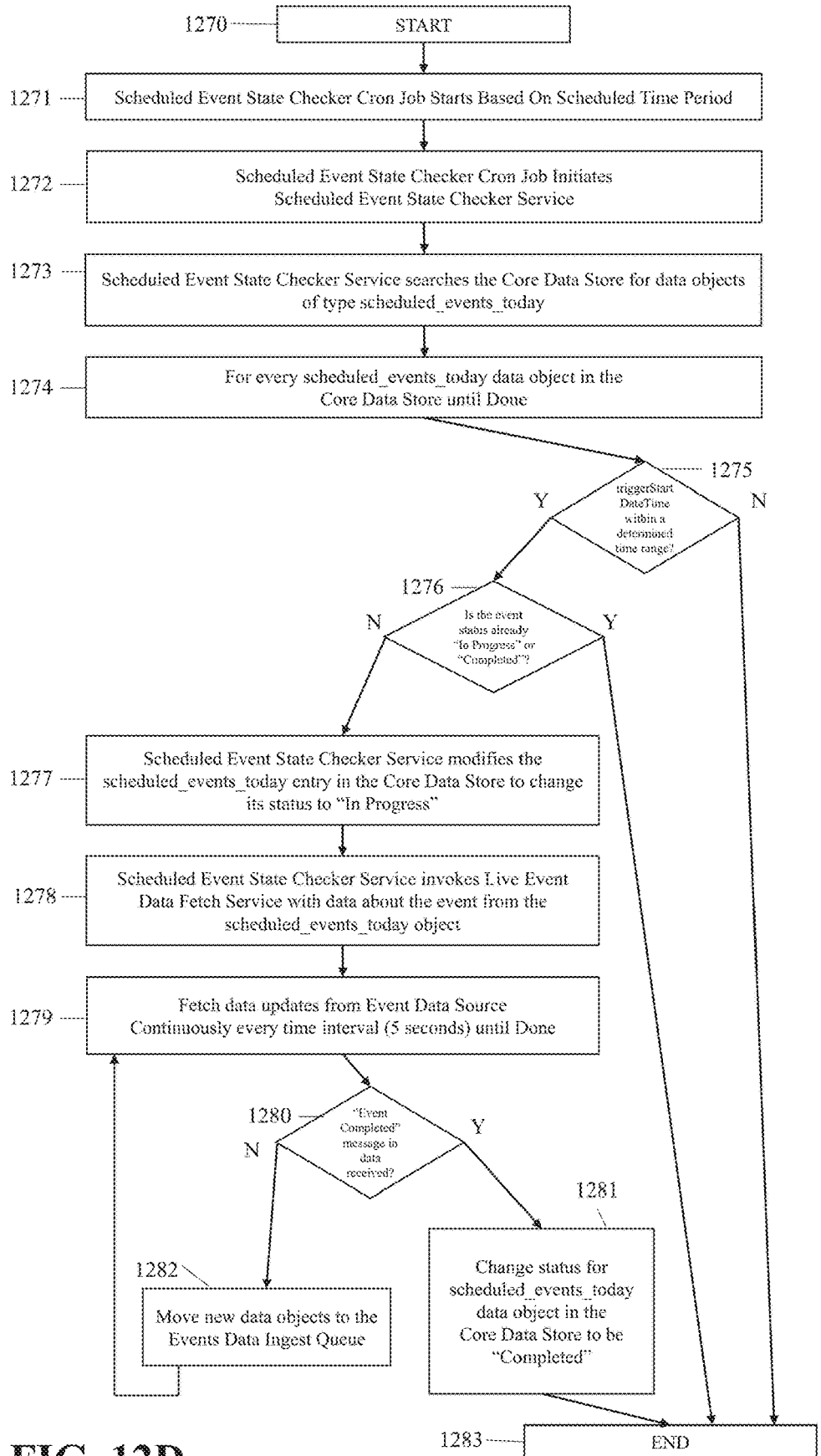
FIG. 12D is a method chart of the live event action system ingesting dynamic data as a live event is taking place, in accordance with an exemplary embodiment.

FIG. 12D is a flow chart illustrating exemplary detailed steps for the live event action system 424 ingesting live event data from multiple live event data services 124 including live sports event data into the core data store 119 in accordance with an embodiment of the invention. Referring to FIG. 12D, the exemplary steps start at 1270. In step 1271 the scheduled events state checker cron job 424 starts based on a scheduled periodic interval, such as every 10 minutes for example. In step 1272 the scheduled events state checker cron job 424 initiates the scheduled events state checker service 428. In step 1273 the scheduled event state checker service 428 searches the core data store 138 for data objects of type scheduled_events_today. In step 1274 the scheduled event state checker service 428 analyzes each scheduled_events_today object. In step 1275 if the event has a triggerStartDateTime that falls within a specified range it progresses to step 1276. In step 1276 the event status value is analyzed to make sure the event is not already in progress or completed to move to step 1277. In step 1277 the scheduled event state checker service 428 modifies the scheduled_events_today entry in the core data store 119 to change its status to "in progress." In step 1278 the scheduled event state checker service 428 invokes the live event data fetch service 430 with data about the event from the scheduled_events_today object.

In step 1279 the live event data fetch service 430 requests dynamic data from the corresponding sports/event data sources 124 including dynamic live event data such as live stats, game events and box scores. In step 1280 the response is analyzed for the presence of an "event completed" message by the live event data fetch service 430. In step 1281 if an "event completed" message is received by the live sports event data fetch service 430 it stops requesting new data from the corresponding sports/event data services 124 and it modifies the corresponding scheduled_events_today entry in the core data store 119 to change its status to "completed" and does the same for any associated data objects for the same event such as the scheduled_airings_today object. In step 1282 data objects received by the live sports event data fetch service 430 are then pushed to the event data ingest queue 406 where they will be analyzed, normalized and transformed by the event data transform service 408 then returns to step 1279. The exemplary steps may proceed to the end step 1283.

Figure 13A:
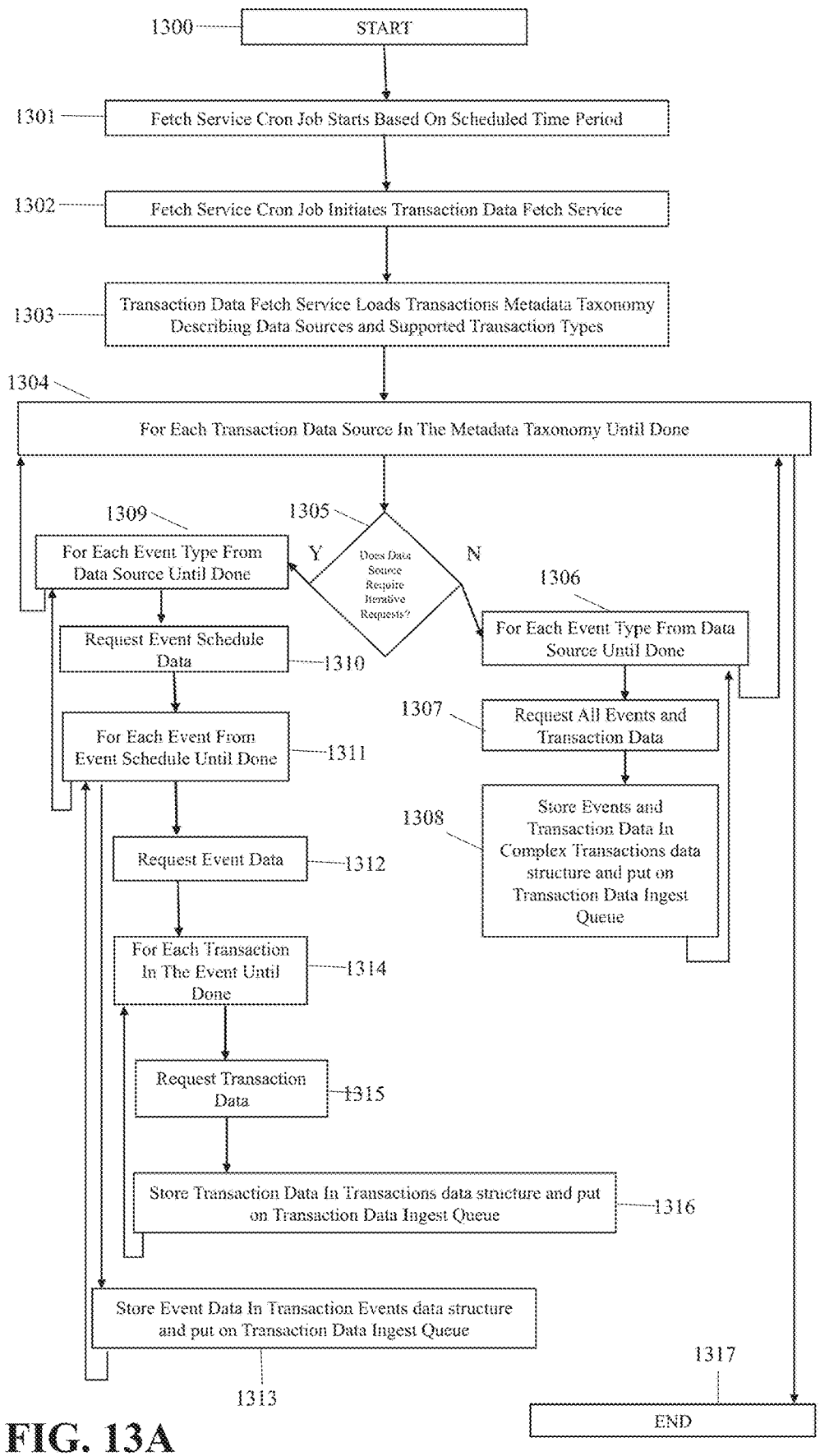
FIG. 13A is a method chart of the real-time transaction data ETL system ingesting transaction data from operator data transaction services and placing data objects on the transaction data ingest queue, in accordance with an exemplary embodiment.

FIG. 13A is a flow chart illustrating exemplary detailed steps for the real-time transaction data ETL system 127 ingesting scheduled and live transaction data such as bet offers from multiple operator transaction data services 126 into the core data store 119 in accordance with an embodiment of the invention. Referring to FIG. 13A, the exemplary steps start at 1300. In step 1301 the fetch service cron job 500 starts based on a scheduled periodic interval, such as at 12 AM every day for example. In step 1201 the fetch service cron job 500 initiates the transaction data fetch service 502. In step 1303 the transaction data fetch service 502 loads the published transaction data metadata taxonomy 504 which defines the relevant event set for the interactive services platform 100 such as the set of sports leagues that are supported and the key data properties related to those event sets that need to be pulled by the transaction data fetch service 402 from each operator transaction data service 126.

In step 1304 the transaction data fetch service 502 starts connecting to each operator transaction data source 126 to request upcoming transaction data for each event type such as a sports league ID. In step 1305 the transaction data fetch service 502 checks rules from the transaction data metadata taxonomy 504 about each operator transaction data provider 126 for whether the provider will return a large data table containing all transactions such as bet markets for each event type, or if the provider will return specific data structures for each schedule containing IDs for more granular data structures which are used for subsequent data requests. In step 1306 if the operator transaction data provider 126 does not require iterative requests and returns event schedule data and event transactions for each supported event type in a single table, the transaction data fetch service 502 makes event schedule requests for each event type from the transaction data provider 126 based on a requested list of available groups or leagues for which there are bet markets available before returning to step 1304. In step 1307 the transaction data fetch service 502 makes an event schedule data request from the operator transaction data provider 126. In step 1308 the transaction data fetch service 502 stores the request response from the operator transaction data provider 126 into a complex data table typically containing, for a sports event, event IDs for each sports game in the schedule as well as live bet offers for each event and pushes the data object to the transaction data ingest queue 506 where it sits until it is pulled from the queue by the transaction data transform service 508.

In step 1309, if the operator transaction data provider 126 does require iterative requests, the transaction data fetch service 502 makes event schedule requests for each event type from the operator transaction data provider 126 before returning to step 1304. In step 1310 the transaction data fetch service 502 contacts the operator transaction data source 126 to request upcoming event schedule data for each event type, such as a sports league ID. In one embodiment, for every schedule it receives from an operator transaction data service 126 it typically contains a list of event IDs for each game in the schedule. In step 1311 if the event data is not contained in the event schedule based on the operator transaction data service 126, for each event ID contained in the schedule, the transaction data fetch service 502 proceeds to request event data until there are no more events left and can return to step 1309. In step 1312 the transaction data fetch service 502 proceeds to request event data for an event ID from the operator transaction data service 126. In step 1313 the data from the request response is stored by the events data fetch service 402 in an events_data data structure by the events data fetch service 402 and is pushed to the events data ingest queue 406 before proceeding to step 1214. In step 1313 data received from the operator transaction data service 126 are stored in offers_feed_event data objects by the transaction data fetch service 502 and are pushed to the transaction data ingest queue 506. In step 1314, for every event ID retrieved by the transaction data fetch service 502, the transaction data fetch service 502 proceeds to request all available transactions for the event from the transaction data source 126. In step 1315 the transaction data fetch service 502 requests all available transactions such as bet offers for the event. In step 1316, data received from the operator transaction data service 126 are stored in either offers_feed_transaction_offer data objects by the transaction data fetch service 502 and are pushed to the transaction data ingest queue 506. The exemplary steps may proceed to the end step 1317.

Figure 13B:
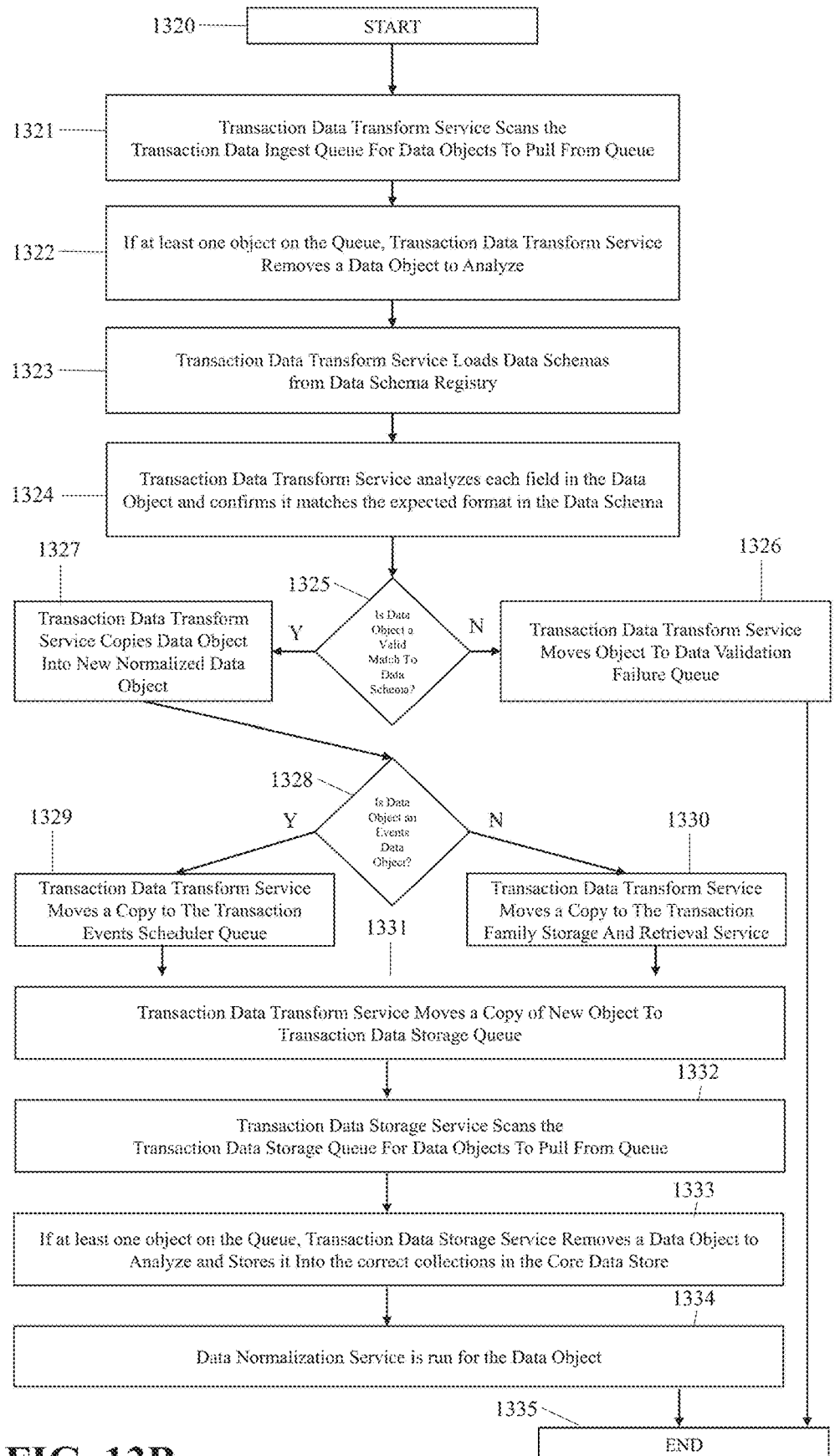
FIG. 13B is a method chart of the real-time transaction data ETL data system transforming and normalizing data objects for storage in the core data store, in accordance with an exemplary embodiment.

FIG. 13B is a flow chart illustrating exemplary detailed steps for the real-time transaction data ETL system 127 normalizing, processing and storing scheduled and live event transaction data from multiple operator transaction data services 126 including live sports event transaction data into the core data store 138 in accordance with an embodiment of the invention. Referring to FIG. 13B, the exemplary steps start at 1320. In step 1321 the transaction data transform service 508 scans the transaction data ingest queue 506 for any objects of data. In step 1322 if there is at least one data object on the transaction data ingest queue 506 the transaction data transform service 508 removes one object from the queue to be analyzed. In step 1323 the transaction data transform service 508 loads the published data schemas from the transaction data schema registry 510 which contain data schemas used to validate and normalize each data object retrieved from the transaction data ingest queue 506 based on an understanding of the proper data formatting from each operator transaction data provider 126 as well as normalized data structures that can be consistent across all transaction data providers.

In step 1324 the data object is validated against the appropriate data schema from the transaction data schema registry 510 to ensure each field of data inside the data object is valid according to the schema. In step 1325 if the fields of the data object are invalid according to the appropriate schema, then the steps proceed to step 1326, otherwise they proceed to step 1327. In step 1326 the data object is determined to be invalid based on the appropriate schema from the transaction data schema registry 510 and is moved to the data validation failure queue 516 for later examination. In step 1327 the data object is normalized to a new data structure based on a normalized schema independent of the operator transaction data provider 126. In step 1328 if the valid normalized data object is a transaction_events_data data object the steps proceed to step 1329 otherwise they proceed to step 1330. In step 1329 the valid normalized data object is a transaction_events_data object and a copy of the data object is published to the live transaction event scheduler queue 520 inside the live transaction event scheduler system 522. In step 1330 the valid normalized data object is a transaction offers data object and a copy of the data object is simultaneously published by the transaction data transform service 508 to the transaction family storage and retrieval system 518 where links will be established between the transaction and any other similar transactions for the same event. In step 1331 the data object is placed on the transaction data storage queue 512. In step 1332 the transaction data storage service 514 scans the transaction data storage queue 512 for any objects of data to be removed from the queue 512 and analyzed. In step 1333, if there is at least one data object on the transaction data storage queue 512 the transaction data storage service 514 removes one object from the queue 512 and based on its data object type it is stored into a specific location or collection type in the core data store 119 if it is newer than a similar data object has already been loaded into the core data store 119. In step 1334 the data normalization service 534 is run on the new data object which uses a "fuzzy logic" algorithm that finds matches for events across disparate data records and when matches are found creates a new data collection in the core data store 119 called a cross_reference_collection where data from matching records are joined. The exemplary steps may proceed to the end step 1335.

Figure 13C:
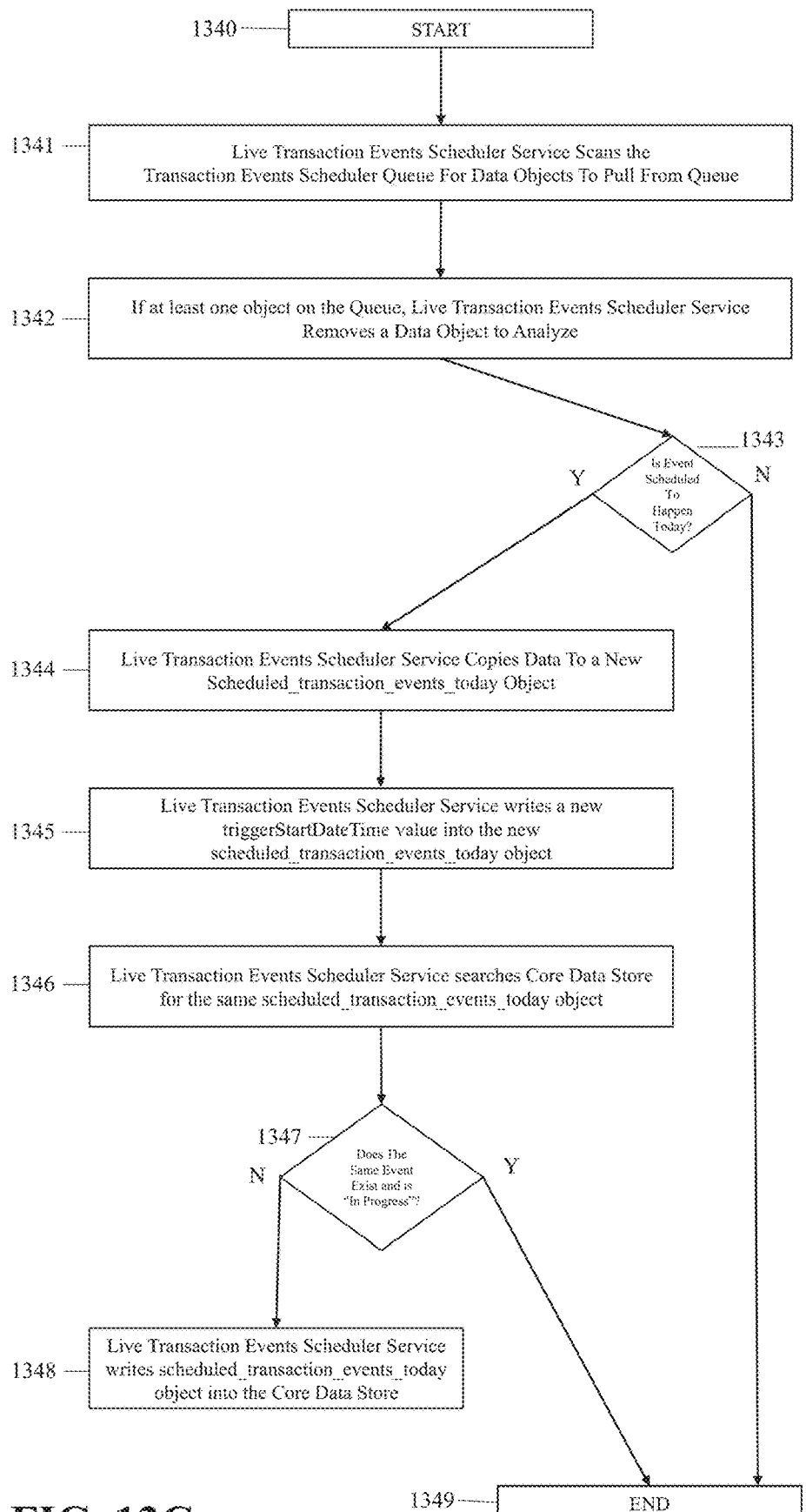
FIG. 13C is a method chart of the live transaction event scheduler system creating a schedule for real-time dynamic transaction data ingest as a live event with transactions is taking place, in accordance with an exemplary embodiment.

FIG. 13C is a flow chart illustrating exemplary detailed steps for the live transaction event scheduler system 522 scheduling the ingest of live event transaction data from multiple transaction data services 126 including live sports transaction data into the core data store 119 in accordance with an embodiment of the invention. Referring to FIG. 13C, the exemplary steps start at 1340. In step 1341 the live transaction event scheduler service 524 scans the live transaction event scheduler queue 520 for any objects of data to be removed from the queue 520 and analyzed. In step 1342, if there is at least one data object on the live transaction event scheduler queue 520 the live transaction event scheduler service 524 removes one object from the queue 520. In step 1343 if the event is scheduled to happen today it is added to the day's event schedule in subsequent steps. In step 1344 the live transaction events scheduler service 524 maps data from the transaction_events object to a new scheduled_transaction_events_today data object. In step 1345 the live transaction event scheduler service 524 further analyzes the event start time property in the transaction_events object writes a new triggerStartDateTime value into the new scheduled_transaction_events_today object which is a timestamp of when the live transaction event action system 526 should contact the corresponding operator transaction data source 126 to begin requesting and processing dynamic transactions including live bet market data such as updated odds, new prop bet offers, expired bet offers and others. In step 1346 the live transaction event scheduler service 524 searches the core data store 119 to see if a similar data object has already been loaded. In step 1347 if there is a schedule entry for the same event in the core data store 119, the status of the old and new objects is first compared by the live transaction event scheduler service 524 to make sure data about an in-progress event will not be overwritten. In step 1348 if there is no similar event, or if there is one that is not in-progress, the live transaction event scheduler service 524 writes the scheduled_transaction_events_today object into the core data store 119. The exemplary steps may proceed to the end step 1349.

Figure 13D:
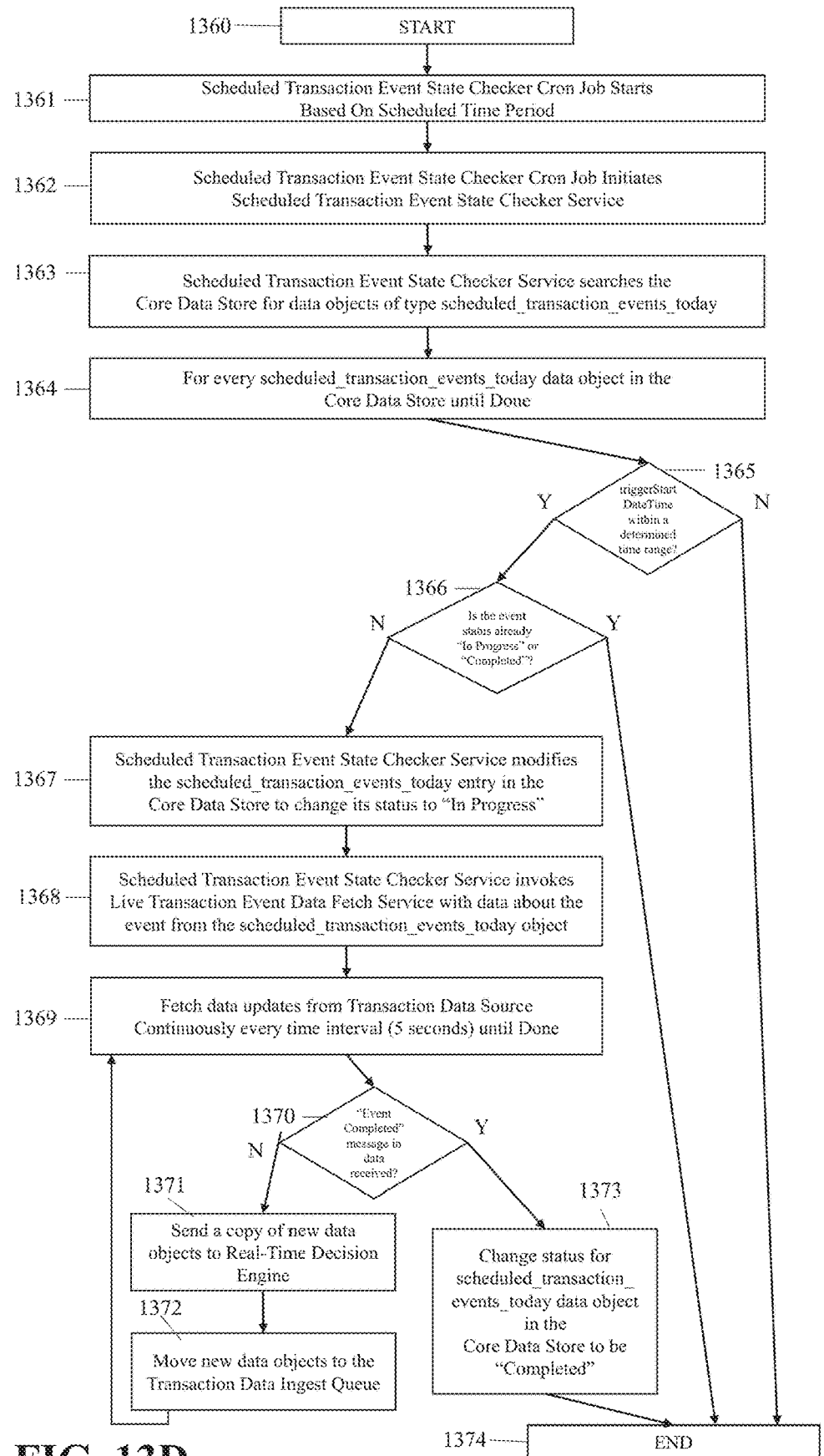
FIG. 13D is a method chart of the live transaction event action system ingesting dynamic transaction data as a live event is taking place, in accordance with an exemplary embodiment.

FIG. 13D is a flow chart illustrating exemplary detailed steps for the live transaction event action system 526 ingesting live transaction event data from multiple operator transaction data services 126 including live sports event bet market data into the core data store 119 in accordance with an embodiment of the invention. Referring to FIG. 13D, the exemplary steps start at 1360. In step 1361 the scheduled event state checker cron job 528 starts based on a scheduled periodic interval, such as every 10 minutes for example. In step 1362 the scheduled event state checker cron job 528 initiates the scheduled events state checker service 530. In step 1363 the scheduled event state checker service 530 searches the core data store 119 for data objects of type scheduled_transaction_events_today. In step 1364 the scheduled event state checker service 530 analyzes each scheduled_transaction_events_today object. In step 1365 if the event has a triggerStartDateTime that falls within a specified range it progresses to step 1366. In step 1366 the event status value is analyzed to make sure the event is not already in progress or completed to move to step 1367. In step 1367 the scheduled event state checker service 530 modifies the scheduled_transaction_events_today entry in the core data store 119 to change its status to "in progress." In step 1368 the scheduled event state checker service 530 invokes the live transaction event data fetch service 532 with data about the event from the scheduled_transaction_events_today object.

In step 1369 the live transaction event data fetch service 532 requests dynamic data from the corresponding operator transaction data sources 126 including live bet market data such as updated odds, new prop bet offers, expired bet offers and others. In step 1370 the response is analyzed for the presence of an "event completed" message by the live transaction event data fetch service 532. In step 1373 if an "event completed" message is received by the live transaction event data fetch service 532 it stops requesting new data from the corresponding operator transaction data services 126 and it modifies the corresponding scheduled_transaction_events_today entry in the core data store 119 to change its status to "completed." In step 1371 the live transaction event data fetch service 532 sends a copy of the new transaction data objects to the real-time decision engine 137 for immediate application to transaction recommendations. In step 1372 data objects received by the live transaction event data fetch service 532 are then pushed to the transaction data ingest queue 506 where they will be analyzed, normalized and transformed by the transaction data transform service 508 then returns to step 1369. The exemplary steps may proceed to the end step 1374.

Figure 13E:
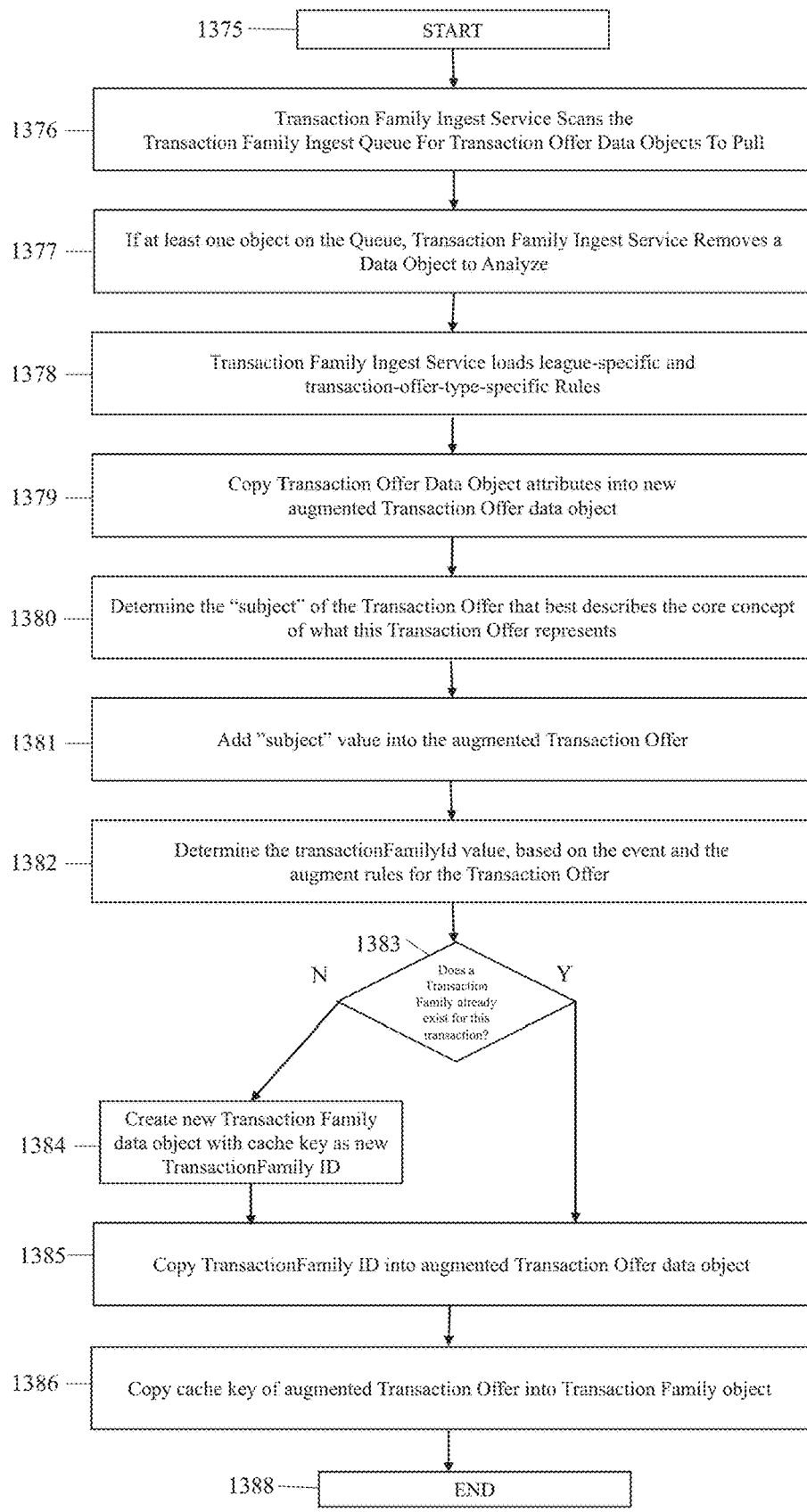
FIG. 13E is a method chart of the transaction family ingest storage and retrieval system creating and expanding transaction families, in accordance with an exemplary embodiment.

FIG. 13E is a flow chart illustrating exemplary detailed steps for the transaction family storage and retrieval system 518 creating and extending transaction families which connect similar transactions to enable new user experiences in accordance with an embodiment of the invention. The transaction family ingest service creates new augmented transaction offer data objects and transaction family objects using a highly performant data cache such as ELASTI-CACHE as part of the core data store 119 so that transaction family data objects can be easily and quickly retrieved by the transaction family services API 538 when requests for transaction family data are made by the core real-time API service 105. Referring to FIG. 13E, the exemplary steps start at 1375. In step 1376 the transaction family ingest service 536 continuously scans the transaction family ingest queue 534 for transaction offer data objects to pull from the queue 534. In step 1377 if there is at least one object on the queue 534 the transaction family ingest service 536 removes a data object to analyze. In step 1378, based on the type of transaction offer, the transaction family ingest service 536 loads league-specific and transaction offer-specific specific rules that will help it to augment the transaction offer. In step 1379 based on the rules the transaction family ingest service 536 creates a new augmented transaction offer data object in the highly performant data cache and copies all attributes from the transaction offer into it. In step 1380 the transaction family ingest service 536 determines a "subject" of the transaction offer that best describes a core concept of what this transaction offer represents if it were to appear as an option in a list, which in the example of live sports betting could be a player name, a bet type, a line value, a team name, a quantity such as points or yards, a unit of game time such as a quarter, and others. In step 1381 the transaction family ingest service 536 adds the new subject value as a new field in the augmented transaction offer data object. In step 1382 the transaction family ingest service 536 determines the transactionFamilyID value for the augmented transaction offer based on the event and the augment rules for the transaction offer. In step 1383 if a transaction family already exists for the transaction, the transaction family ingest service 536 proceeds to step 1385 otherwise it proceeds to step 1384. In step 1384 the transaction family ingest service 536 creates a new transaction family data object in the highly performant data cache in the core data store 119 where its cache key becomes the new transactionFamilyID for the transaction family. In step 1385 the transaction family ingest service 536 copies the transactionFamilyID into the augmented transaction offer data object. In step 1386 the cache key of the augmented transaction offer is copied into the transaction family object along with the augmented transaction offer attributes such that when the transaction family services API 538 receives a transaction offer ID from the core real-time API service 105 it can easily retrieve the augmented transaction offer data object and from that retrieve the appropriate transaction family object from the cache in the core data store 119 to return in its response to the core real-time API service 105. The exemplary steps may proceed to the end step 1387.

Figure 14A:
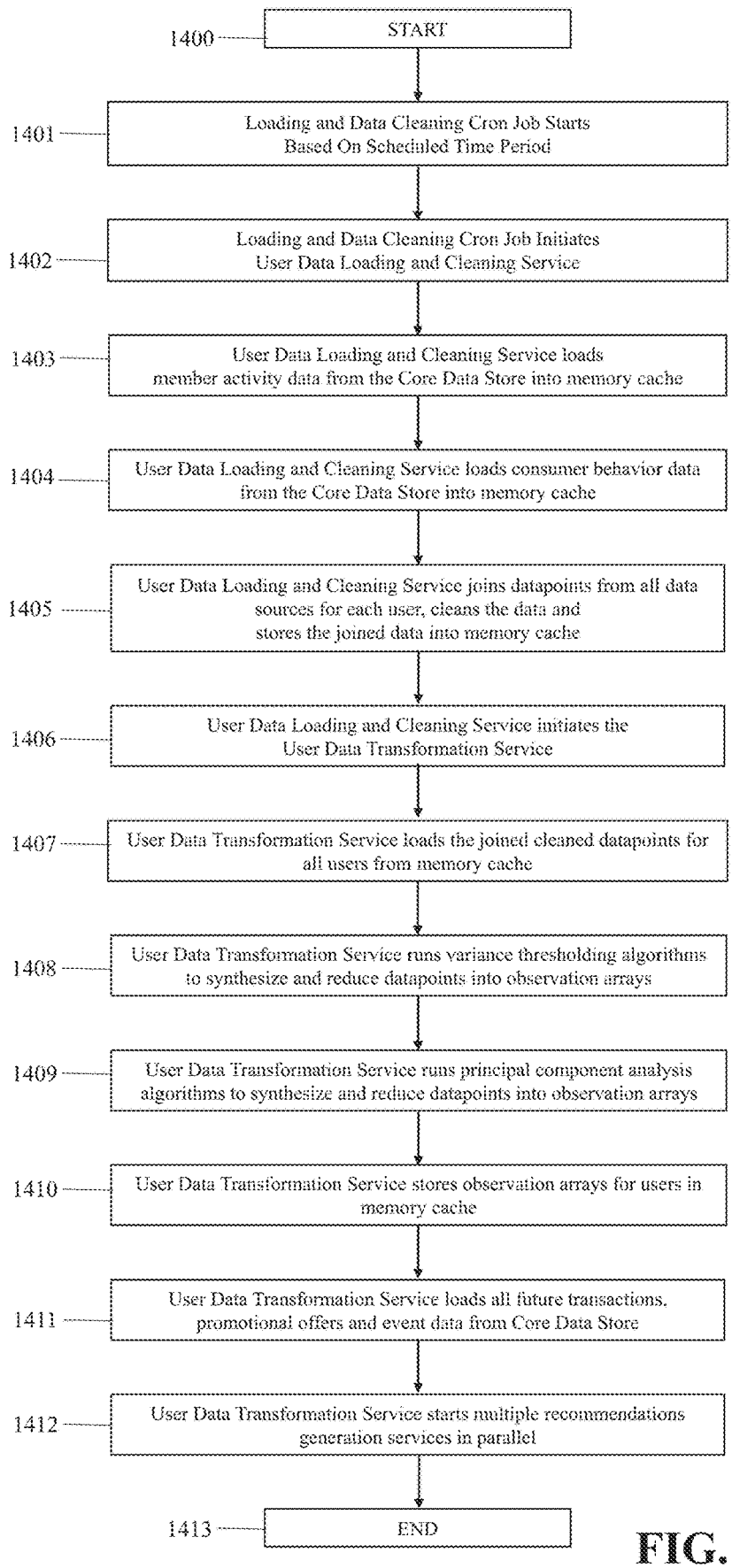
FIG. 14A is a method chart of the widget recommendations generation system loading into memory all user characteristic data and creating observation arrays for clustering, in accordance with an exemplary embodiment.

FIG. 14A is a flow chart illustrating exemplary detailed steps for the widget recommendations generation services 138 ingesting, synthesizing and reducing many characteristic datapoints about every user into optimal observation arrays in accordance with an embodiment of the invention.

Referring to FIG. 14A, the exemplary steps start at 1400. In step 1401 the loading and data cleaning cron job 600 starts based on a scheduled periodic interval such as every night such as at 2 AM for example. In step 1402 the loading and data cleaning cron job 600 initiates the user data loading and cleaning service 601. In step 1403 the user data loading and cleaning service 601 loads member activity data from the core data store 119 for all users that was ingested from multiple member activity services 156 and stores it in a memory cache 602. This data can include past bet opportunities the user has rejected, past bet opportunities the user has taken and the outcome of those bets, as well as many other possible datapoints about the user's behavior with the service provider that can include but are not limited to preferred sport, team, players, devices, bet types, time of day for placing bets, typical amounts wagered and many other datapoints. This data can also include behavior and telemetry data for all users based on their interactions with the client software 103 and operator software application 104. In step 1404 the user data loading and cleaning service 601 loads consumer behavior data from the core data store 119 for all users that was ingested from multiple sources for consumer data 170 and stores it in a memory cache 602. This data can include but is not limited to credit history data, demographics data, purchase history data, household income data, online behavior including websites visited and applications used, and many other datapoints.

In step 1405 the user data loading and cleaning service 601 loads the datapoints for each user from memory cache 602, joins the datapoints from all data sources based on common user IDs, cleans the data and stores the joined data into a memory cache 602. In step 1406 the user data loading and cleaning service 601 invokes the user data transformation service 603. In step 1407 the user data transformation service 603 loads the joined cleaned datapoints for all users from memory cache 602 and in subsequent steps uses algorithms for dimensionality reduction that synthesizes and reduces the entire set of datapoints for each and every user into a single "observation" array of a reduced set of values that are as efficient as possible for unsupervised clustering and stores them into a memory cache 604. In step 1408 the user data transformation service 603 runs variance thresholding algorithms which analyze each column of data to confirm whether it meets an established threshold of values and if it fails to meet the threshold the column is deleted from memory cache 604.

In step 1409 the user data transformation service 603 runs principal component analysis algorithms to determine which dimensions of the data are the ones that show the most significant spread of values as opposed to providing minimal differentiation, with the intent of representing the data in an observation array with the minimum amount of variables/dimensions needed for unsupervised clustering whereby variables with low variance or with dependencies on other variables are deleted from memory cache 604. In step 1410 the user data transformation service 603 stores the observation arrays for every user in memory cache 604. In step 1411 the user data transformation service loads into memory cache 604 all future transactions, promotional offers and event data for future events from the core data store 119. In step 1412 the user data transformation service 603 starts multiple services in parallel which use the observation data calculated for each user stored in the memory cache 604 and analyzes future events, transaction offers and promotional offers to formulate recommended offers using different approaches illustrated in FIG. 14B, FIG. 14C, FIG. 14D and FIG. 14E. The exemplary steps may proceed to the end step 1413.

Figure 14B:
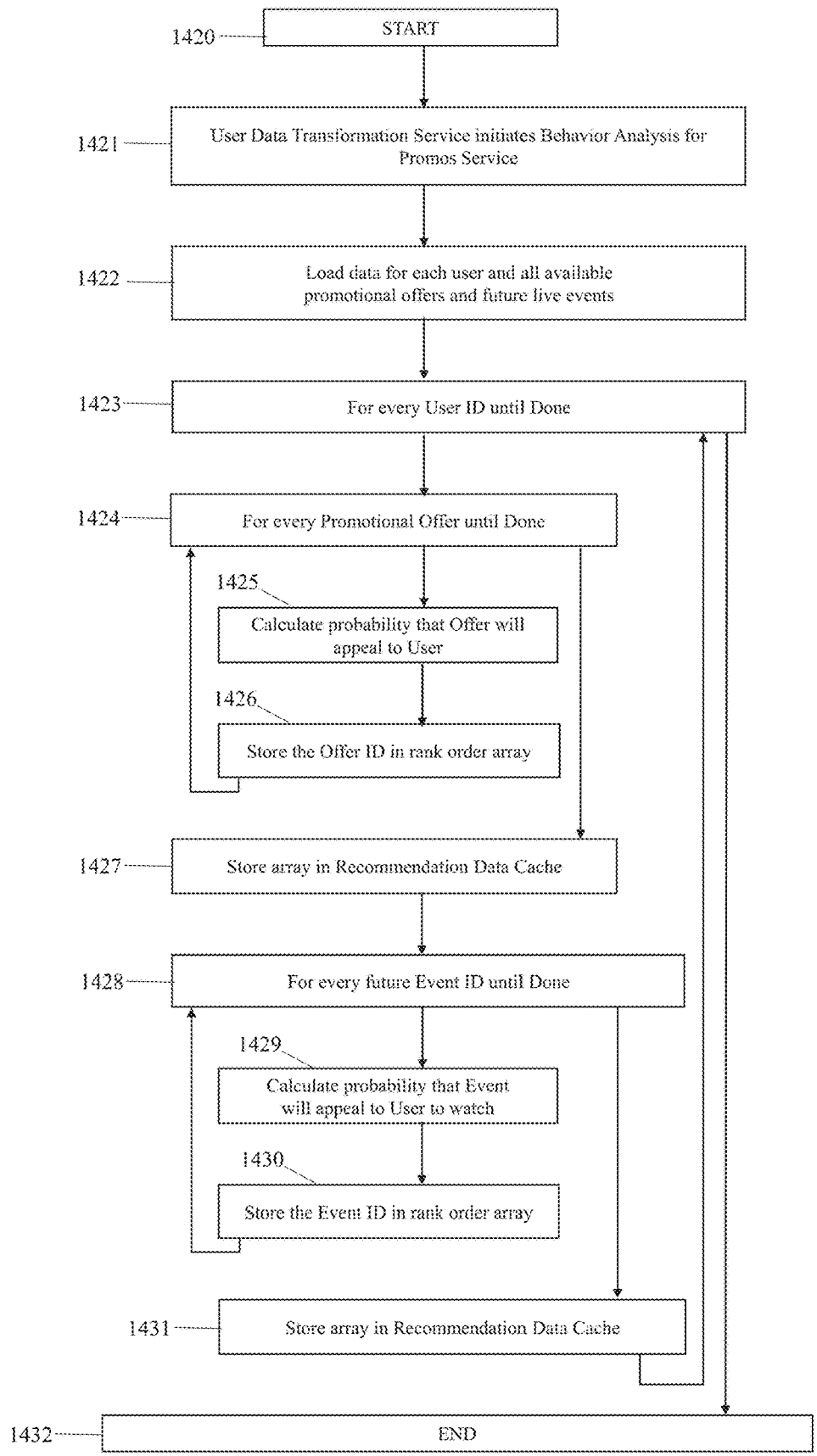
FIG. 14B is a method chart of the behavior analysis for promos service creating recommendation arrays for promotional offers intended to maximize engagement from users, in accordance with an exemplary embodiment.

FIG. 14B is a flow chart illustrating exemplary detailed steps for the widget recommendations generation services 138 using historical data for every user to generate personalized recommendations of promotional offers and recommendations for viewing future live events in accordance with an embodiment of the invention. Referring to FIG. 14B, the exemplary steps start at 1420. In step 1421 the user data transformation service 603 initiates the behavior analysis for promos service 605. In step 1422 the behavior analysis for promos service 605 which loads observation arrays for each user and all available promotional offers and future live events from the memory cache 604. In step 1423 the behavior analysis for promos service 605 starts calculating arrays of recommended promotional offers and live events for viewing for every user ID. In step 1424 the behavior analysis for promos service 605 analyzes each promotional offer by offer ID. In step 1425 based on the user's attributes and historical data the behavior analysis for promos service 605 calculates the probability that each promotional offer will appeal to the user. In step 1426 the behavior analysis for promos service 605 stores the offer ID into an array rank ordered by probability of appealing to the user before returning to step 1424 and repeating for the next promotional offer. In step 1427 once every promotional offer has been stored in the rank order array, the array is stored in the recommendation data cache 180. In step 1428 the behavior analysis for promos service 605 analyzes each future live event by event ID. In step 1429 based on the user's attributes and historical data the behavior analysis for promos service 605 calculates the probability that the user would be interested in viewing each live event. In step 1430 the behavior analysis for promos service 605 stores the event ID into an array rank ordered by probability of appealing to the user before returning to step 1428 and repeating for the next live event. In step 1431 once every event ID has been stored in the rank order array, the array is stored in the recommendation data cache 180 before returning to step 1423. The exemplary steps may proceed to the end step 1432.

Figure 14C:
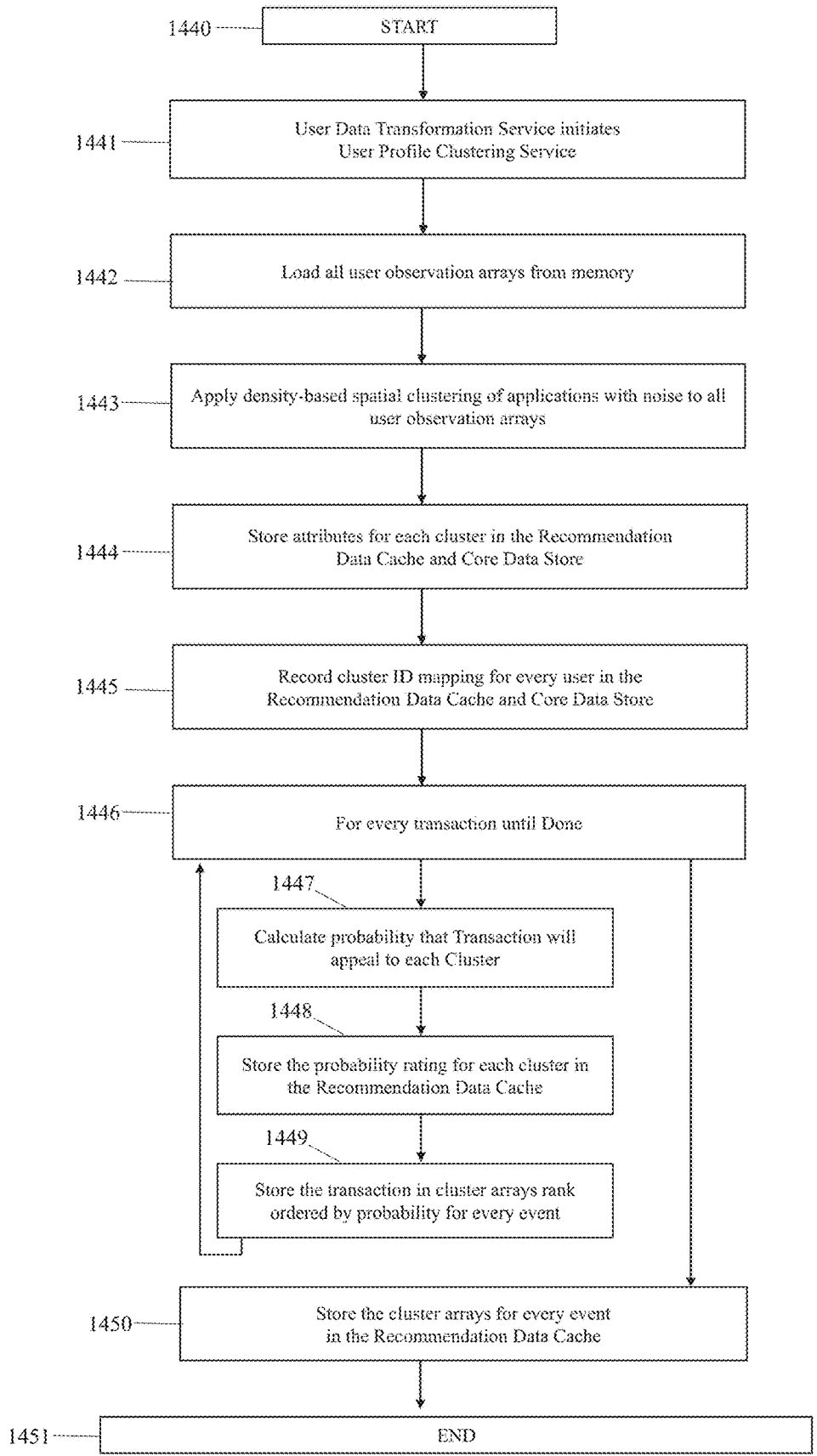
FIG. 14C is a method chart of the user profile clustering service creating recommendation arrays of transactions intended to maximizing engagement from users who belong to each cluster, in accordance with an exemplary embodiment.

FIG. 14C is a flow chart illustrating exemplary detailed steps for the widget recommendations generation services 138 to use unsupervised clustering algorithms to find clusters of users with common behaviors and attributes that will become profiles used to classify all possible transactions based on the likelihood of the transaction to appeal to each profile member in accordance with an embodiment of the invention. Referring to FIG. 14C, the exemplary steps start at 1440. In step 1441 the user data transformation service 603 initiates the user profile clustering service 606. In step 1442 the user profile clustering service 606 loads all user observation arrays from the memory cache 604. In step 1443 the user profile clustering service 606 applies density-based spatial clustering of applications with noise ("DBSCAN") for unsupervised clustering of all user observation arrays. In step 1444 the user profile clustering service 606 stores the attributes that define each cluster in the recommendation data cache 180 and the core data store 119. In step 1445 the user profile clustering service 606 records the cluster ID mapping for every user in the recommendation data cache 180 and the core data store 119. In step 1446 the user profile clustering service 606 analyzes every transaction for all future live events. In step 1447 the user profile clustering service 606 calculates the probability that each transaction will appeal to each cluster by calculating the distance of certain attribute values from the value ranges defined by the cluster. In step 1448 the user profile clustering service 606 stores the probability rating for each cluster for the transaction in the recommendation data cache 180. In step 1449 the user profile clustering service 606 stores each transaction ID into an array for each cluster where the array is rank ordered by probability before returning to step 1446. In step 1450 the user profile clustering service 606 stores the transaction recommendation arrays for each cluster in the recommendation data cache 180. The exemplary steps may proceed to the end step 1451.

Figure 14D:
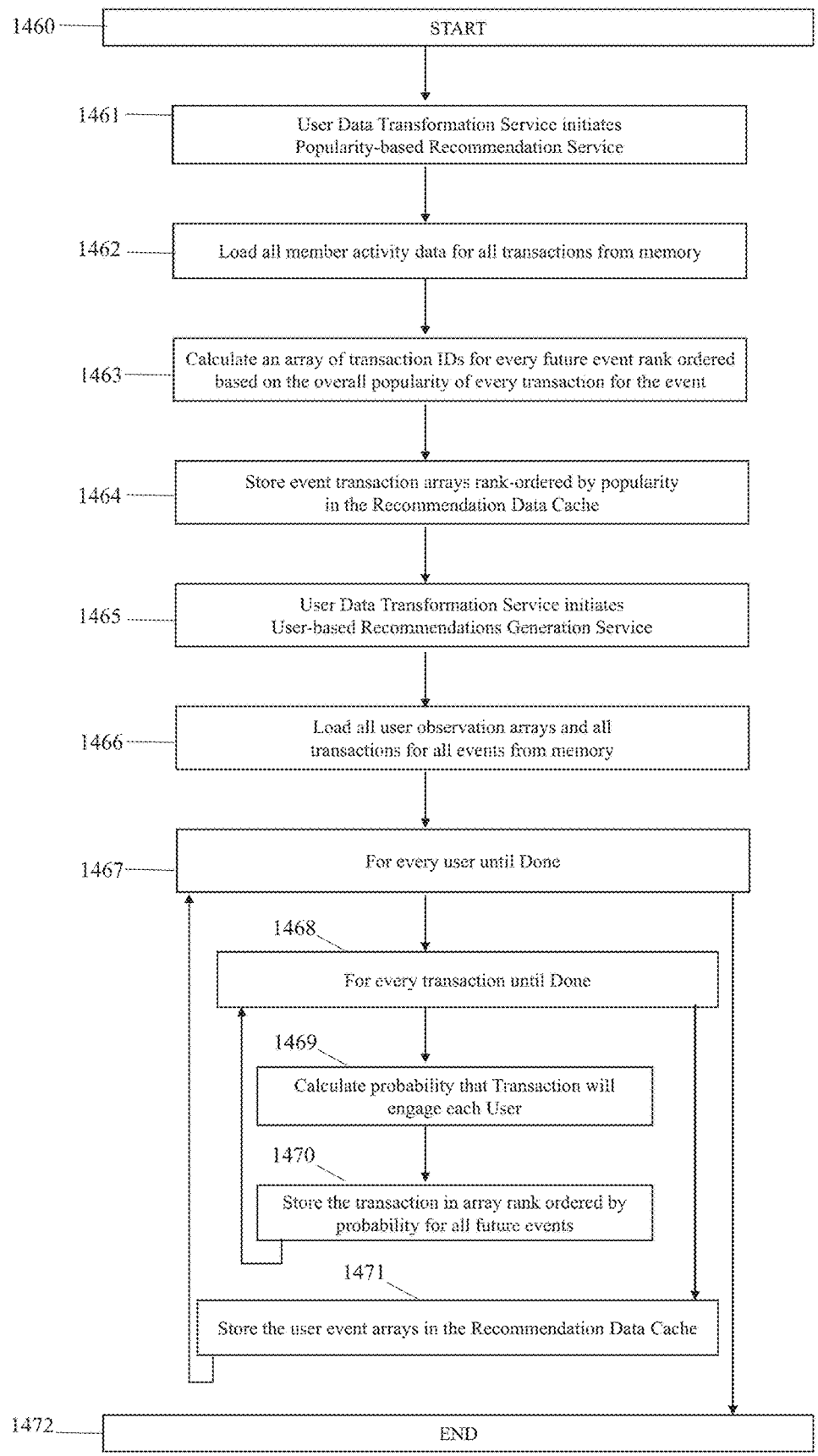
FIG. 14D is a method chart of the popularity-based recommendation service creating recommendation arrays of transactions based on overall popularity for all users regardless of client or application, in accordance with an exemplary embodiment.

FIG. 14D is a flow chart illustrating exemplary detailed steps for the widget recommendations generation services 138 to create recommendations for all possible transactions for all future events based on overall popularity and based on the likelihood of the transaction to appeal to each user in accordance with an embodiment of the invention. Referring to FIG. 14D, the exemplary steps start at 1460. In step 1461 the user data transformation service 603 initiates the popularity-based recommendation service 607. In step 1462 the popularity-based recommendation service 607 loads all member activity data from the memory cache 604 of all current transactions made for future live events such as sports bets placed by operator members. In step 1463 the popularity-based recommendation service 607 creates an array for every future event of transaction IDs rank ordered by the number of transactions made by all users. In step 1464 the event arrays of transaction IDs rank ordered by popularity are stored by the popularity-based recommendation service 607 in the recommendation data cache 180. In step 1465 the user data transformation service 603 initiates the user-based recommendations generation service 608. In step 1466 the user-based recommendations generation service 608 loads all user observation arrays and all transactions for all future events from the memory cache 604. In step 1467 the user-based recommendations generation service 608 starts creating recommendation arrays for every event for every user. In step 1468 the user-based recommendations generation service 608 analyzes every transaction for every future live event. In step 1469 the user-based recommendations generation service 608 calculates the probability that the transaction will engage the user through use of a non-negative matrix factorization algorithm based on their explicit and implicit transaction and interaction history. In step 1470 the user-based recommendations generation service 608 stores the transaction ID in an array for the associated live event that is rank ordered by probability before returning to step 1468. In step 1471 the user-based recommendations generation service 608 stores the event arrays calculated for the user in the recommendation data cache 180. The exemplary steps may proceed to the end step 1472.

Figure 14E:
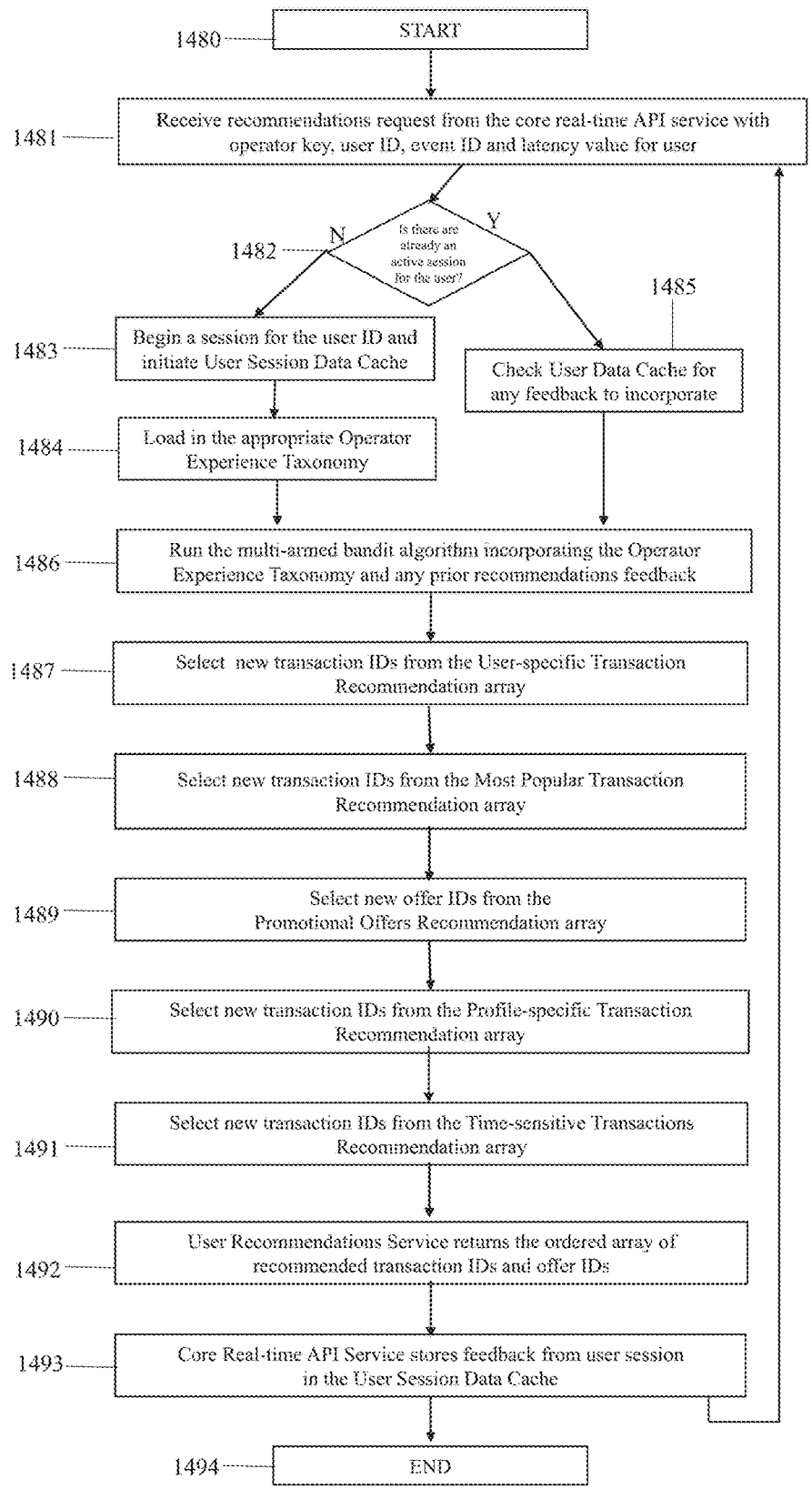
FIG. 14E is a method chart of the real-time event decision engine employing a multi-armed bandit algorithm to find the optimal weighting and ordering of recommendations to maximize user engagement, in accordance with an exemplary embodiment.

FIG. 14E is a flow chart illustrating exemplary detailed steps for the real-time event decision engine 137 which fulfills requests for a personalized and time-sensitive group of transactions and offers made by the core real-time API service 105 in accordance with an embodiment of the invention. Referring to FIG. 14E, the exemplary steps start at 1480. In step 1481 the user recommendations decision service 620 receives a recommendations request from the core real-time API service 105 with the operator key, user ID, event ID and latency (e.g., glass-to-glass latency) value for the user environment 101. In step 1482 if there is not already a session that has started for the user, the user recommendations decision service 620 proceeds to step 1483 otherwise it proceeds to step 1485. In step 1483 the user recommendations decision service 620 starts a new session for the user ID and initiates the user session data cache 621 to retrieve updates from the user's interactions with widgets representing transactions and promotional offers in the client software 103 which can be used to optimize the recommendations decisioning algorithm. In step 1484 based on the user's operator key, the user recommendations decision service 620 loads in the appropriate operator experience taxonomy 622 which contains filters and weighting criteria related to recommendation decisioning that has been set as business rules by the operator service provider. In step 1485 there has already been a session initiated with the user and the user recommendations decision service 620 loads in any data objects that have been placed by the core real-time API service 105 containing results of how the user responded to prior widget carousels that were presented including which transactions were initiated and which transactions were ignored. In step 1486 the user recommendations decision service 620 incorporates operator-specific rules from the operator experience taxonomy 622 and data about any past recommendations presented to the user from the user session data cache 621 and selects recommended transactions and offers to put into a single recommendation array from multiple event-specific arrays in the recommendation data cache 180 using reinforcement learning algorithms such as the multi-armed bandit algorithm as well as others known to those skilled in the art. The multi-armed bandit algorithm will determine a suitable reinforcement learning approach to weighting the selection from different recommendation arrays as well as the order of presentation in the widget carousel to the user, all designed to maximize user engagement with the widgets.

In step 1487, based on the multi-armed bandit algorithm, the user recommendations decision service 620 may select new transaction IDs from the user-specific transaction recommendation array 623 for the user ID and event ID representing the most highly recommended bet offers that have not yet been shown to the user based on the context of the event and the user's past behaviors and attributes as well as their "glass-to-glass" viewing latency, for example. In step 1488, based on the multi-armed bandit algorithm, the user recommendations decision service 620 may select new transaction IDs from the most popular transaction recommendation array 624 for the event ID representing the most highly recommended bet offers that have not yet been shown to the user based on the overall popularity of future bets for that event based on the number of members who have already placed those bets. In step 1489, based on the multi-armed bandit algorithm, the user recommendations decision service 620 may select new offer IDs from the promotional offers recommendation array 626 for the user ID and event ID representing the most highly recommended promotional offers that have not yet been shown to the user based on the context of the event and the user's behaviors and attributes. In step 1490, based on the multi-armed bandit algorithm, the user recommendations decision service 620 may select new transaction IDs from the profile-specific transaction recommendation array 626 for the event ID and the user's "cluster" representing the most highly recommended bet offers that have not yet been shown to the user based on the context of the event for the segment of users of which the user is a member. In step 1491, based on the multi-armed bandit algorithm, the user recommendations decision service 620 may select new transaction IDs from the time-sensitive transactions recommendation array 627 for the event ID representing time-sensitive transactions that are likely to expire soon (such as player prop bets during a live sports event) based on the context of the event and the user's "glass-to-glass" viewing latency.

In step 1492 the user recommendations service 620 returns the ordered array of recommended transaction IDs and offer IDs from multiple sources of recommendations with weighting and presentation priority determined by the multi-armed bandit algorithm to the core real-time API service 105. In step 1493, after the user has been shown the interactive widgets created from the recommendation array by the client software 103, the client software 106 returns telemetry data to the core real-time API service 105 about what recommendations the user acted upon and which ones they did not act upon which the core real-time API service 105 stores in the user session data cache 621 for the user recommendations decision service 620 to incorporate as part of a feedback loop to optimize the multi-armed bandit algorithm for future recommendations. If the client software 103 requests additional recommendations the process repeats from 1481. Otherwise, the exemplary steps may proceed to the end step 1494.

Figure 14F:
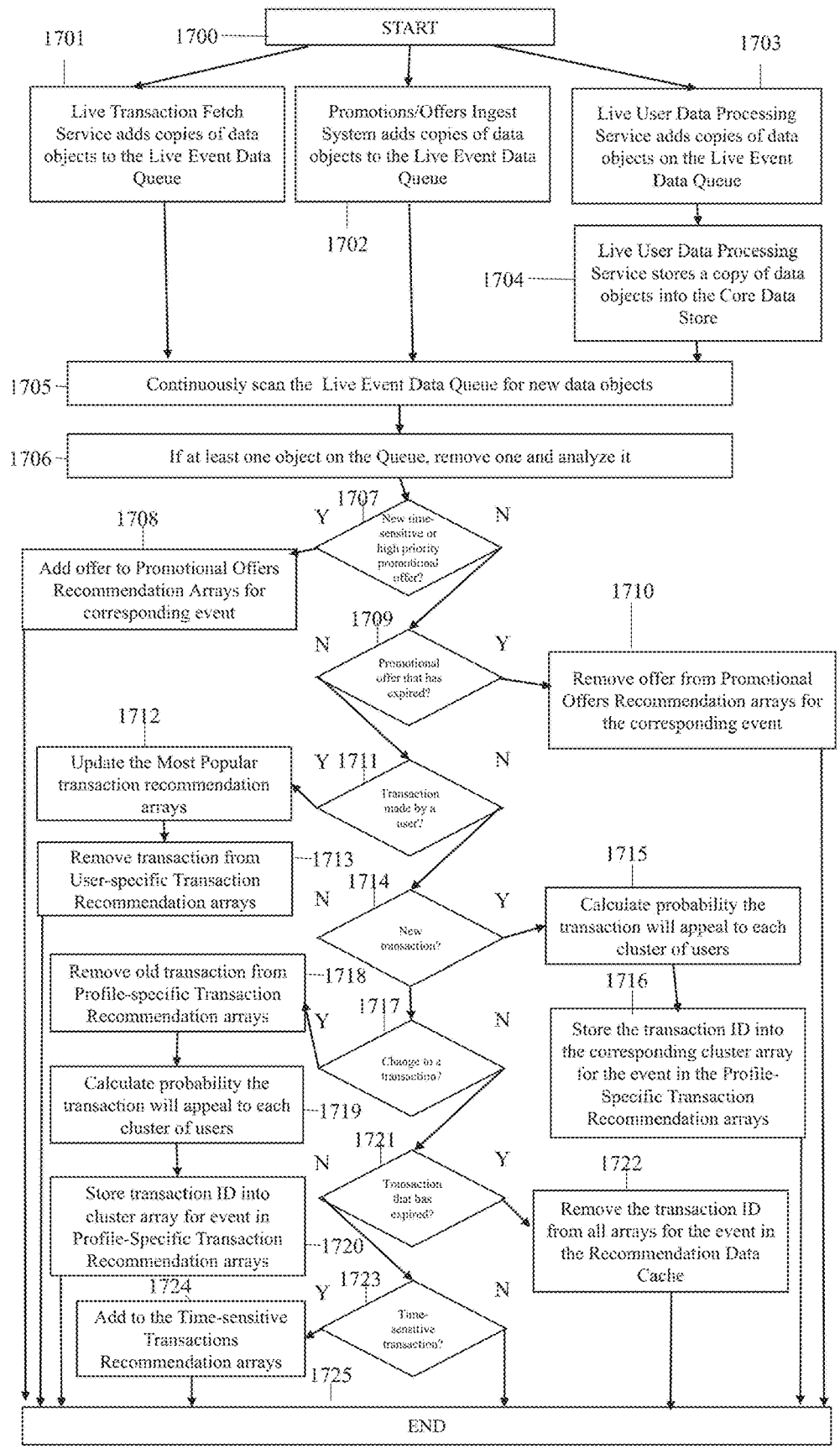
FIG. 14F is a method chart of the real-time event decision engine processing incoming dynamic data updates placed on the live event queue and adapting recommendations accordingly, in accordance with an exemplary embodiment.

FIG. 14F is a flow chart illustrating exemplary detailed steps for the real-time event decision engine 137 dynamically incorporating new, changing and expired transactions which can be incorporated into the recommendations decisioning for each user and all users in accordance with an embodiment of the invention. Referring to FIG. 14F, the exemplary steps start at 1700. In step 1701 dynamic updates to an operator's transactions, such as changes to bet markets including updated odds, new prop bet offers, expired bet offers and others, are ingested into data objects by the live transaction data fetch service 532 as part of the real-time transaction data ETL system 127 and copies of those data objects are added to the live event data queue 628. In step 1702 simultaneous to step 1701, updated promotional offers such as new offers manually added by operators using the promo/offers management dashboard 131 or dynamically requested from other third-party promotion/offers sources 130 such as dynamic advertising servers are ingested into data objects by the promotions/offers ingest system 132 and are added to the live event data queue 628. In step 1703, simultaneous to steps 1701 and 1702, the live user data processing service 629 pulls telemetry data about the user's engagement with recommended transactions and offers through the client software 103 which it copies into data objects and places on the live event data queue 628. In step 1704 the live user data processing service 629 stores a copy of these data objects into the core data store 119 for use in generating future recommendations for the user by the widget recommendations generation system 138.

In step 1705, simultaneously to steps 1701, 1702 and 1703, the live event data recommendations service 508 continuously scans the live event data queue 628 for new data objects. In step 1706 if there is at least one object present it removes the object from the queue 628 and analyzes it. In step 1707 if the data object represents a new time-sensitive or high priority promotional offer the live event data recommendations service 630 proceeds to step 1708 otherwise it proceeds to step 1709. In step 1708 the live event data recommendations service 630 adds the offer to the promotional offers recommendation arrays 623 for the corresponding event. In step 1709 if the data object represents a promotional offer that has expired, the live event data recommendations service 630 proceeds to step 1710 otherwise it proceeds to step 1711. In step 1710 the live event data recommendations service 630 removes the offer from the promotional offers recommendation arrays 623 for the corresponding event. In step 1711 if the data object represents a transaction made by a user, the live event data recommendations service 630 proceeds to step 1712 otherwise it proceeds to step 1714. In step 1712 the live event data recommendations service 630 updates the most popular transaction recommendation arrays 624 to reflect the increase in popularity of the transaction. In step 1713 the live event data recommendations service 630 removes the transaction from the user-specific transaction recommendation array 626 for the corresponding event.

In step 1714 If the data object represents a new transaction the live event data recommendations service 630 proceeds to step 1715 otherwise it proceeds to step 1717. In step 1715 the live event data recommendations service 630 uses an algorithm similar to that used by the user profile clustering service 606 to calculate the probability that the transaction will appeal to each cluster of users by calculating the distance of certain attribute values from the value ranges defined by the cluster. In step 1716 the live event data recommendations service 630 stores the transaction ID into the corresponding cluster array for the event in the profile-specific transaction recommendation arrays 625 where the order of the placement of the ID into the array is based on the probability rating the transaction will appeal to the members of each cluster. In step 1717 if the data object represents a change to a transaction, such as a change to the odds for a live sport event bet offer, the live event data recommendations service 630 proceeds to step 1718 otherwise it proceeds to step 1721. In step 1718 the live event data recommendations service 630 removes the old transaction ID from the profile-specific transaction recommendation arrays 625 for the event.

In step 1719 the live event data recommendations service 630 uses an algorithm similar to that used by the user profile clustering service 606 to calculate the probability that the updated transaction will appeal to the members of each cluster of users by calculating the distance of certain attribute values from the value ranges defined by the cluster. In step 1720 the live event data recommendations service 630 stores the transaction ID into the corresponding cluster array for the event in the profile-specific transaction recommendation arrays 625 where the order of the placement of the ID into the array is based on the probability rating the transaction will appeal to each cluster. In step 1721 if the data object represents a transaction that has expired, the live event data recommendations service 630 proceeds to step 1722 otherwise it proceeds to step 1723. In step 1722 the live event data recommendations service 630 removes the transaction ID from all arrays for the event in the recommendation data cache 180. In step 1723 if the data object represents a time-sensitive transaction, such as a player prop bet in a live sport event, the live event data recommendations service 630 proceeds to step 1724 otherwise it proceeds to the end step 1725. In step 1724 the live event data recommendations service 630 adds it to the time-sensitive transactions recommendation 627 arrays. Otherwise, the exemplary steps may proceed to the end step 1725.

Figure 15:
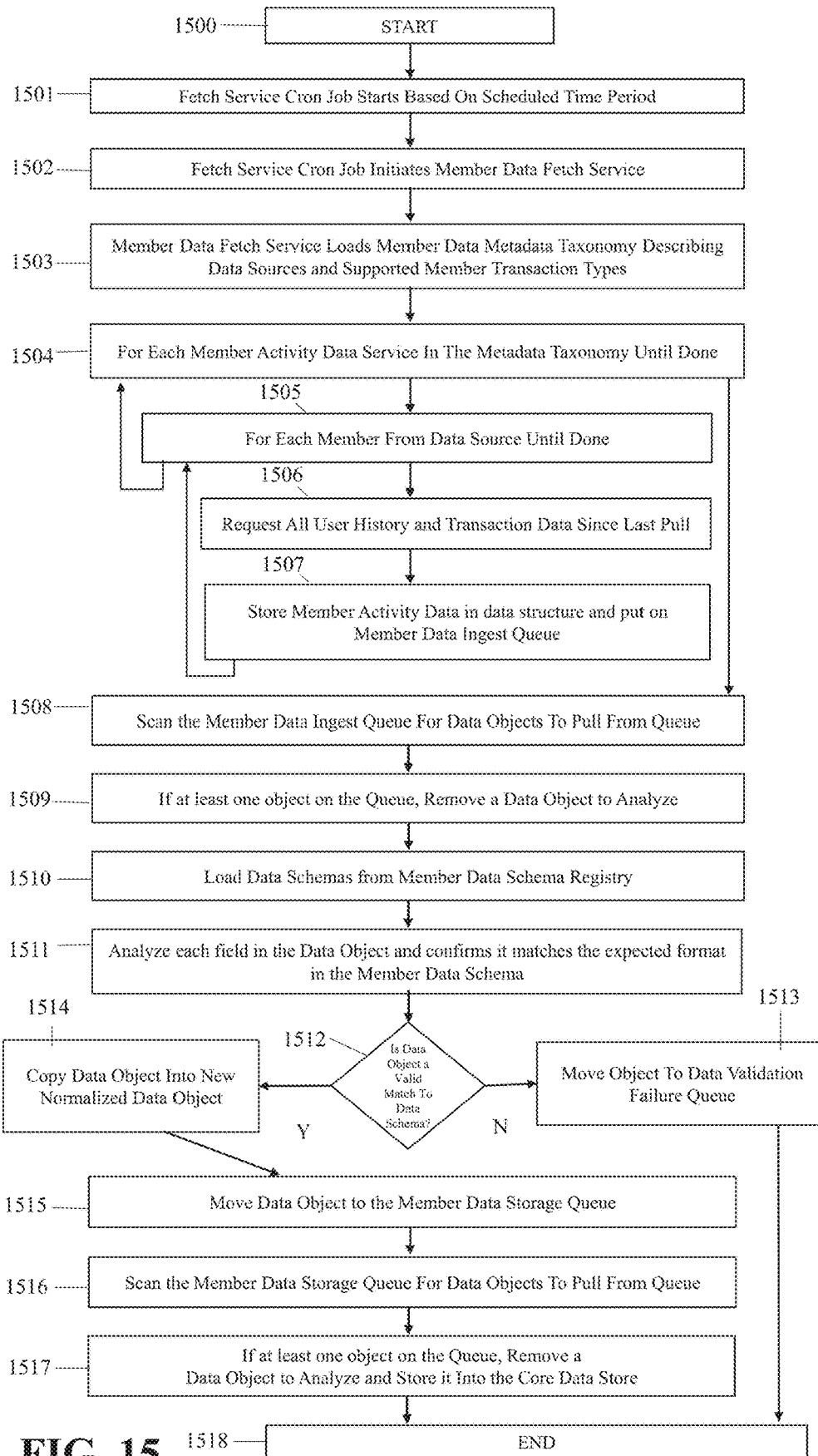
FIG. 15 is a method chart of the member activity feed ingest system ingesting, normalizing and storing user history data from operator member activity services, in accordance with an exemplary embodiment.

FIG. 15 is a flow chart illustrating exemplary detailed steps for the member activity feed ingest system 129 ingesting, normalizing and storing member activity feed data from multiple operator member activity services 128 into the core data store 119 in accordance with an embodiment of the invention. Referring to FIG. 15, the exemplary steps start at 1500. In step 1501 the fetch service cron job 700 starts based on a scheduled periodic interval such as every hour. In step 1502 the fetch service cron job 700 initiates the member data fetch service 701. In step 1503 the member data fetch service 701 loads the published member data metadata taxonomy 702 which defines the key data properties that can be pulled by the member data fetch service 701 from each operator member activity service 156, which can include attributes such as member ID, transaction ID, event ID, amount spent or stake, odds at the time the bet was placed, origin of the transaction, and others.

In step 1504 the member data fetch service 701 starts connecting to each operator member activity data source 128 to request data about transactions made by every user for completed and future events along with other user data. In step 1505 the member data fetch service 701 starts making requests for all members of the operator member activity source 128 before returning to step 1504. In step 1506 the member data fetch service 701 requests all activity data since the last ingest from the operator transaction data provider 156. In step 1507 the member data fetch service 701 stores the request response from the operator transaction data provider 156 into data objects including transaction_combinations data objects and transaction_outcome_selections data objects and pushes the data objects to the member data ingest queue 703 and returns to step 1505. In step 1508 the member data transform service 704 scans the member data ingest queue 703 for any objects of data. In step 1509 if there is at least one data object on the member data ingest queue 703 the member data transform service 704 removes one object from the queue to be analyzed. In step 1510 the member data transform service 704 loads the published data schemas from the member data schema registry 705 which contain data schemas used to validate and normalize each data object retrieved from the member data ingest queue 703 based on an understanding of the proper data formatting from each operator transaction data provider 156 as well as normalized data structures that can be consistent across all transaction data providers.

In step 1511 the data object is validated against the appropriate data schema from the member data schema registry 705 to ensure each field of data inside the data object is valid according to the schema. In step 1512 if the fields of the data object are invalid according to the appropriate schema, then the steps proceed to step 1513, otherwise they proceed to step 1514. In step 1513 the data object is determined to be invalid based on the appropriate schema from the member data schema registry 705 and is moved to the data validation failure queue 707 for later examination. In step 1514 the data object is normalized to a new data structure based on a normalized schema independent of the operator member activity data provider 128.

In step 1515 the valid normalized data object is placed on the member data storage queue 706. In step 1516 the member data storage service 708 scans the member data storage queue 706 for any objects of data to be removed from the queue 706 and analyzed. In step 1517, if there is at least one data object on the member data storage queue 706 the member data storage service 708 removes one object from the queue 706 and based on its data object type it is stored into a specific collection in the core data store 119.

Figure 16A:
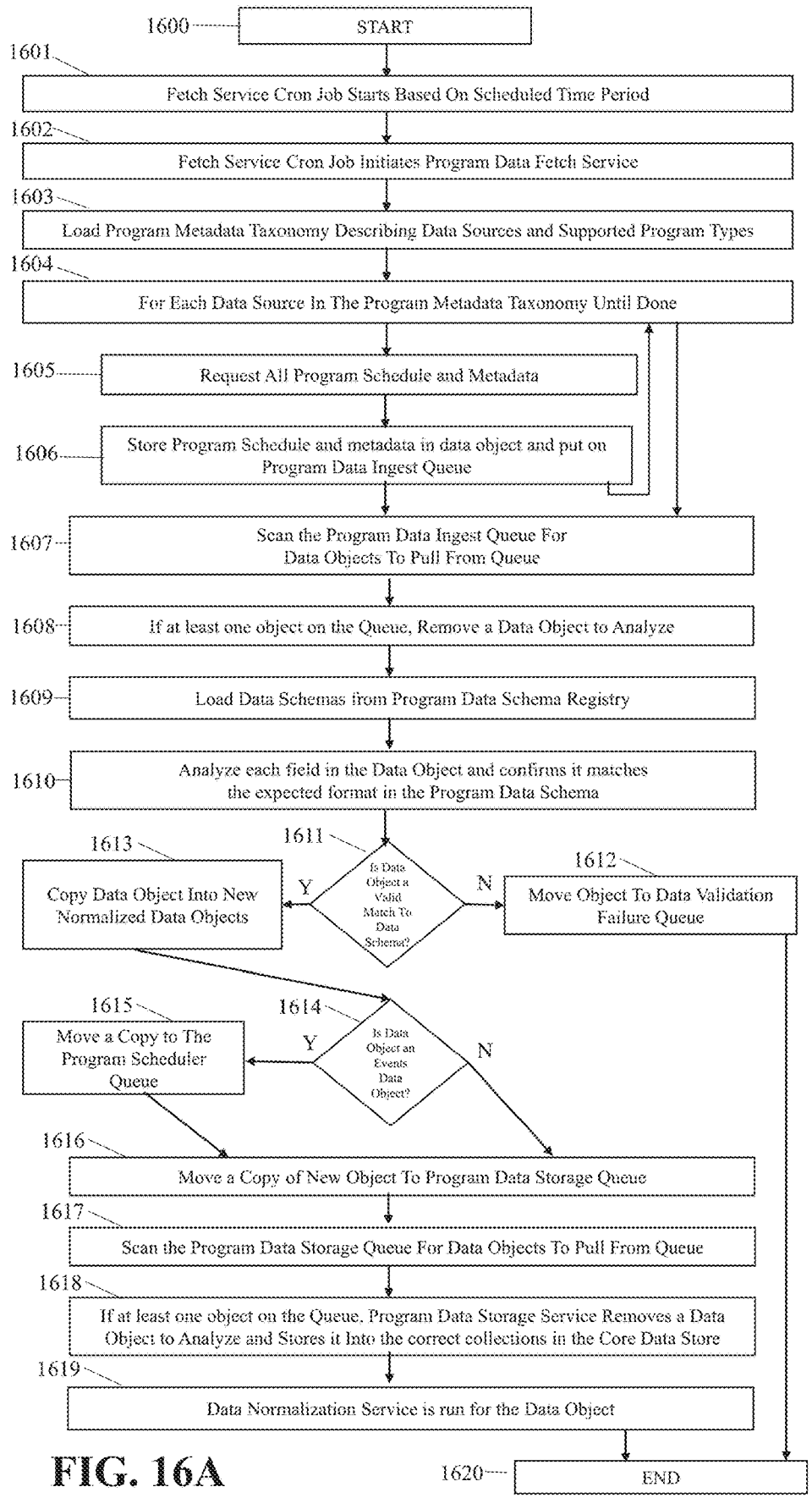
FIG. 16A is a method chart of the real-time channel program data ETL system ingesting and normalizing program data from channel program data services, in accordance with an exemplary embodiment.

FIG. 16A is a flow chart illustrating exemplary detailed steps for the real-time channel program data ETL system 134 which ingests, normalizes, stores and schedules live event viewing schedule data from multiple channel program data services 133 into the core data store 119 in accordance with an embodiment of the invention. Referring to FIG. 16A, the exemplary steps start at 1600. In step 1601 the fetch service cron job 800 starts based on a scheduled periodic interval such as at 12 AM every day for example. In step 1602 the fetch service cron job 800 initiates the program data fetch service 801. In step 1603 the program data fetch service 801 loads the published program metadata taxonomy 802 which defines the relevant event set for the interactive services platform 100 such as the set of sports leagues that are supported and the key data related to those event sets that need to be pulled by the program data fetch service 801 from each channel program data service 166, which can include attributes including but not limited to video service provider channel lineups, channel numbers, channel logo images, channel and network unique identifiers, program identifiers, program title, program description, program duration, program rating and other detailed data surrounding audiovisual programming.

In step 1604 the program data fetch service 802 starts connecting to each channel program data source 166 to request upcoming channel program data for all providers for a fixed time duration (e.g., next seven days for example). In step 1605 the program data fetch service 801 requests schedule data from the channel program data service 133 which typically contains a list of program IDs for each item in the schedule as well as other related metadata for each program. In step 1606 the program data fetch service 801 stores the request response from the channel program data provider 133 into a data object and pushes the data object to the program data ingest queue 803 before returning to step 1604.

In step 1607 the program data transform service 804 scans the program data ingest queue 803 for any objects of data. In step 1608 if there is at least one data object on the program data ingest queue 803 the program data transform service 804 removes one object from the queue to be analyzed. In step 1609 the program data transform service 804 loads the published data schemas from the program data schema registry 805 which contain data schemas used to validate and normalize each data object retrieved from the program data ingest queue 803 based on an understanding of the proper data formatting from each channel program data provider 133 as well as normalized data structures that can be consistent across all data providers.

In step 1610 the data object is validated against the appropriate data schema from the program data schema registry 805 to ensure each field of data inside the data object is valid according to the schema. In step 1611 if the fields of the data object are invalid according to the appropriate schema, then the steps proceed to step 1613, otherwise they proceed to step 1612. In step 1612 the data object is determined to be invalid based on the appropriate schema from the program data schema registry 805 and is moved to the data validation failure queue 808 for later examination. In step 1613 the data object is normalized to new data structures based on a normalized schema independent of the channel program data provider 166. In step 1614 if the valid normalized data object is an airings data object the steps proceed to step 1615 otherwise, they proceed directly to step 1616. In step 1615 the valid normalized data object is an airings data object, and a copy of the data object is published to the program scheduler queue 809 inside the live event program scheduler system 810. In step 1616 the data object is placed on the program data storage queue 806 where it sits until it is pulled from the program data storage queue 806 by the program data storage service 807.

In step 1617 the program data storage service 807 scans the program data storage queue 806 for any objects of data to be removed from the queue 806 and analyzed. In step 1618, if there is at least one data object on the program data storage queue 806 the program data storage service 807 removes one object from the queue 806 and based on its data object type it is stored into a specific location or collection type in the core data store 138 if it is newer than a similar data object has already been loaded into the core data store 138. In step 1619 the data normalization service 812 is run on the new data object which uses a "fuzzy logic" algorithm that finds matches for events across disparate data records and when matches are found creates a new data collection in the core data store 138 called a cross_reference_collection where data from matching records are joined. The exemplary steps may proceed to the end step 1620.

Figure 16B:
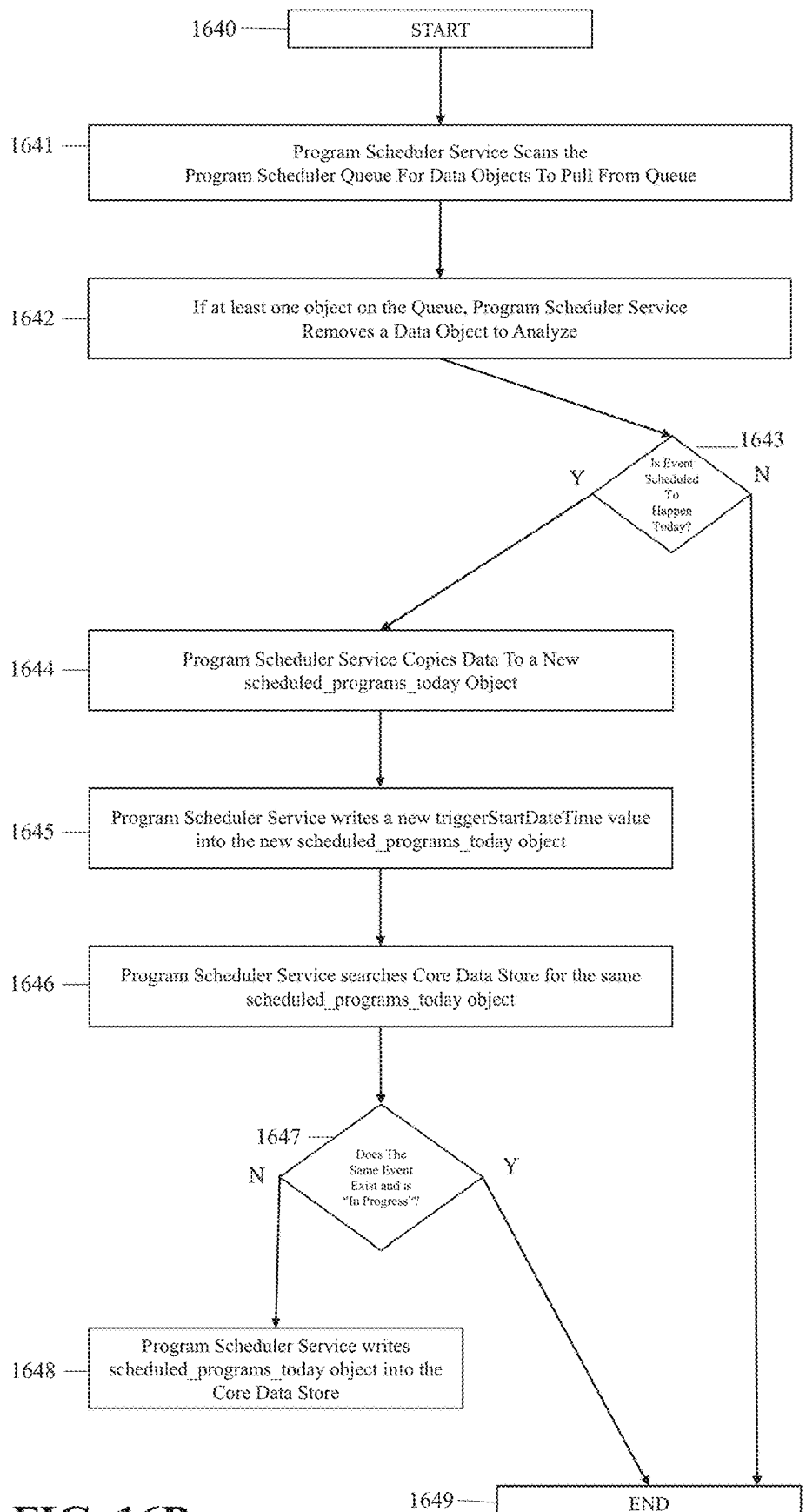
FIG. 16B is a method chart of the program scheduler system creating a schedule for the ingest of audiovisual data to create and deliver phonemes to clients, in accordance with an exemplary embodiment.

FIG. 16B is a flow chart illustrating exemplary detailed steps for the live event program scheduler system 810 used to create a schedule for events occurring within 24 hours for the real-time channel/synch data system 117 to start to analyze the audiovisual feed from the channel feed/synch service 122 for live event programs for use with synchronization and latency (e.g., glass-to-glass latency) calculation by the client software 106 in accordance with an embodiment of the invention. Referring to FIG. 16C, the exemplary steps start at 1640. In step 1641 the program scheduler service 811 scans the program scheduler queue 809 for any objects of data to be removed from the queue 809 and analyzed. In step 1642, if there is at least one data object on the program scheduler queue 809 the program scheduler service 811 removes one object from the queue 809. In step 1643 if the event is scheduled to happen today it is added to the day's event schedule in subsequent steps. In step 1644 the program scheduler service 811 maps data from the airings object to a new scheduled_airings_today data object. In step 1645 the program scheduler service 811 further analyzes the event start time property in the airings object and writes a new triggerStartDateTime value into the new scheduled_airings_today object which is a timestamp of when all real-time ingest systems within the interactive services platform 100 should begin to ingest their sources which in certain embodiments can include the real-time channel/synch data system 117 starting to analyze the audiovisual feed from the channel feed/synch service 122 for the live event program for use with synchronization and latency (e.g., glass-to-glass latency) calculation by the client software 103. In step 1646 the program scheduler service 811 searches the core data store 119 to see if a similar data object has already been loaded. In step 1647 if there is a schedule entry for the same event in the core data store 119, the status of the old and new objects is first compared by the program scheduler service 811 to make sure data about an in-progress event will not be overwritten. In step 1648 if there is no similar event, or if there is one that is not in-progress, the program scheduler service 811 writes the scheduled_programs_today object into the core data store 138. The exemplary steps may proceed to the end step 1649.

What is claimed is:

1. A method for delivering interactive user interface elements to a digital user device running a software application client configured to communicate with a remote interactive services platform, the method comprising:
   storing, on the remote interactive services platform, event data received from a plurality of event data sources, the event data being associated with a plurality of live transmission events;
   from the event data, generating on the remote interactive service platform, event pattern-of-speech data including event phonemes based on spoken words contained within the respective live transmission events;
   generating, via the software application client, client pattern of speech data including broadcast phonemes based on spoken words contained within a live broadcasted event that is captured by the digital user device;
   transmitting, from the remote interactive service platform to the digital user device, at least a portion of the event pattern-of-speech data;
   determining, at the digital user device, a match between one of the plurality of live transmission events and the live broadcasted event based on the event phonemes and the broadcast phonemes wherein the match is based on a probability that the live transmission event and the live broadcasted event relate to an identical live performance event;
   based on the match, identifying a user engagement opportunity associated with the live broadcasted event;
   pushing interactive content associated with the user engagement opportunity to the digital user device for display on the digital user device;
   receiving, via the digital user device, a user selection associated with the interactive content; and
   based on the user selection, initiating a placement of an order associated with the user engagement opportunity.

2. The method of claim 1, wherein the digital user device is associated with user characteristic data on the remote interactive services platform, and wherein the identifying a user engagement opportunity associated with the live broadcasted event is based on the user characteristic data.

3. The method of claim 2 wherein the user characteristic data includes historical wager data associated with at least one of: i) accepted wager offers and ii) declined wager offers.

4. The method of claim 2, wherein identifying the user engagement opportunity includes selecting the user engagement opportunity from a plurality of user engagement opportunities based upon a determined probability of user engagement with the user engagement opportunity.

5. The method of claim 4, wherein identifying the user engagement opportunity is based on the user characteristic data and further comprises using a reinforcement learning algorithm applied to a pool of event-specific arrays associated with a live event related to the live broadcasted event.

6. The method of claim 5, wherein the user engagement opportunity is selected from a group consisting of: a recommended offer based on the live event and on user characteristic data common to a plurality of users, a recommended offer based on an overall popularity, a recommended offer based on a context of the live event and the user characteristic data, a recommended offer based on the context of the live event and user characteristic data regarding past behaviors and attributes, an offer that is based on the context of the live event and user characteristic data regarding viewing latency; and an offer to place a wager based on an occurrence during the live event and user characteristic data.

7. The method of claim 2, further comprising:
   based on activity data associated with the user characteristic data and event data received from the plurality of event data sources, determining that an alternative live transmission event has a higher probability of user interest than the live broadcasted event; and
   transmitting to the digital user device a message informing the user of the alternative live transmission event.

8. The method of claim 2, wherein the software application client is proprietary to a sports betting platform, the interactive services platform server is proprietary to a managed engagement provider that is a third party to the sports betting operator, the user engagement opportunity includes a wager opportunity, and the order includes a wager order; and wherein pushing interactive content associated with the user engagement opportunity to the user device for display on the digital user device includes:

pushing from the interactive services platform, for display within the software application client, an interactive user interface element selectable from the digital user device, the interactive user interface element being associated with the wager opportunity identified by the remote interactive services platform.

9. The method of claim 8 wherein initiating the placement of an order associated with the user engagement opportunity includes causing a betslip hosted by the sports betting operator to be populated with the wager order.

10. The method of claim 1, wherein the live broadcasted event is associated with a live sporting event;
the live broadcasted event includes spoken word accounts of the live sporting event;
the broadcast phonemes are based on the spoken word accounts; and
the interactive content is time-sensitive wager information regarding a possibility of an occurrence at the live sporting event.

11. The method of claim 1 wherein the event data includes broadcast information about the plurality of live transmission events and at least one of: i) upcoming transmission event information; ii) wager opportunity data associated with upcoming transmission events; iii) user activity information; and iv) user consumer data.

12. The method of claim 1 wherein the plurality of event data sources includes at least one of: i) a broadcast service; ii) a gaming operator of real-time bet markets for live sport events; iii) an event data service; iv) a user activity service; and v) a consumer data service.

13. The method of claim 1 further comprising:
causing the interactive content associated with the user engagement opportunity to display on the digital user device in a carousel view comprising a plurality of user selectable engagement opportunities each of which is selected for display based on a respective determined probability of user engagement with the user engagement opportunity.

14. The method of claim 13, further comprising:
receiving via the digital user device, a user input request to display a wager opportunity related to interactive content displayed in the carousel view;
identifying, on the remote interactive services platform, a plurality of related wager opportunities having a wager element in common with the interactive content displayed in the carousel view;
in response to the user input request, causing the digital user device, to sequentially display the related wager opportunities based on user gesture data processed through the software application client; and
receiving, through the software application client, a user wager selection from one of: the sequential displayed related wager opportunities and unrelated wager opportunities.

15. The method of claim 14, wherein the wager element in common includes one or more of: a bet type, an individual performer in the event, odds, an elapsed time or remaining time in the event, performance measure of a participant or participating team in the event, and a common statistic relating to the event.

16. The method of claim 1, further comprising:
determining a latency between a performance moment in a live event and a detection of the performance moment at the digital user device.

17. The method of claim 16, wherein, identifying the user engagement opportunity associated with the transmission event is based on the latency.

18. The method of claim 1, further comprising:
receiving, via the software application client, audio-visual data relating to a second broadcasted event that is captured by the digital user device; and
causing the digital user device to display revised interactive content associated with a second user engagement opportunity associated with the second broadcasted event.

19. The method of claim 1, further comprising, via the remote interactive services platform:
fetching a metadata taxonomy from each of the plurality of event data sources, wherein the metadata taxonomy includes event identifying data for each of the plurality of live transmission events, and data formatting rules for the respective event data source;
fetching, from the plurality of event data sources, raw event data in accordance with the respective metadata taxonomy for the respective event data source;
storing, in a data ingest queue, the raw event data as a plurality of raw data event objects;
transforming each raw event data object to a normalized event data object in accordance with a schema that includes formatting rules relating to the event data source corresponding to the raw data event object being transformed, the normalized event data object corresponding to a live event;
storing the normalized event data object in a data storage queue;
publishing each normalized event data object to an event scheduler queue;
determining an event start time for the live event corresponding to each normalized event data object;
requesting, from one of the plurality of event data sources, live event action data that includes data relating to occurrences taking place at the live event, substantially as they occur; and
continuing to request live event action data objects relating to the live event until receipt of a live event action data object indicating that the event has completed.

20. The method of claim 19, wherein:
the live event data relates to wagers regarding the live event;
the user engagement opportunity includes a wager opportunity;
at least one of the plurality of event data sources is a wagering service;
the live event data includes at least one of updated odds, updated prop bet offers, new prop bet offers, and expired wager offers; and
continuing to request live event action data objects includes continuing to request live event action data objects relating to wager opportunities relating to the live event.

21. The method of claim 20, further comprising:
comparing a first live action data object to a second live action data object to determine whether respective wagers associated with each of the first live action data object and second live action data object have similar properties, and
based on a determination that the first live action data object and the second live action data object have similar properties, associating the respective wagers in a bet family.

22. The method of claim 21, further comprising:
pushing to the digital user device, engagement opportunities associated with the bet family.

23. The method of claim 1, wherein the event data comprises sporting event data, channel schedule data, and bet data, the method further comprising:
analyzing a plurality of data elements including at least two of i) the sporting event data, ii) the channel schedule data, and iii) the bet data to determine whether the plurality of data elements relate to the same sporting event, and
upon a determination that the plurality of data elements are related to a single sporting event, associating with one another the plurality of data elements;
determining that the live broadcasted event matches the single sporting event; and
presenting a bet offer associated with the bet data via the user interface on the digital user device.

24. The method of claim 1 wherein the match is based on a probability above a threshold that the one of the plurality of live transmission events and the live broadcasted event relate to an identical live sporting event.

25. The method of claim 1 wherein transmitting, from the remote interactive service platform to the digital user device, at least a portion of the event pattern-of-speech data includes transmitting continuous streams of phonemes from a plurality of supported programs and wherein determining the match between one of the plurality of live transmission events and the live broadcasted event includes matching continuous strings of phonemes.

26. The method of claim 1 further comprising
generating, at the remote interactive services platform, a plurality of phoneme stream datasets from a plurality of television program audio sources; and storing in a data cache a data table comprising a combination of the phoneme stream datasets and managed real-time channel program data;
wherein transmitting the event pattern-of-speech data to the digital user device includes delivering the data table to the digital user device in response to a client software request.

27. The method of claim 26 wherein the data table represents a discrete predetermined duration of time and includes a sequence attribute representing a chronologically ordered set of phonemes for use in identifying the match.

28. The method of claim 1, wherein the event data includes an event time stamp associated with the event pattern of speech data, and wherein the client pattern of speech data includes a client-side time stamp, the method further comprising: pushing interactive content associated with the user engagement opportunity to the digital user device for display on the digital user device at a time based on i) the event time stamp, ii) the client-side time stamp, and iii) a known offset value based on event data source.

29. The method of claim 28, wherein pushing interactive content associated with the user engagement opportunity to the digital user device for display on the digital user device occurs after determining, at the digital user device, the match between one of the plurality of live transmission events and the live broadcasted event based on the event phonemes and the broadcast phoneme.

30. The method of claim 1, wherein
generating, on the remote interactive service platform, event pattern-of-speech data including event phonemes further includes:
processing event audio;
identifying speech within the event audio;
converting the speech to phoneme data that includes discrete alpha numerical values representing phonemes; and wherein
the at least a portion of the event pattern-of-speech data that is transmitted from the remote interactive service platform to the digital user device, includes the discrete alpha numerical values representing phonemes; and
wherein the discrete alpha numerical values representing phonemes are used in the step of determining, at the digital user device, a match between one of the plurality of live transmission events and the live broadcasted event.

* * * * *